(12) United States Patent
Dhondt et al.

(10) Patent No.: US 9,678,488 B1
(45) Date of Patent: Jun. 13, 2017

(54) SYSTEM AND METHOD FOR VEHICLE BUILD VERIFICATION

(71) Applicant: The Boeing Company, Chicago, IL (US)

(72) Inventors: Jon J. Dhondt, Snohomish, WA (US); Michael B. McAvoy, Lynnwood, WA (US); Terrance L. Thomas, Covington, WA (US); Mark S. Shander, Mill Creek, WA (US); Alberto Ferrer, Bothell, WA (US); Steven M. Walstrom, Renton, WA (US)

(73) Assignee: The Boeing Company, Chicago, IL (US)

( * ) Notice: Subject to any disclaimer, the term of this patent is extended or adjusted under 35 U.S.C. 154(b) by 639 days.

(21) Appl. No.: 14/084,159

(22) Filed: Nov. 19, 2013

(51) Int. Cl.
*G06F 19/00* (2011.01)
*G05B 15/02* (2006.01)

(52) U.S. Cl.
CPC .................................... *G05B 15/02* (2013.01)

(58) Field of Classification Search
USPC ....................................................... 700/110
See application file for complete search history.

(56) References Cited

U.S. PATENT DOCUMENTS

| | | |
|---|---|---|
| 5,184,312 A | 2/1993 | Ellis |
| 5,347,518 A | 9/1994 | Lee |
| 6,202,824 B1 * | 3/2001 | Goss .................... B23Q 7/1442 198/346.1 |
| 6,223,093 B1 * | 4/2001 | Kitamura ............. G05B 19/418 700/104 |
| 8,200,354 B2 | 6/2012 | Freeman et al. |
| 2006/0036386 A1 * | 2/2006 | Cupples .............. G01F 25/0061 702/100 |
| 2006/0155425 A1 * | 7/2006 | Howlett ............... G05D 1/0055 701/1 |
| 2006/0255553 A1 * | 11/2006 | Gust ........................ B25H 3/00 280/47.34 |
| 2009/0271239 A1 * | 10/2009 | Underdal ........... G06Q 10/0631 705/7.12 |
| 2011/0184607 A1 * | 7/2011 | Beacham ............. G07C 5/0808 701/33.4 |
| 2011/0270432 A1 * | 11/2011 | Carpenter ........ G05B 19/41805 700/110 |

OTHER PUBLICATIONS

Cognex, Quality control and assembly verification for automative line, 2006, Cognex, p. 1-3.*
Global Traffic Thecn., Opticom Project Management Service, Jun. 2008, Globl Traffic Tech., pp. 1-4.*

* cited by examiner

Primary Examiner — Kidest Bahta

(57) ABSTRACT

A system and method for performing build verification of equipment systems after being installed in a partially constructed vehicle portion. After installing one or more of prerequisite equipment systems during a current build stage of a vehicle build plan, the installed equipment systems are tested during the current build stage to determine whether the installed equipment systems are electrically connected correctly.

45 Claims, 33 Drawing Sheets

SYSTEM AND METHOD FOR VEHICLE BUILD VERIFICATION

TECHNICAL FIELD

The field of the embodiments presented herein is directed toward vehicle build verification testing, and more particularly, to awareness of the build state of the vehicle and performing tests of installations during vehicle assembly.

BACKGROUND

Many commercial vehicles are manufactured by multiple vendors and each vendor may be responsible for building one or more portions of the vehicle. For example, the vehicle may be manufactured in separate sections and one vendor may be responsible for building one section and another vendor may be responsible for building another section. The separate sections are transported to a location where they are assembled together into a complete vehicle.

When manufacturing aircraft, the equipment systems delivered by vendors typically have final flight software pre-installed. This final flight software does not include any features to assist in the building of the aircraft. Built-in-test equipment (BITE) functionality is included in the hardware but the associated software is limited to fail-safe and maintenance concerns. This is useful when the aircraft is in service but not when the aircraft is being built.

Such vehicles are built according to a predetermined build plan developed to ensure that each completely assembled vehicle matches a certified design and will perform as designed. Administrative software referred to as factory build software within each manufacturing facility schedules and tracks the vehicle build as well as coordinates the inventory needed for each vehicle build. Factory build software typically includes online work instructions (OWIs) that identify what tasks need to be performed. An assembly line worker interfaces with the factory build software to sign off when each OWI is completed.

The build plan includes multiple phases or levels of the build that define a list of equipment systems and identify when they are to be installed. After an equipment system is installed, it is tested to verify that it is electrically installed correctly. Traditionally, an external test cart is rolled up to the aircraft section and numerous wiring connections are made manually to connect sensors within the external test cart to the equipment system being tested. In many cases, wiring bundles within the aircraft are opened up to make these connections to the external test cart. Power is applied from the external test cart to the wiring onboard the aircraft connected to the sensors on the external test cart to perform one or more tests. Software hosted by the external test cart performs the desired tests. For example, if the desired signals are sensed, then the connections are disconnected and reconnected manually elsewhere to perform additional tests. The external test cart is repeatedly connected and disconnected to verify the various equipment installations. Therefore, a factory build requires a significant amount of manual interaction and specialized equipment to verify correct equipment installations.

In an aircraft not all equipment systems within each section are self-contained. Most are intertwined with other sections of the aircraft. Therefore, to test and verify a section, the equipment systems that are not yet present in the build sequence would have to be emulated. Once equipment system installations have been tested, final assembly processes are performed that would make additional testing difficult due to limited accessibility. Aircraft could be built at a faster rate and orders for completed aircraft could be filled more quickly with the use of verification testing systems earlier in the build process.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a computer-implemented method (where the computer comprise hardware and software) for verifying proper installation of equipment systems in a vehicle designed to be assembled in multiple build stages is provided. The method includes providing one or more partially constructed vehicle portions of the vehicle and providing a build plan for assembling the vehicle comprising a plurality of build stages. The method also includes providing build verification software configured for determining from the build plan a current build stage of at least one partially constructed vehicle portion, determining one or more prerequisite equipment systems to be installed in the one or more partially constructed vehicle portions according to the current build stage, determining which of the one or more prerequisite systems have been installed in the one or more partially constructed vehicle portions during the current build stage, thereby defining one or more installed equipment systems, and testing during the current build stage whether the one or more installed equipment systems are electrically connected correctly in the one or more partially constructed vehicle portions. The method may also include emulating prerequisite equipment systems that are not yet installed but are necessary for testing.

According to another embodiment disclosed herein, a system for verifying proper installation of equipment systems within one or more partially constructed vehicle portions is provided. The system includes a predetermined build plan having multiple build stages for assembling the one or more partially constructed vehicle portions. The system also includes prerequisite equipment systems to be installed within the one or more partially constructed vehicle portions. At least one of the prerequisite equipment systems configured to be installed during each of the build stages wherein each of the prerequisite equipment systems becoming installed equipment systems when installed in the one or more partially constructed vehicle portions. The system also includes build verification software configured to determine a current build stage of the plurality of build stages, which of the plurality of prerequisite equipment systems are to be installed during the current build stage, which of the plurality of prerequisite equipment systems that are to be installed during the current build stage but are not yet installed in the one or more partially constructed vehicle portions, and test electrical connectivity of the installed equipment systems in the one or more partially constructed vehicle portions to verify proper installation during each of the plurality of build stages.

According to yet another embodiment disclosed herein, a computer-readable storage medium is provided that includes instructions for determining a current build stage of one or more partially constructed vehicle portions from a plurality of build stages, instructions for determining prerequisite equipment systems to be installed in the one or more partially constructed vehicle portions during the current build stage, instructions for determining which prerequisite equipment systems are to be installed during the current build stage that are not yet installed in the one or more partially constructed vehicle portions, and instructions for testing during each of the plurality of build stages whether at least one installed equipment system installed in the partially constructed vehicle portion is properly electrically connected within the one or more partially constructed vehicle portions.

According to still yet another embodiment disclosed herein, a computer-implemented method for verifying proper installation of equipment systems of a primary power busing network within a first modular equipment center (MEC) is provided. The method includes routing a low voltage test power to a first plurality of contactors within the first MEC, determining whether or not the low voltage test power is present at each of the first plurality of contactors of the first MEC, and collecting contactor information from each of the first plurality of contactors across an internal MEC data network of the first MEC to a computing and network interface (CNI) module of the first MEC.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

Figure 1:
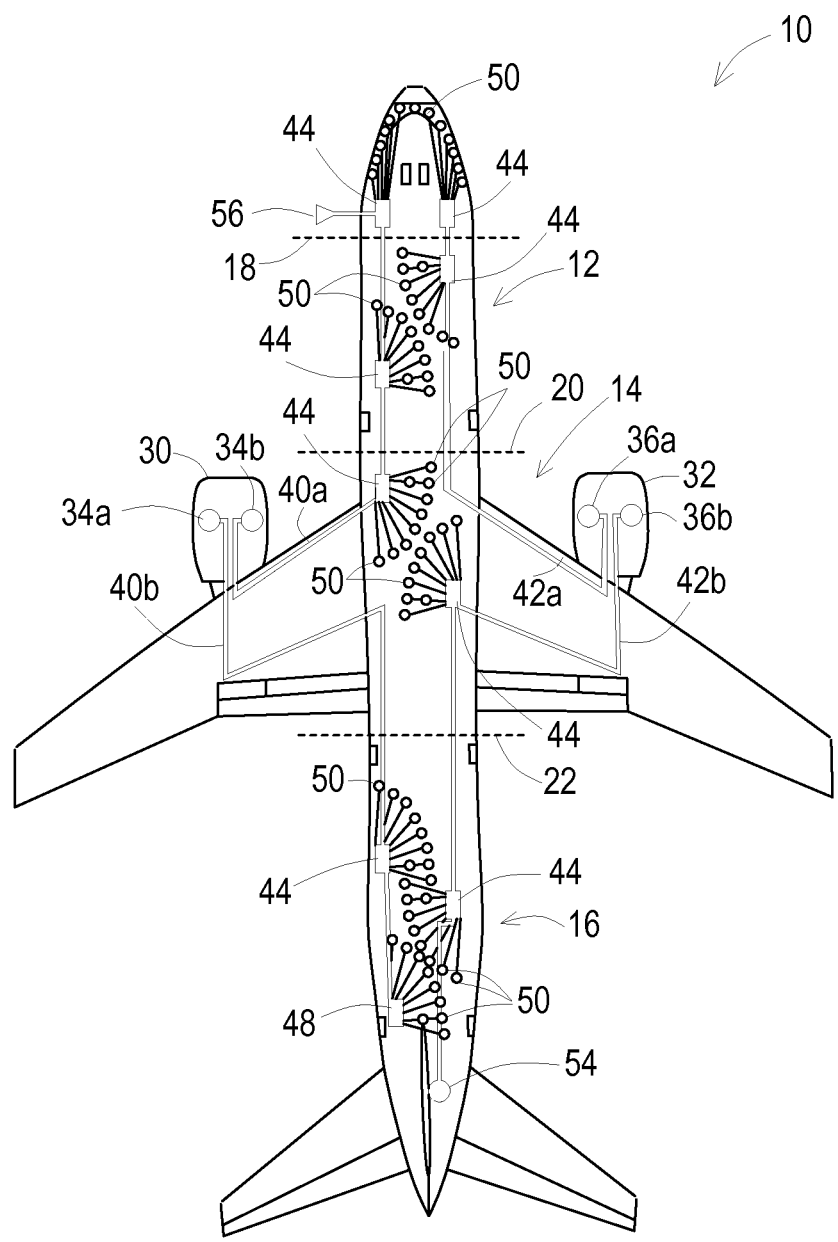
FIG. 1 illustrates a top view of one configuration of an aircraft with spatially distributed modular equipment centers (MECs) wherein equipment loads are serviced by the nearest MEC according to at least one embodiment disclosed herein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to the manufacture and assembly of vehicles from multiple vehicle portions according to a build plan of multiple stages and the use of build verification software to test and verify that equipment systems are installed properly within the vehicle portions in such a way that reduces production time and such that the testing of the installed equipment systems is completed prior to delivery of the vehicle to the customer. The present invention is susceptible of embodiment in many different forms. There is no intent to limit the principles of the present invention to the particular disclosed embodiments. References hereinafter made to certain directions, such as, for example, "front", "rear", "left" and "right", are made as viewed from the rear of the vehicle looking forward. In the following detailed description, references are made to the accompanying drawings that form a part hereof and in which are shown by way of illustration specific embodiments or examples. Referring now to the drawings, in which like numerals represent like elements throughout the several figures, aspects of the present disclosure will be presented.

Aspects of this disclosure may be used in many types of vehicles such as, for example, aircraft, spacecraft, satellites, watercraft, submarines, and passenger, agricultural or construction vehicles. Aspects of this disclosure may also be used in different constructions of vehicles. While the immediate benefit is towards vehicles that have non-conducting frames, chassis or skin, the disclosure features may be suitable and beneficial of vehicles constructed of conductive materials. For the sake of simplicity in explaining aspects of the present disclosure, this specification will proceed utilizing a composite aircraft 10 as the primary example. However, as will be seen, many of aspects of the present disclosure are not limited to the composite aircraft 10.

As well understood by those skilled in the art, the exemplary aircraft 10 depicted in FIG. 1 includes a body commonly referred to as a fuselage that is made substantially of composite materials, or composites. The outer composite skin on the fuselage of the aircraft 10 conforms to the curvature of fuselage frames. The fuselage includes a plurality of vehicle sections such as a forward section 12, a middle section 14, and an aft section 16. Section breaks 18, 20, 22 are defined between adjacent aircraft sections. The composite aircraft 10 may have any number of engines. As shown in FIG. 1, left engine 30 is supported on the left wing and right engine 32 is supported on the right wing. Each of the engines 30, 32 has a rotor which defines a rotor burst zone 38 (FIG. 5A) in which damage to the fuselage and aircraft systems between the engines 30, 32 may occur as a result of an event or an operational inconsistency with one of the engines 30, 32.

The composite aircraft 10 may have any number of sections and the position of the aircraft sections or systems within the composite aircraft 10 may sometimes be described as being forward or aft of the rotor burst zone 38. Floor beams extend between fuselage frames to define a passenger compartment above the floor beams and a cargo area for holding cargo below the floor beams. Stanchions extending between the fuselage frames and the floor provide a fulcrum to assist in stiffening the floor of the composite aircraft 10. The passenger area is pressurized and all or part of the cargo area may be pressurized. Ducts may be positioned through the crown run of the composite aircraft 10 above the passenger compartment or below the floor in the cargo area such as between the fuselage frame and the stanchions.

On each of the engines 30, 32 are one or more main primary power sources such as high voltage AC left power generators 34a, 34b and high voltage AC right power generators 36a, 36b (hereinafter may be referred to collectively and/or generically as "left generators 34", "right generators 36" or "generators 34, 36"). Primary power feeders 40a and 40b extend from the left generators 34a, 34b and primary power feeders 42a and 42b extend from the right generator 36a, 36b. As shown in FIG. 1, primary power is distributed throughout the composite aircraft 10 via the primary power feeders 40a, 40b, 42a, 42b (hereinafter may be referred to collectively and/or generically as "power feeders 40, 42"). The composite aircraft 10 may also have one or more high voltage AC auxiliary power unit generators 54 for redundancy in the event one or more of the generators 34, 36 fail, as well as to provide power when the engines 30, 32 are not running. When the composite aircraft 10 is parked and the engines are not running, power may be provided to the aircraft by one or more power sources such as low voltage AC external power unit 56.

For purposes of this disclosure, low voltage and high voltage are those voltages typically referred to as either low or high voltage within the aircraft industry and as may be described in DO-160, Environmental Conditions and Test Procedures for Airborne Equipment, a standard for environmental test of avionics hardware published by RTCA, Incorporated. Throughout this disclosure, 230 VAC is referred to as high voltage but another voltage within a range of voltages, higher or lower than 230 VAC, could also be referred to as high voltage. Also, 28 VDC and 115 VDC are referred to as low voltages but another voltage within a range of voltages, higher or lower than either of 28 VDC and 115 VDC, could also be referred to as low voltage.

The composite aircraft 10 in FIG. 1 does not have dedicated centralized equipment bays for housing power and communications equipment. The equipment is configured into modular power and communication equipment centers, referred to as MECs, that are spatially distributed throughout the composite aircraft 10. For example, one or more MECs are spatially distributed in each of the forward, middle and aft sections 12, 14, 16. Each of the MECs provide localized power conversion and may be either a primary MEC 44, a secondary MEC 46, or an auxiliary or standby MEC 48, as described in greater detail below. Primary MEC 44, secondary MEC 46 and standby MEC 48 may generally be referred to as "MEC" with one or more applicable reference numbers 44, 46, 48. Primary power is distributed from the generators 34, 36 via power feeders 40, 42 across section breaks 18, 20, 22 to a primary power input of each of the MECs 44, 46, 48.

For optimized fault tolerance, the aircraft 10 may include a standby MEC 48 positioned in the rear of the aircraft 10 and at least two MECs 44, 46 positioned in each of the forward, middle, and aft sections 12, 14, 16 of the aircraft 10. For example, in FIG. 1 redundancy may be achieved by having multiple MECs 44, 46, 48 in each aircraft section without having to cross section breaks 18, 20, 22. Preferably, each section 12, 14, 16 includes a primary MEC 44 and a corresponding secondary MEC 46 thereby defining a two by three configuration of MECs 44, 46 plus a standby MEC 48. If there are four separate aircraft sections then there is a two by four configuration of MECs 44, 46. Preferably, the MECS 44, 46, 48 are alternately spaced on the left and right sides relative to one another along the length of the aircraft 10. It should be understood that the present disclosure is not limited to any particular number or configuration of MECs 44, 46, 48.

Figure 4:
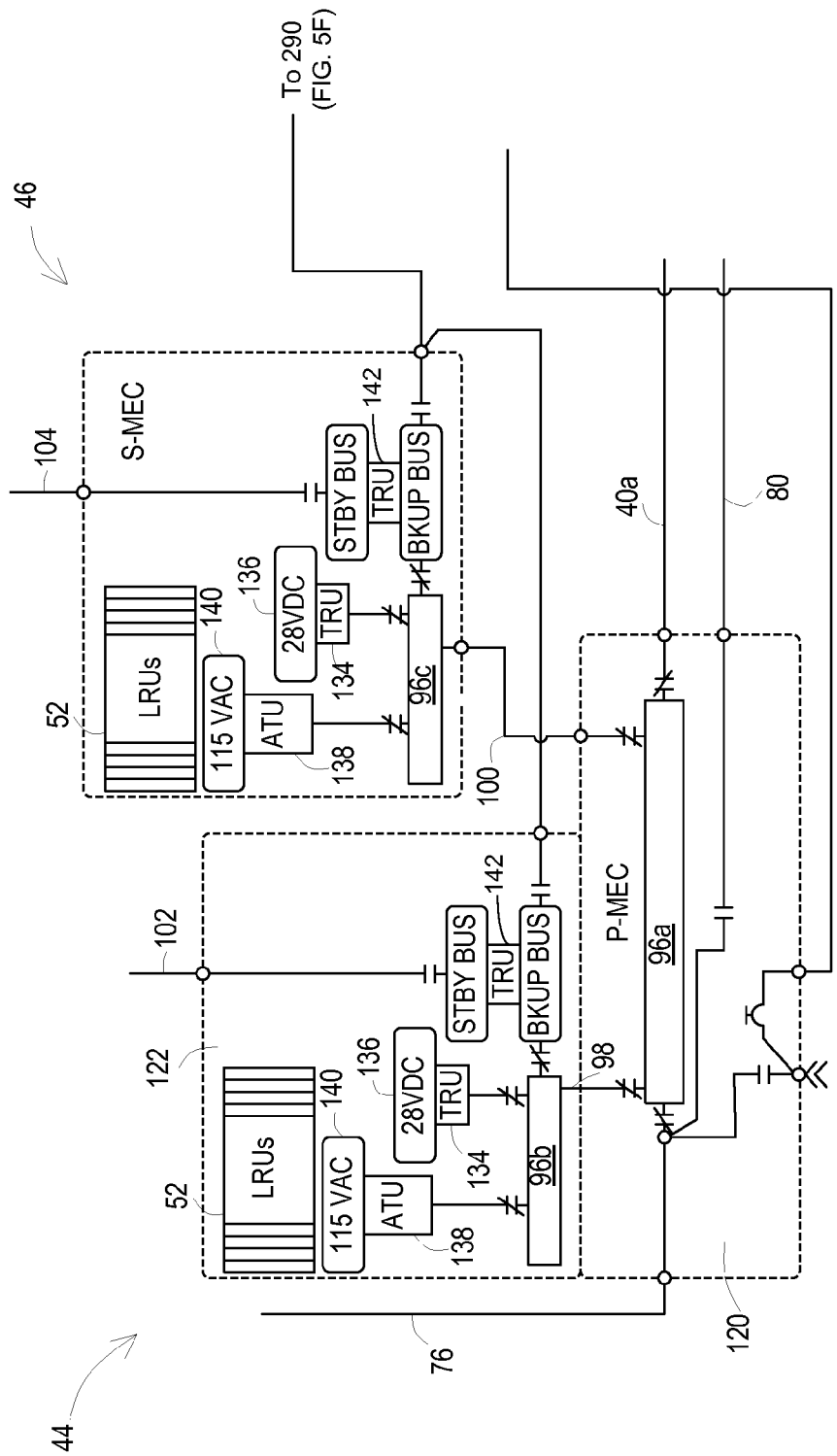
FIG. 4 illustrates one configuration of a primary MEC and a secondary MEC according to at least one embodiment disclosed herein.

Equipment loads 50 may be various electrical loads in an aircraft including, but not limited to, displays, fans, environmental units, and the like. Sometimes an equipment load 50 may be in the form of a line replaceable unit (LRU) 52 (FIG. 4). The equipment loads 50 within each of the aircraft sections 12, 14, 16 are grouped into one or more zones of power and communication. Each zone of equipment loads 50 across multiple systems may be associated with and serviced by the nearest MEC 44, 46. Preferably, each zone of equipment loads 50 is located within a single section and associated with at least one MEC location in the same zone. Preferably, the connecting wires or lines do not cross section breaks 18, 20, 22.

Generally, any equipment load 50 on the aircraft 10 requires both electrical power and communication data. Data is needed to tell the equipment load 50 what to do, or provide feedback about its current status, while electrical power is needed so the equipment load 50 can perform its intended function. If power and data are provided to an equipment load 50 from different equipment centers and if one of either the power or data is lost then the equipment load 50 then has an indeterminable state. To avoid indeterminate states each MEC 44, 46, 48 independently provides both the electrical power and communication data for servicing each of the localized equipment loads 50 within an associated zone. The electrical power and data communication to an equipment load 50 may be synced or grouped together in that both the power and the data communication provided to the equipment load 50 originate from a single source such as the nearest MEC 44, 46, 48. Synced electrical power and communication data is sometimes referred to as a power channel. Each of the equipment loads 50 within a zone may receive power from a particular MEC 44, 46 and therefore the network communication switches providing data to those same equipment loads 50 are powered by that same MEC 44, 46.

The MECs 44, 46, 48 are configured to distribute power received from the main power sources. The MECs 44, 46, 48 may independently convert the primary power into secondary power. Secondary power may be distributed from the MECs 44, 46, 48 to then independently service each of the equipment loads 50 within each zone without a secondary branch power network extending across the section breaks 18, 20, 22. In such case, control and conversion of the primary power may be distributed to each of the primary MECs 44 of each section of the aircraft 10 such that only primary power is distributed across the section breaks 18, 20, 22 amongst the primary MECs 44. In a preferred configuration, only high voltage power feeders and the data backbone cross production breaks.

Distributing only primary power across section breaks 18, 20, 22 reduces the amount of wire required for distributing secondary power across multiple sections of the aircraft 10. This is because the distributed MEC architecture creates a separate secondary power distribution network within each section that allows for shorter runs of secondary wiring. Doing so reduces the overall weight of the wire utilized throughout the aircraft as well as the number of secondary connections required when joining adjacent fuselage sections. Also, because of the shorter secondary power runs, the total loop area of the power feeder run is reduced as compared to an implementation within a current return network. Moreover, aircraft production processes are improved because the secondary power network of wires extending across section breaks are limited or eliminated. The reduction of secondary power wires extending across section break are more readily tested and build quality verified earlier due to reduced reliance on other sections before final assembly of the aircraft 10.

As shown in FIG. 1, primary power feeder 40a extends from generator 34b on the left engine 30 into the middle section 14 to a MEC 44 shown on the left side of the mid section 14, across section break 20 to another MEC 44 shown on the left side of forward section 12, and then to another MEC 44 shown on the left side in front of forward section 12. Primary power feeder 40b extends from generator 34a on the left engine 30 into the middle section 14 to a MEC 44 on the left, across section break 22 to a left aft MEC 44, and then to a left aft MEC 48. Power feeder 42a extends from generator 36a on the right engine 32 into the middle section 14, across section break 20 to a MEC 44 on the right in forward section 12, and then to another MEC 44 on the right in front of the forward section 12. Primary power feeder 42b extends from generator 36b on the right engine 32 into the middle section 14 to middle right MEC 44, across section break 22 to right aft MEC 44, and then to right aft MEC 44. Alternatively, the power feeders 40a, 40b could instead provide primary power to the MECs 44 on the right side of one or more sections of the aircraft 10. In such case, the power feeders 42a, 42b would provide primary power to the MECs 44 on the left side of one or more sections the aircraft 10.

Also, one of the generators 34a, 34b on the left engine 30 could provide primary power to one side of the aircraft forward of a rotor burst zone 38 and the other of generators 34a, 34b on the left engine 30 could provide primary power to the other side of the aircraft 10 aft of the rotor burst zone 38. In such case, one of the generators 36a, 36b on the right engine 32 could provide primary power forward of the rotor burst zone 38 to the opposite side that is powered by one of the left generators 34a, 34b. The other of generators 36a, 36b on the right engine 32 could provide primary power aft of the rotor burst zone 38 to the opposite side powered by the other one of the left generators 34a, 34b.

Figure 2:
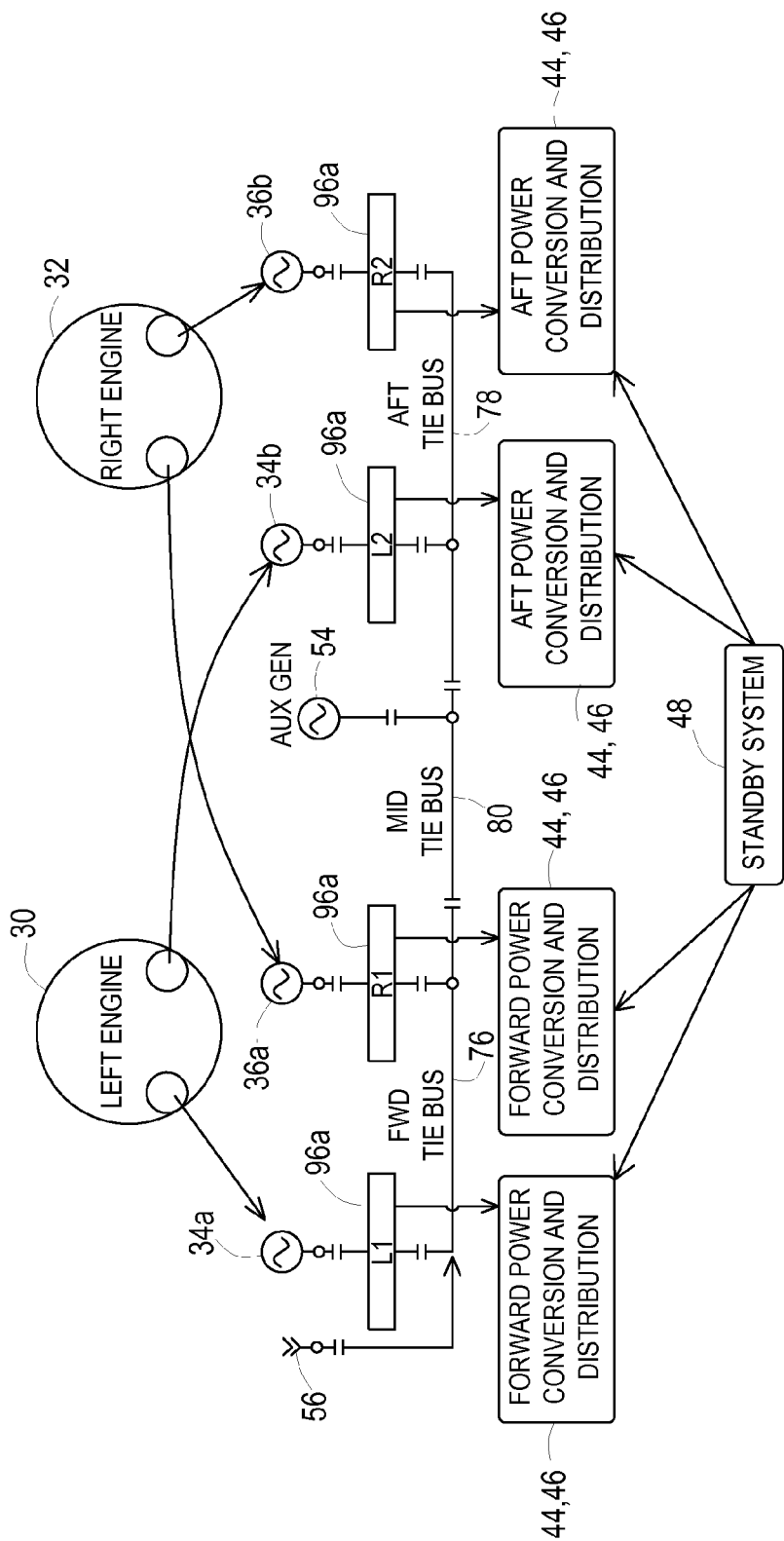
FIG. 2 illustrates the splitting of two generators per aircraft engine relative forward and aft of the aircraft according to at least one embodiment disclosed herein.

FIG. 2 illustrates splitting two generators per engine relative the rotor burst zone 38 of the aircraft 10 which increases the availability of primary power in the event of an operational issue with an engine 30, 32. If one of the engines 30, 32 is lost, or a generator 34a-b, 36a-b within one of the engines 30, 32 fail, the two remaining generators 34a, 34b, 36a, 36b on the remaining engine 30, 32 distribute both forward and aft primary power to the aircraft 10. Generator 34a of the left engine 30 and generator 36a of the right engine 32 power a pair of primary power switching buses 96a forward of the rotor burst zone 38 that are connected to one another by a forward tie bus 76. Generator 34b of the left engine 30 and generator 36b of the right engine 32 power another pair of primary power switching buses 96a aft of the rotor burst zone 38 that are connected by an aft tie bus 78. A mid tie bus 80 connects at least one of the forward primary power switching buses 96a with at least one of the aft primary power switching buses 96a. Therefore, when an engine 30, 32 experiences an operational inconsistency, the aircraft 10 continues to have power and control on one side along the entire length of the aircraft 10 due to the distribution of power from the remaining engine 30, 32 in a forward and aft manner. The power and control is distributed from a single engine 30, 32 both forward and aft of the rotor burst zone 38 without increasing the amount of wiring. FIG. 2 also illustrates the primary power switching buses 96a distributing power to the secondary MECs 46 for power conversion and distribution to equipment loads 50 as explained in greater detail below. A standby MEC 48 may be coupled to the primary MECs 44 and secondary MECs 46 to provide backup power when the primary main AC power sources are not available to the primary power switching buses 96a as explained in greater detail below.

Figure 3:
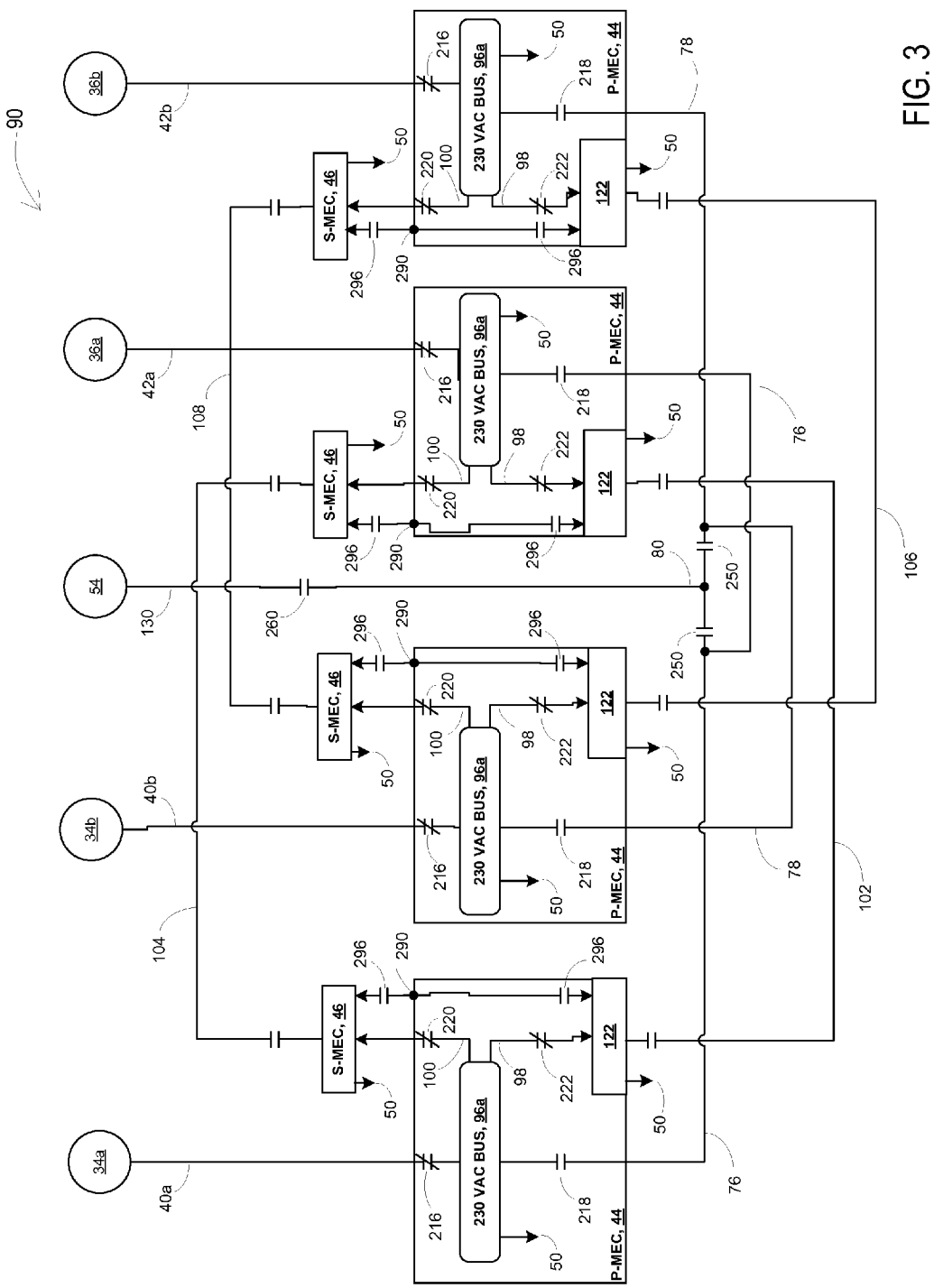
FIG. 3 illustrates one configuration of primary power feeders connected to generators energizing a power bus network according to at least one embodiment disclosed herein.

Un-serviced equipment loads 50 in one or more zones occurs primarily for two reasons. Either all of the generators 34, 36 failed and therefore primary power is no longer available to any of the MECS 44, 46 or one or more of the buses 96 are physically damaged due to an event such as a rotor or tire burst. Rerouting of high voltage power from either of the four generators 34, 36 or auxiliary power unit generator 54 based on failure of one or more main primary power sources occurs at the primary bus level via the tie buses 76, 78, 80 through opening and closing of combinations of switches as shown by the primary power busing network system 90 depicted in FIG. 3. In one or more embodiments, one or more standalone solid state switches, for example contactors, are included on the primary power busing network system 90. The solid state switches each have a self-contained control function configured to provide one or more of localized protections, voltage sensing, and current sensing, independent of the availability of other power system components. The standalone solid state switch can function without the need for data from other power system components. Opening and closing of the solid state switch interrupts and routes primary power across one or more of the primary power switching buses to one or more of the MECs 44, 46, 48. Beginning with FIG. 3, specific contactors are depicted as either primarily closed or primarily open. The symbol for an open contactor is two parallel lines. The symbol for a normally closed contactor is the same with the exception that a diagonal line is drawn through the parallel lines. The standalone solid state switch may also include pulse width modulation to limit current flow through the standalone solid state switch. Rerouting of secondary power and low voltage DC between the MECs 44, 46, 48 based on failure of high voltage buses and conversion occur by the opening and closing of combinations of switches as shown by the power busing network system 90 as depicted in FIG. 3.

Each MEC 44, 46, 48 has both primary and secondary power and is capable of independently performing closed loop processing and local control of sensors without being dependent on a central computer system. The distributed power system control architecture permits sharing of the overall vehicle power distribution status among the MECs 44, 46, 48 but each MEC 44, 46, 48 is only responsible for servicing equipment loads 50 in proximity of each MEC, with the exception of MEC 48 which also distributes standby power to all other MECs 44, 46. Each MEC 44, 46, 48 manages data associated with the zone of the nearest equipment loads 50 such that each MEC 44, 46, 48 independently performs operations within its own zone of equipment loads 50.

Each MEC 44, 46, 48 also preferably has solid state switching for bus power control and also provides circuit protections. In FIG. 3 power from primary power feeders 40, 42 connected to the generators 34, 36 energizes primary power switching buses 96a. Each primary power switching bus 96a branches off to a primary power switching bus 96b within MEC 44 and a primary power switching bus 96c within MEC 46. Each primary power switching bus 96a connected with distribution feed 98 to a primary power switching bus 96b corresponds with a single primary MEC 44 as shown in FIG. 4 and as described in greater detail below.

Referring to FIG. 4, a portion of each primary MEC 44 with a primary power switching bus 96a is a high power portion 120 and another portion of the primary MEC 44 with the primary power switching bus 96b is a low power portion 122 of the primary MEC 44. The high power portion 120 of a primary MEC 44 is configured to receive primary power from any high power main source available to the aircraft 10 and is sometimes referred to as a primary power switching network device 302. The network of high power portions 120 of the primary MECs 44 within the aircraft 10 define a high voltage power busing network system.

The low power portion 122 is preferably configured to handle a fraction of the power from onboard power sources but still be able to handle the same voltages as the high power portions 120. The primary power switching buses 96c correspond with secondary MECs 46 shown in FIG. 4. FIG. 4 best illustrates the similarity between a secondary MEC 46 and the low power portion 122 of a primary MEC 44. Primary MECs 44 include the primary level power network busing structure of primary power switching buses 96a to reroute primary sources across the aircraft 10 that the secondary MECs 46 do not have. During normal as well as abnormal operations, the primary and secondary MECs 44, 46 both have primary and standby power. Secondary MECs 46 service the nearest equipment loads 50 just like a primary MEC 44.

Referring back to FIG. 3, distribution feeds 98 extend between primary power switching buses 96a and 96b of each primary MEC 44 and distribution feeds 100 extend between each bus 96b of the primary MEC 44 and the primary power switching bus 96c of a secondary MEC 46 that directly receives power from the same source. Also, a crosstie 102 extends between the bus primary power switching 96b of the primary MEC 44 associated with left generator 34a and the primary power switching bus 96b of the primary MEC 44 associated with the right generator 36a. A crosstie 104 extends between the primary power switching bus 96c of the secondary MEC 46 associated with left generator 34a and the primary power switching bus 96c of the secondary MEC 48 associated with the right generator 36a. A crosstie 106 extends between the primary power switching bus 96b of the primary MEC 44 associated with left generator 34b and the primary power switching bus 96b of the primary MEC 44 associated with the right generator 36b. A crosstie 108 extends between the primary power switching bus 96b of the secondary MEC 46 associated with generator 34b and the primary power switching bus 96b of the secondary MEC 46 associated with the right generator 36b. Auxiliary power unit generator 54 is connected to the crossties 102, 106, respectively.

Figure 5A:
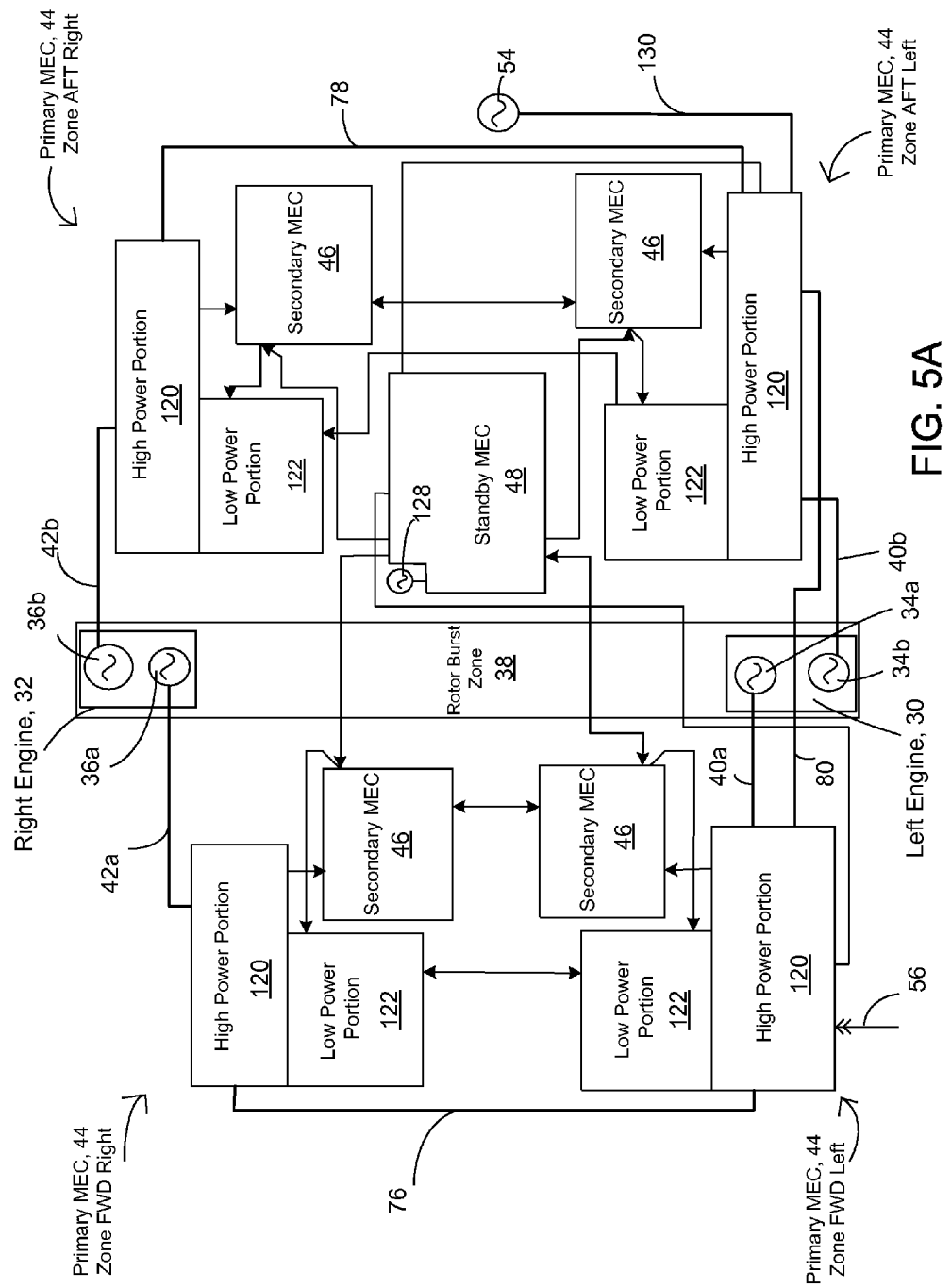
FIGS. 5A-5F illustrate one configuration of a fault tolerant combined primary and secondary power distribution network of primary MECs, secondary MECS, and a standby MEC according to at least one embodiment disclosed herein.
Figure 5B:
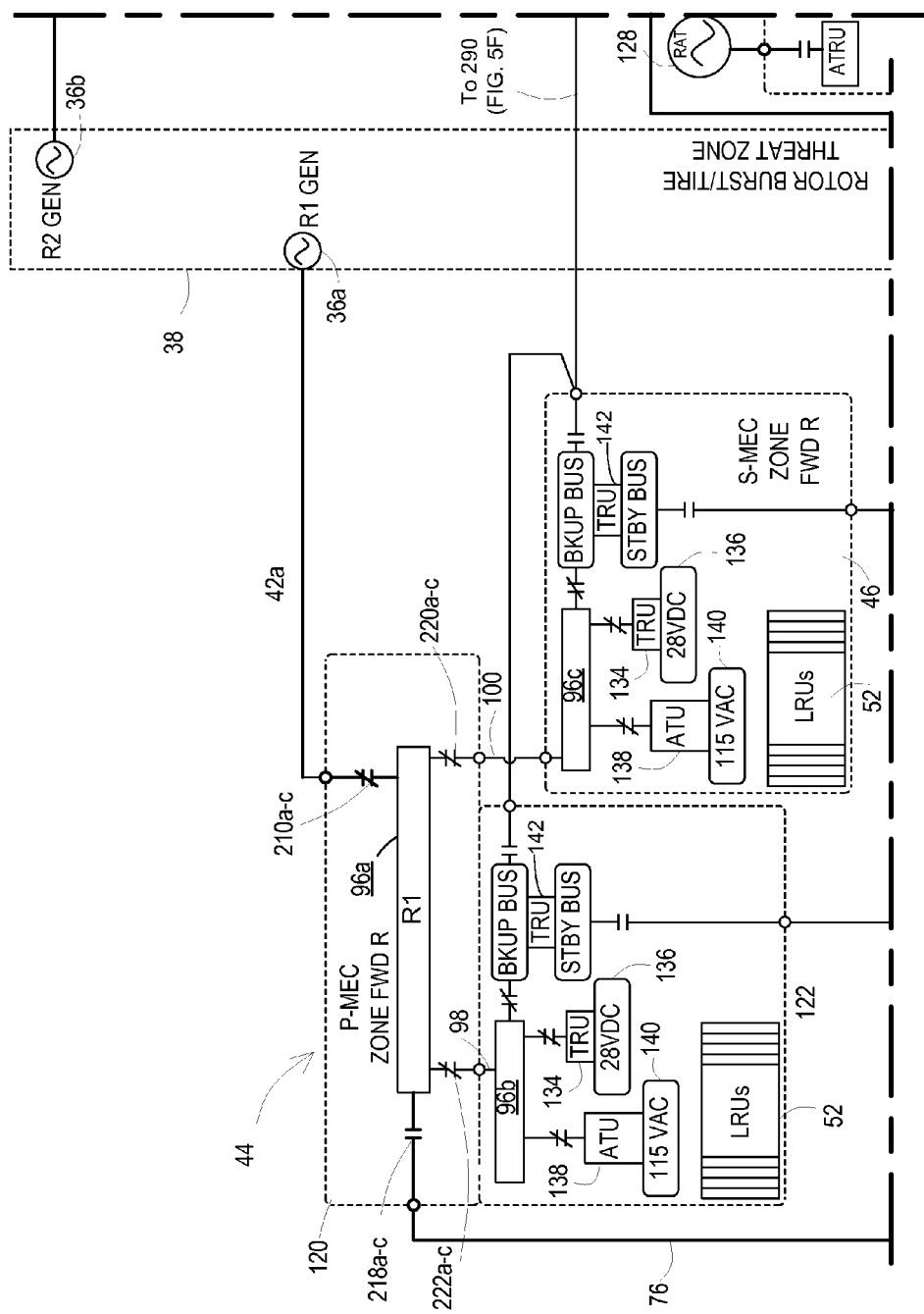
Figure 5C:
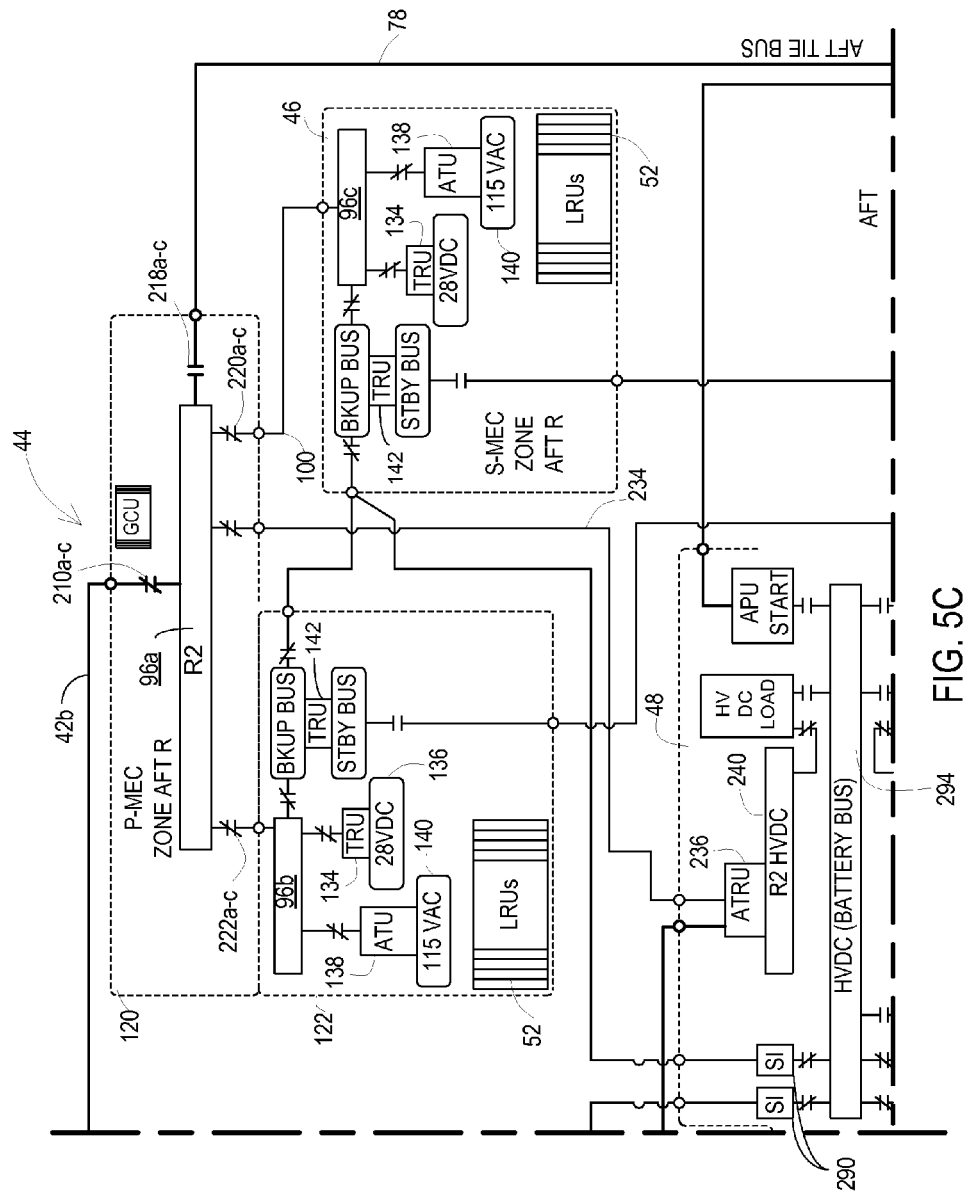
Figure 5D:
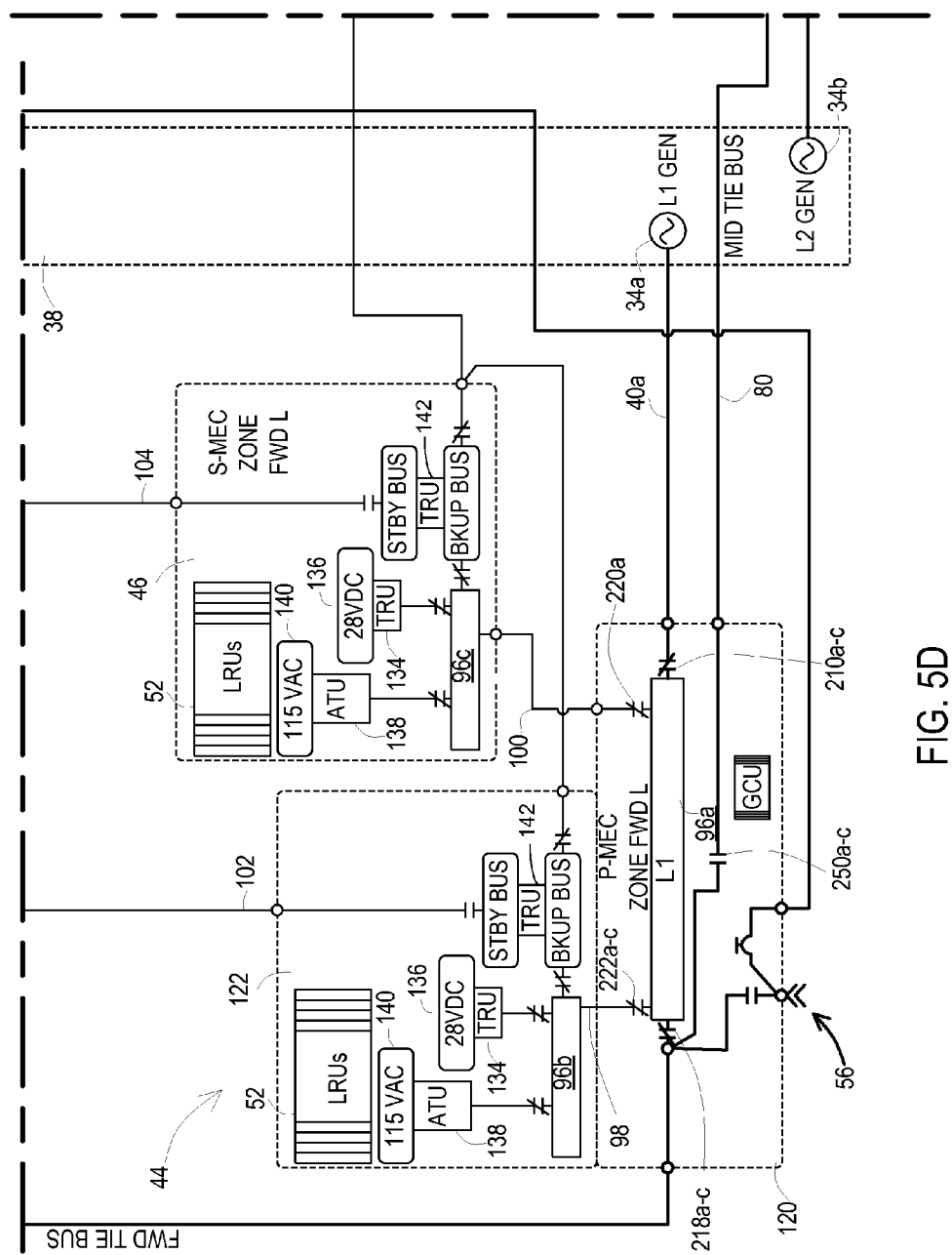
Figure 5E:
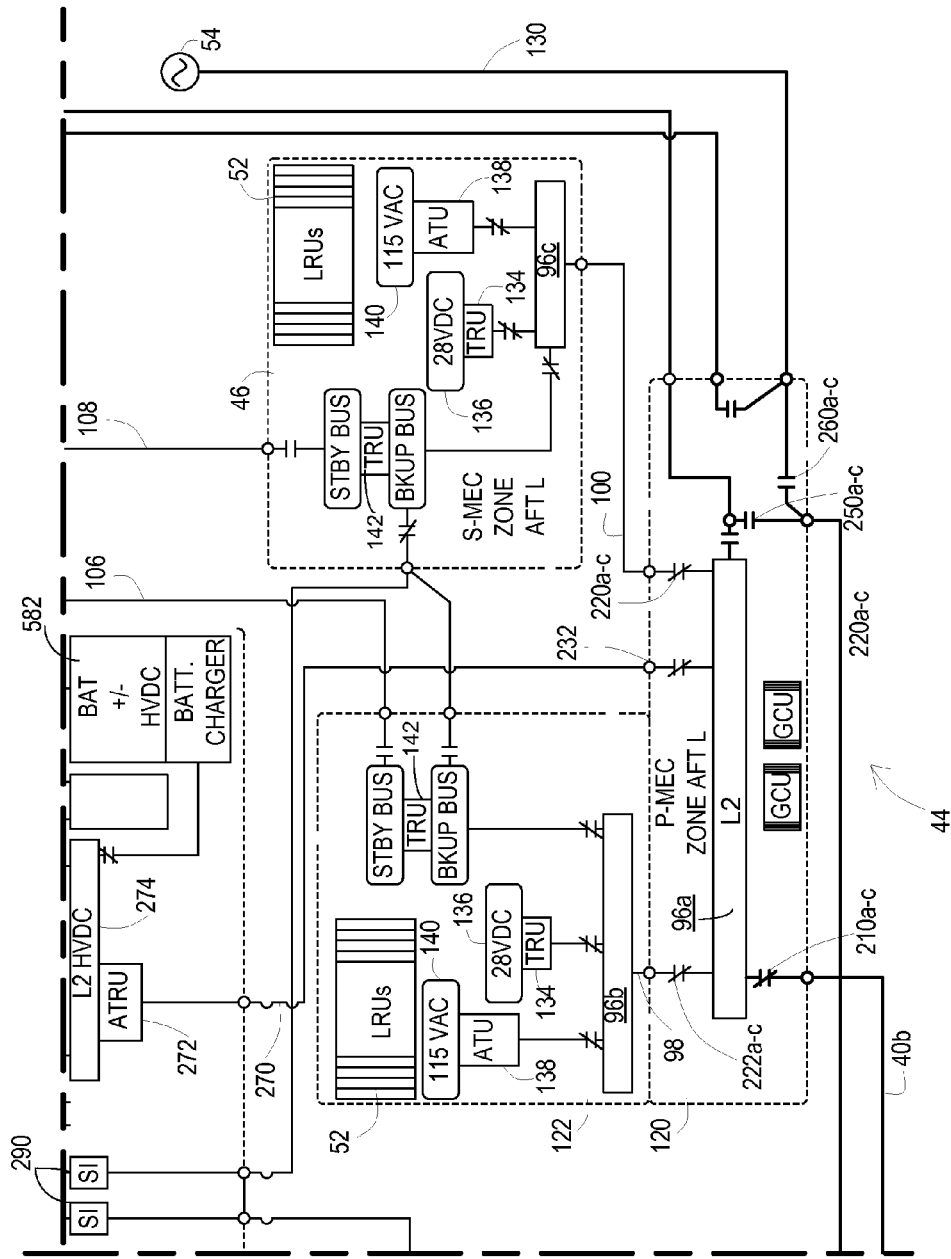
Figure 5F:
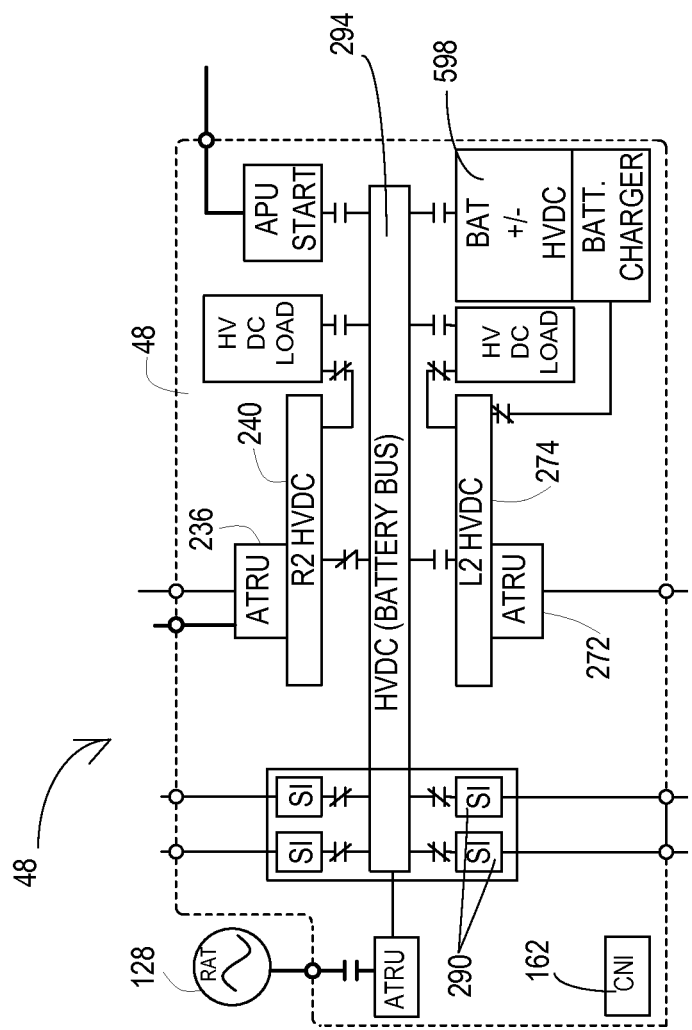

FIG. 5A illustrates one configuration of the fault tolerant combined primary and secondary power distribution networks of primary, secondary and standby MECS 44, 46, 48 within the aircraft 10. For purposes of illustrating greater detail, FIGS. 5B-5E illustrate close-up partial views of four separate portions which can be positioned next to each other to assemble the complete system depicted in FIG. 5A. Two dot-dash lines on each of FIGS. 5B-5E denote the broken edges of each partial view. FIG. 5B illustrates the top left portion of FIG. 5A. FIG. 5C illustrates the top right portion of FIG. 5A. FIG. 5D illustrates the bottom left portion of FIG. 5A and FIG. 5E illustrates the bottom right portion of FIG. 5A. Also, FIG. 5F illustrates one configuration of the standby MEC 48 of the system of FIG. 5A. The contactors shown in FIG. 3 are also shown symbolically in FIGS. 5A-5F, but without reference numbers to simply FIGS. 5A-5F, and may also be shown in other drawings without any reference numbers or having different reference numbers.

In FIG. 5A the primary and secondary MECs 44, 46 are arranged in such a way that there are a total of four in the forward sections of the aircraft 10 and another four in the aft sections of the aircraft 10. Preferably, there is a primary MEC 44 and a secondary MEC 46 in each of a pair of forward sections and a primary MEC 44 and a secondary MEC 46 in each of a pair of aft sections. FIG. 5A also shows a standby MEC 48 in an aft section of the aircraft 10. The non-time limited power source for the standby MEC 48 can be a RAM air turbine (RAT) 128 or other suitable independent time limited standby power source such as a battery or fuel cell. In the event of an operational inconsistency with all the generators 34, 36, the RAT 128 is deployed to provide standby power to standby MEC 48 as well as to one or more of the MECs 44, 46 in the event that all of the generators 34a, 34b, 36a, 36b have an operational inconsistency. The battery 598 provides temporary operational power to standby MEC 48 as well as to one or more of the MECs 44, 46 while the non-time limited RAT 128 is being deployed.

If one of the generators 34a, 34b, 36a, 36b fails, power is not being received at the primary power switching bus 96a of a primary MEC 46. Therefore, the equipment loads 50 off of the lower power portion 122 of the primary power switching bus 96b of the unpowered primary MEC 44 are unserviced and the equipment loads 50 off of the primary power switching bus 96c of an unpowered adjacent secondary MEC 46 are unserviced. Power is then rerouted at the primary level from one of the other remaining operational sources by opening and closing of combinations of contactors to energize primary power switching bus 96a of unpowered primary MEC 44 to power its equipment loads 50 and to energize primary power switching bus 96c of any unpowered adjacent secondary MEC 46 to power its equipment loads 50.

Alternatively, if a MEC 44, 46, 48 experiences a physical failure and as result its equipment loads 50 are unpowered, then power may be rerouted to power the equipment loads 50 of the unpowered MEC 44, 46, 48 by another powered MEC 44, 46, 48. Depending on the amount of power available to be rerouted, all or only a portion of the equipment loads 50, such as only the critical loads, may be repowered. Also, if all power sources are lost and the MECs 44, 46, 48 are unpowered, then the standby MEC 48 with the fuel cell or RAT 128 can power the critical equipment loads 50 of the other MECs 44, 46. Critical loads are those equipment loads 50 that the aircraft 10 must have powered to maintain continued safe flight and landing. Essential loads are those equipment loads 50 that are desirable to have such as radios and other communications equipment but operation is not required to fly the aircraft 10. Non-essential loads are the lowest priority equipment loads 50 such as passenger comfort loads including food preparation devices, decorative lighting and cabin entertainment systems.

By way of example, the auxiliary power unit generator 54 could service the equipment loads 50 lost due to the failure of one of the main generators 34, 36. If generator 34b fails then, through a combination of contactors in forward tie bus 76, aft tie bus 78, mid tie bus 80, primary power is provided directly from the remaining main generators 34, 36. Alternatively, primary power may be provided from the auxiliary power unit generator 54 through another operational MEC 44, 46 across one or more of the crossties 102, 104, 106, 108, to the primary power switching bus 96a of an unpowered primary MEC 44 or to the primary power switching bus 96c of an unpowered secondary MEC 46.

In the event one or more of the MECs 44, 46 has a physical operational inconsistency, all or part of the plurality equipment loads 50 within the zone associated with each operationally inconsistent MEC 44, 46 can be associated with one or more other MECs 44, 46 that are nearest in proximity. For example, if a primary MEC 44 physically fails, the equipment loads 50 once serviced by that failed MEC 44 may be serviced by another MEC 44, 46 or a combination of MECs 44, 46. MECs 44, 46 can determine the types of equipment loads 50 once serviced by the failed MEC 44 and then determine whether one or more of the combination of MECs 44, 46 should service those unpowered equipment loads 50. If it is determined that a secondary MEC 46 in closest proximity to the failed primary MEC 44 is to service the additional equipment loads 50 then the zone originally associated with that secondary MEC 46 is expanded to encompasses the zone formerly serviced by failed primary MEC 44.

Alternatively, the additional equipment loads 50 may be divided between a secondary MEC 46 and another primary MEC 46 in proximity to the failed primary MEC 46. In such case, the zone of equipment loads 50 associated with the nearest operational primary MEC 44 is expanded to include a portion of the zone formerly serviced by failed primary MEC 44 and the zone of equipment loads 50 associated with the nearest operational secondary MEC 46 is expanded to include the remaining portion of the zone formerly serviced by failed primary MEC 44. In either case, one or more other MECs 44, 46 in proximity of a failed MEC 44, 46 are sourced to independently provide the services to the equipment loads 50 previously serviced by the failed MEC 44, 46.

Each secondary MEC 46 and each low power portion 122 of each primary MEC 44 includes contactors coupled to conversion equipment. The conversion equipment includes a transformer rectifier unit (TRU) 134, which rectifies the 230 VAC and converts it to the main DC output such as 28 VDC for bus 136, and an autotransformer or auto-step down transformer unit (ATU) 138 to convert 230 VAC to 115 VAC for a low power AC output bus 140. Each secondary MEC 44 and low power portion 122 of a primary MEC 44 further includes a second TRU 142, not just for redundancy, but to provide power only to the critical loads absolutely necessary for continued safe flight and landing. Limiting the second TRU 142 to only critical loads ensures that the standby power sources are not overloaded.

Figure 6:
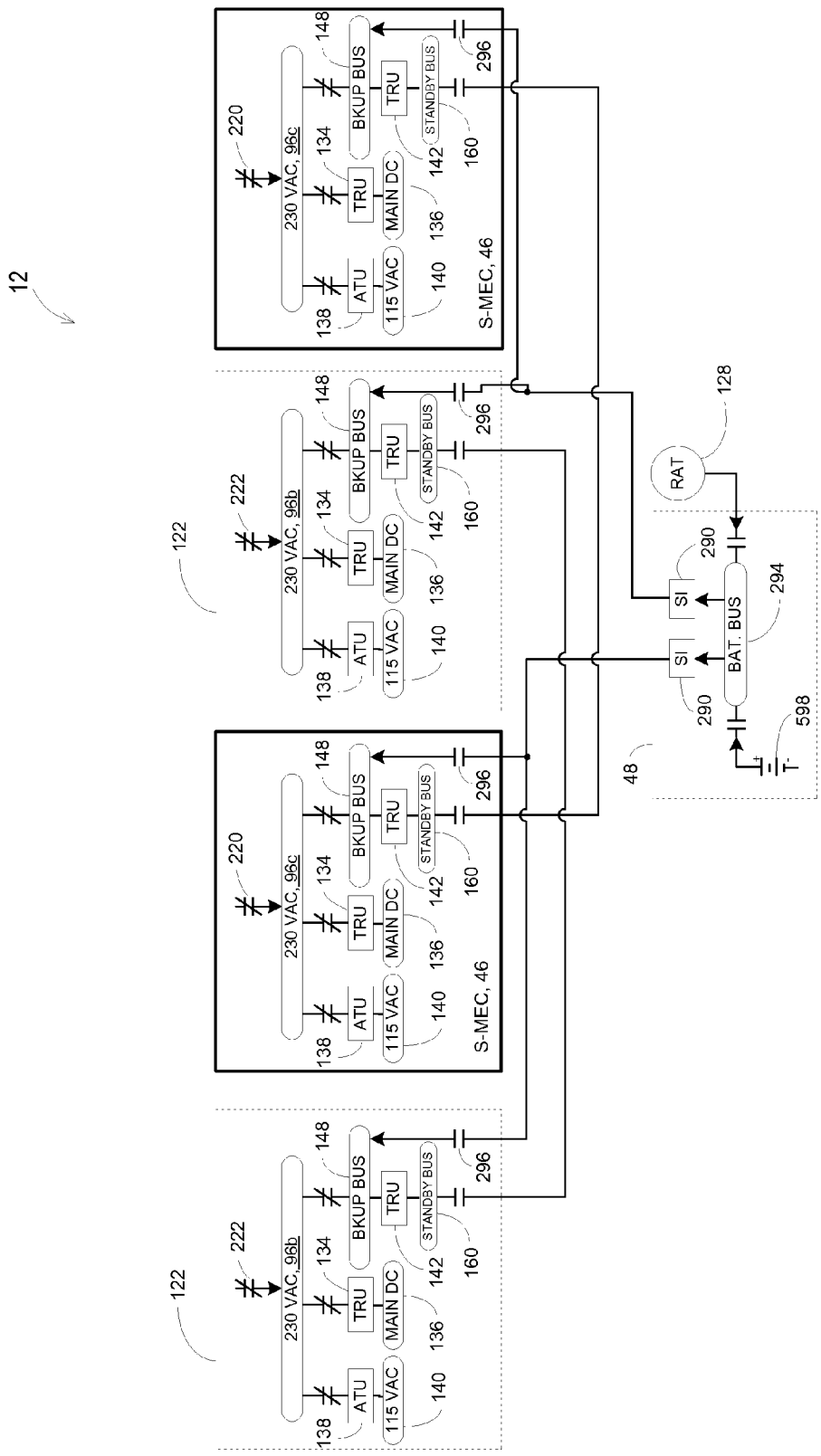
FIG. 6 illustrates one configuration of a secondary power busing network in a forward section of the aircraft according to at least one embodiment disclosed herein.

FIG. 6 illustrates the configuration of a secondary power busing configuration, in forward section 12 for example, where the primary power switching buses 96b in the low power portions 122 of the primary MECs 44 and the primary power switching buses 96c of the secondary MECs 46 are tied together. As described above, whether all or only a portion of the unpowered equipment loads 50 of a damaged MEC 44, 46 are serviced by another MEC 44, 46 depends on available power. In the event one of the TRUs 134 in one of the MECs 44, 46 within an aircraft section fails, the most critical of equipment loads 50 from the operationally inconsistent TRU 134 may be serviced by another MEC 44, 46 in that same aircraft section providing secondary power across the various contactors and backup buses 148.

Preferably MECs 44, 46 in the aft section 16, have secondary power tie-ins from the auxiliary power unit generator 54 due to their proximity to one another which minimizes the power feeder wire weight. Also, the MECs 44, 46 in the forward section 12 of the aircraft 10 tie in at lower voltage levels such as 115 VAC from the external power ground service equipment such as external power unit 56 as shown in FIGS. 2 and 6. However, the 115 VAC from the ground to the low power AC output buses 140 in the MECs 48 in the forward section 12 could be converted to higher voltages such as 230 VAC by bi-directional ATUs 138 which then may be distributed to the other MECs 44, 46 in other sections of the aircraft 10. Also, a second TRU 142, typically used for more critical loads as explained above, allows battery power from battery bus 294 via backup bus 148 to power those critical loads that were lost.

Figure 7:
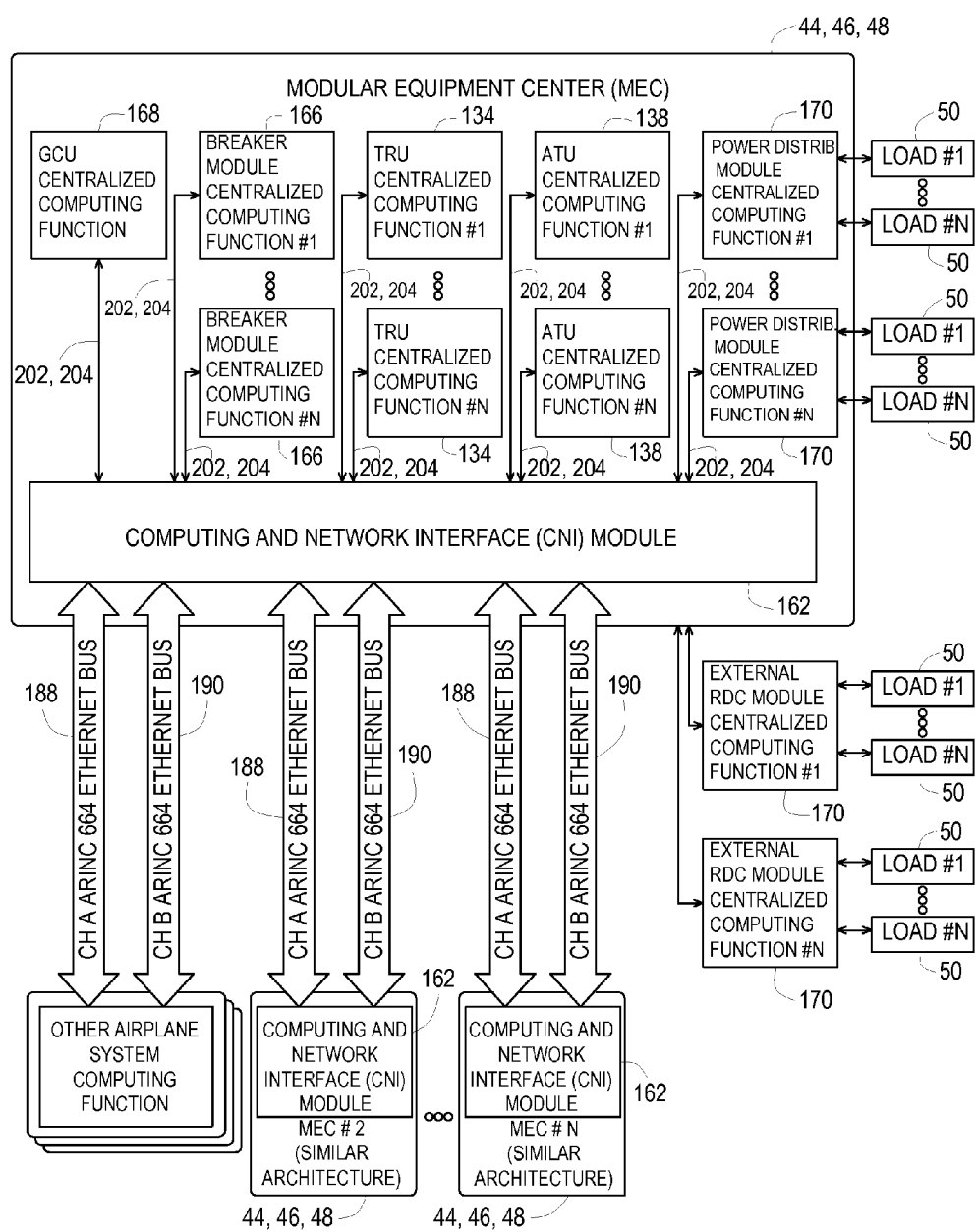
FIG. 7 illustrates one configuration of a MEC for servicing equipment loads and having a computing and network interface module for distributed computing functions and gateway routing of bi-directional data between MECs according to at least one embodiment disclosed herein.

As shown in FIG. 7, a computing (software and hardware) and network interface (CNI) module 162 located inside each MEC 44, 46, 48 provides distributed computing functions and gateway routing of bi-directional data. Each CNI module 162 contains two failsafe computing systems that become a fault tolerant computing system. Each fail safe computing system is redundant to the other. This fault tolerant computing system responds gracefully to unexpected hardware and/or software failures to allow no loss of service to system functions within the aircraft 10. The CNI module 162 transmits/receives data to/from internal MEC computing functions and external MEC computing functions via an internal system communication bus (such as Flex-Ray, Controller Area Network (CAN), ARINC 664, TTP or other bus technology). Other MECS 44, 46, 48 on the aircraft 10 will communicate with the CNI module 162 via a data networking specification, such as the ARINC 664, across external data communication channel A and external data communication channel B as shown in FIG. 7 having reference numbers 188 and 190, respectively.

The CNI module 162 is a distributed computing element that hosts specific software applications used within that localized zone of the aircraft 10. Some examples of the system applications that can be hosted on the CNI module 162 are the AC and DC power systems, cargo door system, passenger entry door system, landing gear system, and passenger cabin system. The computing functions that communicate to the CNI module 162 are TRUs 134, TRUs 142, ATUs 138, solid state switches of a breakers module 166, a generator control unit GCU 168 associated with one of the generator 34, 36, solid state power distribution modules 170, and remote data concentrators. The CNI module 162 communicates internally within the MEC 44, 46, 48 across internal data channel A 202 and internal data channel B 204 to the TRUs 134, 142, the ATUs 138, the breaker modules 166, the GCU 168, and the power distribution modules 170 as described in greater detail below.

The CNI module 162 will transmit and receive data to/from these computing functions. The CNI module 162 will also transmit and receive the status and health from other MECs 44, 46, 48 and aircraft computing systems. Each CNI module 162 manages the workload of an individual MEC 44, 46, 48 with knowledge of what is going on in other MECs 44, 46, 48. Once the information has been received by the CNI module 162 of a MEC 44, 46, 48, its computing function will determine which system needs the data, interpret the health of the data, respond to any power system anomalies, supply time sensitive information to computing functions that need it, perform system level logic algorithms, report airplane level system faults, and control the distribution of AC and DC power for that zone.

Figure 8:
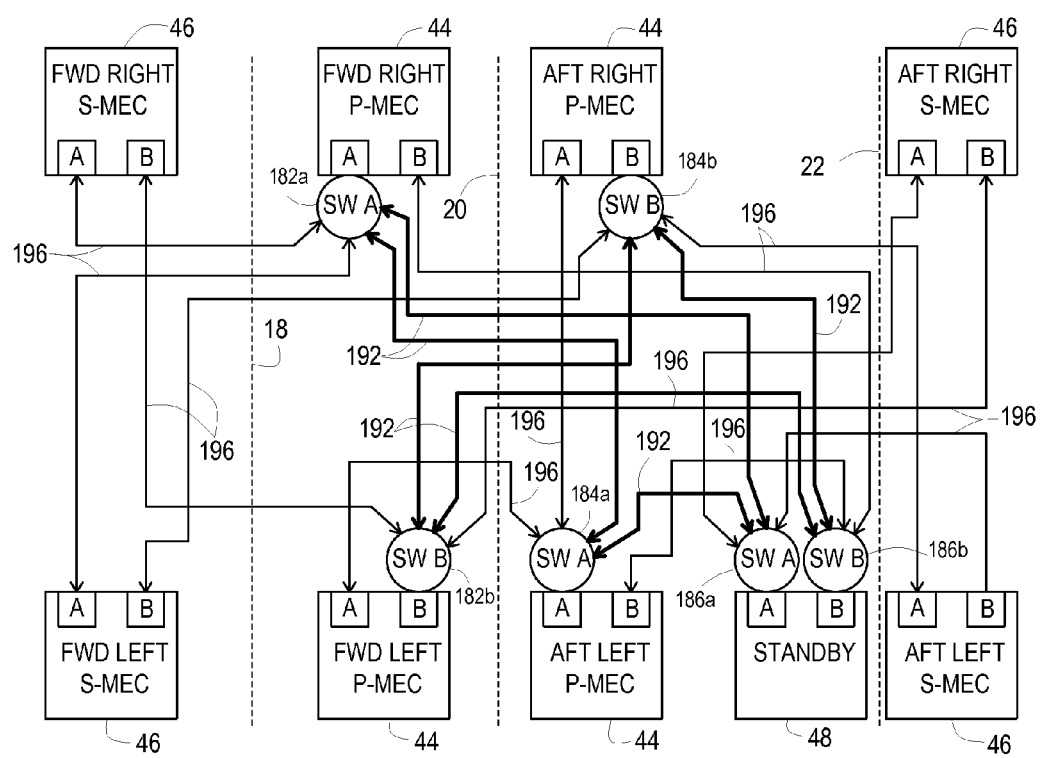
FIG. 8 illustrates one configuration of a data network structure with communication bus interfaces between spatially distributed MECs separated by section breaks according to at least one embodiment disclosed herein.

FIG. 8 illustrates the data network structure with communication bus interfaces between the spatially distributed MECs 44, 46, 48 separated by section breaks 18, 20, 22. This configuration allows each individual MEC 44, 46, 48 to communicate with other MECs 44, 46, 48 as well as provide the redundancy required to ensure continued communication across failures. Section break 20 defines forward and aft sections of the aircraft. The number of network communication switches needed is determined by the number of MECs 44, 46, 48 and the desired fault tolerance. FIG. 8 illustrates nine MECs 44, 46, 48 with three pairs of network switches 182*a-b*, 184*a-b*, 186*a-b* (hereinafter may be referred to collectively and/or generically as "network switches 182, 184, 186"). Each network switch 182, 184, 186 may be a multilayer network switch such as a layer-3 network switch that can receive secondary electrical power from the CNI modules 162 of each of the interfacing MECs 44, 46, 48. If there were more MECs 44, 46, 48 then more network switches would be required to achieve the same level of fault tolerance.

Each MEC 44, 46, 48 has A and B communication channels. Channels A and B of each primary MEC 44 connects to two corresponding A or B switches on either another primary MEC 44 or on a standby MEC 48. Each primary MEC 44 includes one switch 182, 184, 186 on either channel A or channel B, while standby MEC 48 in an aft section of the aircraft includes both switches of a pair of switches 182, 184, 186 on both A and B channels. Switches 182*a*, 184*a*, 186*a* correspond with channel A and switches 182*b*, 184*b*, 186*b* correspond with channel B. External communication data lines 192 indicate switch to switch data lines.

Generally, a network switch on each primary MEC 44 on one side of the section break 20 is connected to two other network switches of other primary or standby MECs 44, 48 where at least one of those MECs 44, 48 is on the other side of the section break 20 and one is on the opposite side of the aircraft 10. For example, network switch 182*a* of the forward right primary MEC 44 that is forward of the section break 20 is connected on the other side of the section break 20 to both network switch 184*a* on the aft left primary MEC 44 and to network switch 186*a* on the standby MEC 48. Network switch 182*b* on the forward left primary MEC 44 that is forward of the section break 20 is connected on the other side of the section break 20 to both network switch 184*b* on the aft right primary MEC 44 and to network switch 186*b* on the standby MEC 48. Network switch 186*b* on the standby MEC 48 is also connected to network switch 184*b* on the opposite side of the aircraft 10. Network switch 184*a* is also connected to network switch 186*a* of the standby MEC 48.

Each of the secondary MECs 46 also has two data channels with two other primary or standby MECs 44, 48. External communication data lines 196 indicate data connections of a network switch of a primary MEC 44 directly to a secondary MEC 44. One of the channels of each secondary MEC 48 is connected to a network switch on the same channel of a primary MEC 48 on the other side of the section break 20 and the other channel is connected to another secondary MEC 46. Therefore, FIG. 8 shows eight data bus connections crossing section break 20 and four data bus connections crossing each of the section breaks 18, 22. This configuration minimizes the amount of communication wiring across section breaks as well as the overall weight of wiring in the aircraft. Separation is maintained between each data bus by utilizing the space in the crown and the floor of the aircraft 10. Healthy CNI modules 162 can optimally respond to changing configurations of the power system in a coordinated fashion by utilizing local environment information and communications from other healthy CNI modules 162.

If any two MECS 44, 46, 48 are powered then the communication network will be active and data will be present so that those two MECS 44, 46, 48 can fully communicate with each other. This communication network is a fault tolerant network in that any one connection between a pair of MECs may be lost without reducing any MEC 44, 46, 48 functionality. Moreover, loss of any two communication connections at the same time between the MECs 44, 46, 48 at most results in the loss of data communication with only one of the MECs 44, 46, 48.

For example, loss of the network switch 182a on channel A of the forward right primary MEC 44 does not result in complete loss of communications to and from the forward right primary MEC 44 because communications to and from forward right primary MEC 44 may continue through channel B. Any other MECs 44, 46, 48 which had communicated via channel A with the forward right primary MEC 44 can directly communicate through channel B or via other MECs 44, 46, 48 that are connected to forward right primary MEC 44 via channel B. Also, if network switch 182a on channel A of the forward right primary MEC 44 was lost in addition to the channel B connection to the forward right secondary MEC 44, communications to and from the forward right primary MEC 44 would continue via channel B but then communications would be lost only with the forward right secondary MEC 44 because both channels A and B were lost.

One aspect of the present disclosure is distributed power control architecture. Power control is distributed to each MEC 44, 46, 48 as well as power itself. Based on the local data each individual MEC 44, 46, 48 collects, each MEC 44, 46, 48 performs its own power control of its associated zone to configure its own equipment loads 50 without having to rely on any other MECs 44, 46, 48. Only the data that is really necessary, such as the need to reroute power, is sent to the CNI modules 162 of other MECs 44, 46, 48.

Normal power up of an aircraft 10 on the ground is preferably a sequential power up of the MECs 44, 46, 48. Normal power up is done via the battery 598 which powers all the standby buses 160 in MECs 44, 46 via the static inverter 290 and the backup bus 148. Should the battery 598 not be available, a limited amount of exterior power from the external power unit 56 is sent to power up the standby MEC 48. Once the standby MEC 48 is powered up, power is then distributed from the standby MEC 48 to each of the other primary and secondary MECs 44, 46 to power up their CNI modules 162 and configure contactors within each MEC 44, 46 as appropriate with the power sources that are available. On the other hand, a sequential power up is not utilized if a MEC 44, 46 becomes unpowered during normal flight operations. If the CNI module 162 in one of the MECs 44, 46 has no primary power, the low power interconnection between two MECs 44, 46, such as a primary MEC 44 and a secondary MEC 44 with a distribution feed 100, provides a means to still power the unpowered MEC 44, 46 as explained above.

The CNI module 162 reads input/output communications from other systems or LRUs as well as configuration data from other MECs 44, 46, 48. Broadcasting each MEC's 44, 46, 48 configuration data allows each of the other MECs 44, 46, 48 to determine what is going on elsewhere in the aircraft 10. The CNI module 162 then uses this data to configure breakers and contactors within its MEC 44, 46, 48 and then writes configuration data onto channel A or B about the equipment loads 50 within its zone to broadcast to the other MECs 44, 46, 48 so that other MECs 44, 46, 48 can do the same. Each CNI module 162 checks the validity of the communications input/output and environmental data it receives and, if necessary, refines it to determine its own environment data and states of its breakers. Once the CNI module 162 figures out how it wants to command its breakers and contactors within its zone, it then sends its configuration data out to the other MECs 44, 46, 48.

The CNI module 162 of each MEC 44, 46, 48 only controls the equipment loads 50 within the boundaries assigned to that MEC 44, 46, 48. Each CNI module 162 of a particular MEC 44, 46, 48 does not set the equipment load configuration of other MECs 44, 46, 48 or decide how to configure their breakers or contactors. However, all the MECs 44, 46, 48 still may interact with one another to provide a coherent and unified power transfer function for the primary and secondary power systems of the aircraft 10. The CNI modules 162 of MECs 44, 46, 48 that are functioning properly are able to react to a MEC 44, 46, 48 that has operational issues and reroute power across power tie buses 76, 78, 80, distribution feeds 98, 100 and crossties 102, 104, 106, 108 even in conjunction with additional failures. The computing and networking architecture is both fail safe and fault tolerant. If a CNI module 162 has an operational issue, all of its connected load will enter a predefined default "fail safe" state. Adjacent CNI modules 162 do not have the capacity or authority to control other equipment loads outside of their zone.

Figure 9:
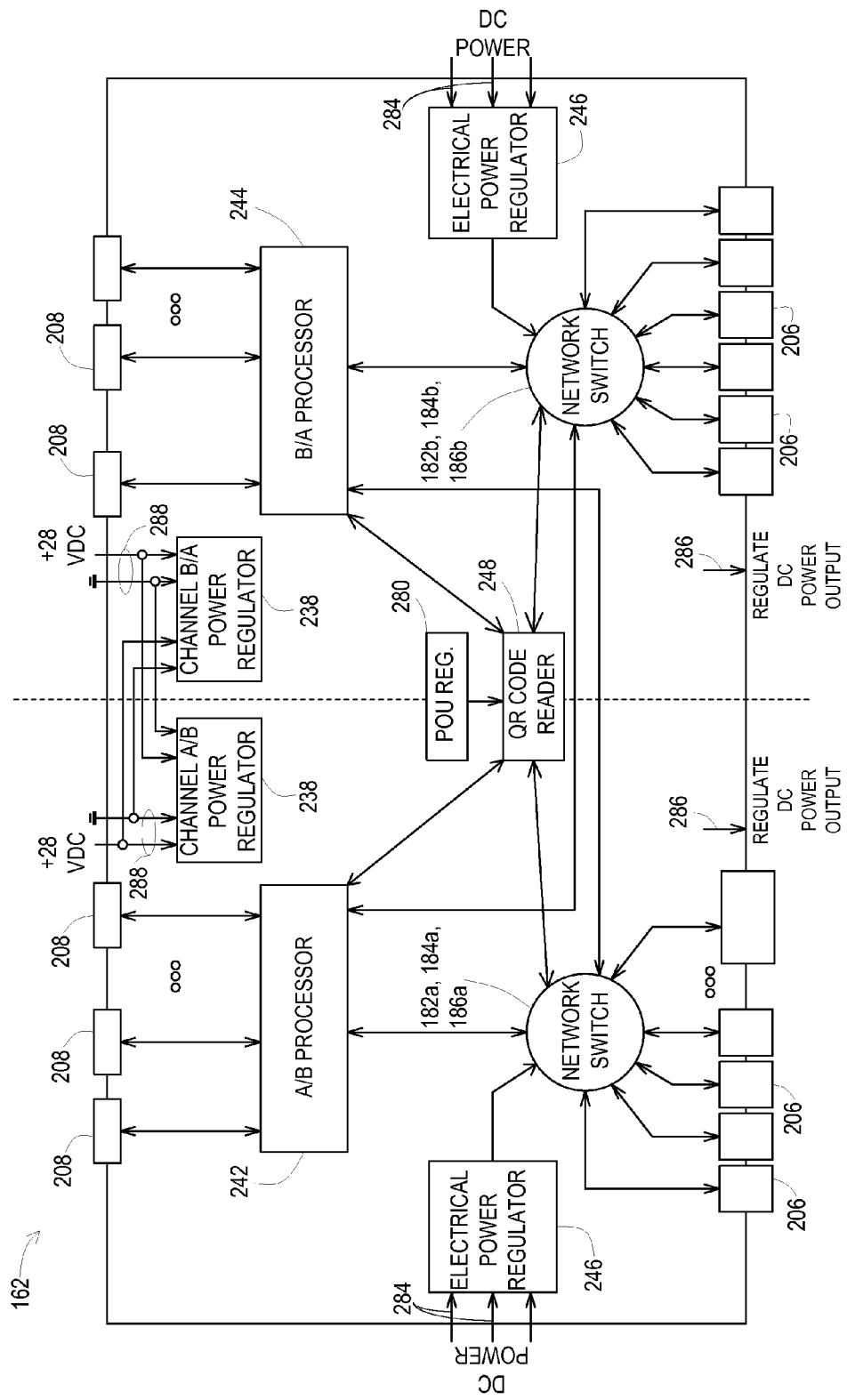
FIG. 9 illustrates one configuration of the computing and interface module for distributed computing functions and gateway routing of bi-directional data according to at least one embodiment disclosed herein.

The CNI module 162 shown in FIG. 9 includes one network switch 182a, 184a, 186a on one side of the CNI module 162 corresponding with channel A and another network switch 182b, 184b, 186b on the other side corresponding with the channel B. Both network switches 182, 184, 186 have one or more ports 206 for making external data communication connections. Each side of the CNI module 162 also has one or more ports 208 for making internal data communication connections within the MEC 44, 46, 48 as described in greater detail below. The CNI module 162 includes two multi-core processors 242, 244 for running multiple instructions associated with processing channel A and channel B data communications. Each processor 242, 244 can process instructions for receiving and transmitting communication data within a MEC 44, 46, 48 at ports 208 or for receiving and transmitting communication data outside of the MEC 44, 46, 48 with either network switch 182, 184, 186 through the ports 206. One of the processors 242, 244 on one side of the CNI module 162 corresponds with one communication channel and the other processor 244 on the other side of the CNI module 162 corresponds with the other communication channel. However, each processor 242, 244 has a crossover to the other network switch 182, 184, 186 for the other communication channel so that each processor 242, 244 can read and process both channel A and B communications.

Each component or LRU 52 placed on a truss system of a MEC 44, 46, 48 such as the CNI module 162 may include a barcode reader 248 for optically reading labels. The barcode reader 248 may be a quick response (QR) code reader for reading QR codes. Barcodes (not shown) may be placed in the MEC, 44, 46, 48 or elsewhere in the aircraft 10 in proximity of the barcode reader 248. The barcode reader 248 reading barcodes allows the MEC 44, 46, 48 to input information such as identification, position, time tracking and other configuration information to set software parameters of the CNI module 162 of the MEC 44, 46, 48. For example, the barcode reader 248 may read the position of the CNI module 162 so that the MEC 44, 46, 48 knows which section or which side of the aircraft 10 it is located in. Also, determining the location of the CNI module 162 allows the MEC 44, 46, 48 to determine the nearest equipment loads 50. The configuration information may also be transmitted to other MECs 44, 46, 48, elsewhere in the aircraft 10, or a central facility outside of the aircraft 10 such as a maintenance facility.

Based on how much power is distributed from the MEC 44, 46, 48, the CNI module 162 may require one or more additional power inputs 288, such as 28 VDC or 115 VAC, and power regulators 238, from one or more transfer layers of a truss system as explained below. For example, 28 VDC is input to point of use regulator 280 for the barcode reader 248. Each CNI module 162 also receives one or more DC power inputs 284 from power outputs 286 of the CNI modules 162 of one or more other MECs 44, 46, 48 to power one or both network switches 182, 184, 186. Power inputs 284 and power regulators 246 provide redundancy to prevent a single power failure from taking down any of the processing or communication channels.

If there is a complete loss of power to a MEC 44, 46, 48 at inputs 288 from a transfer layer of the truss system, then the MEC 44, 46, 48 with the CNI module 162, network switches 182, 184, 186, the power regulators 246, and the barcode reader 248, may still be powered. Because of the one or more DC power inputs 284 routed from redundant power outputs 286 of other CNI modules 162 of other MECs 44, 46, 48, the CNI module of the unpowered MEC 44, 46, 48 never loses power and is able to reroute power from an adjacent MEC and then powers up one or more transfer layers of its own MEC 44, 46, 48. The MEC 44, 46, 48 can then still service some or all of its equipment loads 50 and the CNI module 162 remains fully functional and can communicate with other CNI modules 162 thereby keeping truss system of the MEC 44, 46, 48 and the communications network active.

Figure 10:
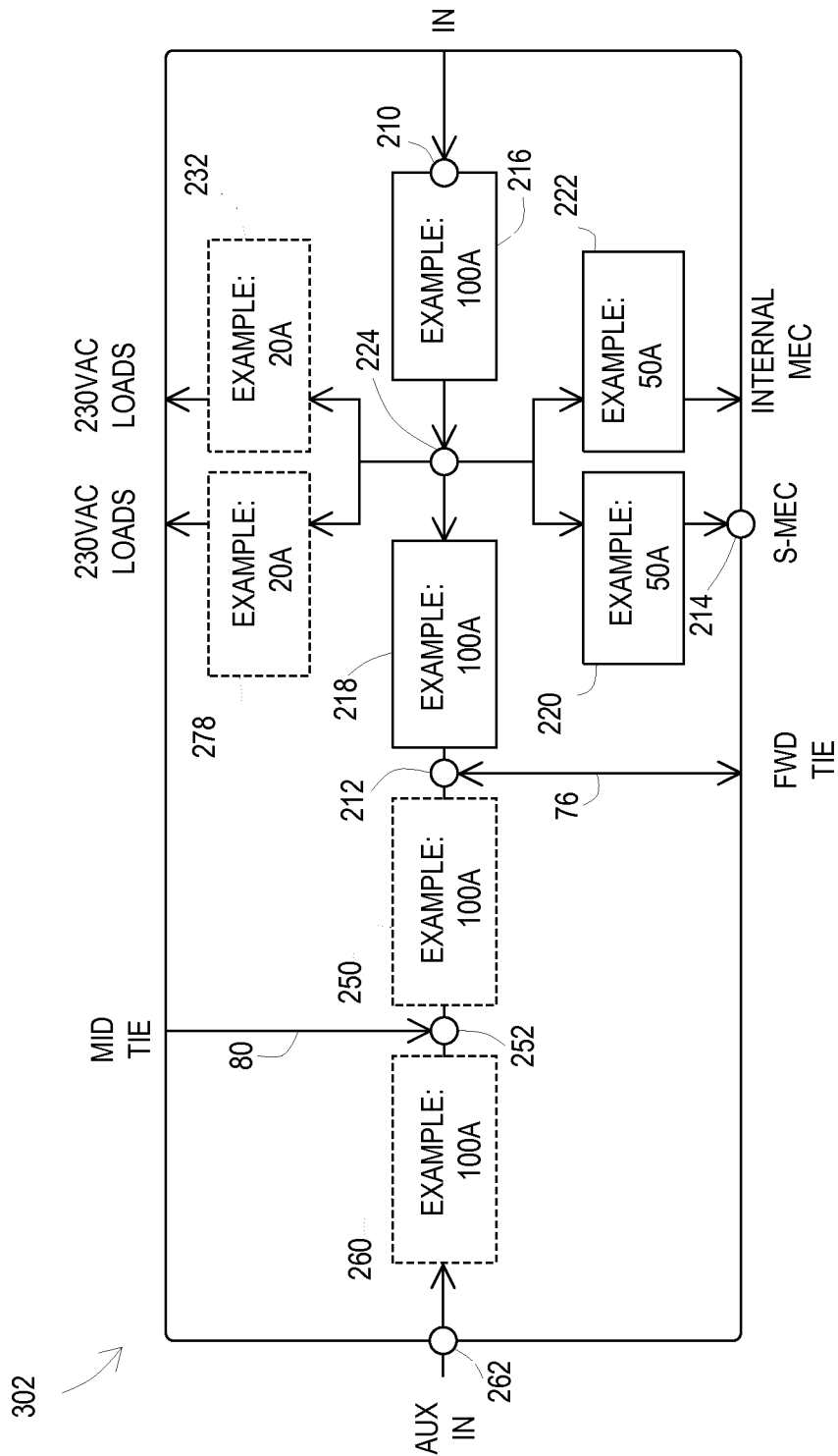
FIG. 10 illustrates a common structure and layout of a primary power switching network device having a common power input source and a plurality of common power outputs for use with the primary MECs according to at least one embodiment disclosed herein.

A primary power switching network device (PPSND) 302 is shown in FIG. 10 with optional contactors 232, 250, 260, 278 for various loads based on the primary power switching configuration and where the MEC 44 is within an aircraft 10 as explained above. Each PPSND 302 corresponds with the high power portion 120 of each primary MEC 44 and is configured to share common sources and outputs with options for additional contactors 232, 250, 260, 278 for receiving primary power directly from a standby MEC 48 or for receiving primary power from auxiliary power unit generator 54 which are connected via the forward, aft and mid tie buses 76, 78, 80 as needed. As shown in FIG. 5C the high power primary power switching bus 96a of aft right primary MEC 44 is connected to the standby MEC 48 with tie 234.

Each PPSND 302 includes a primary power connection 210 from one of the main generators 34, 36, and a connection 212 to either the forward or aft ties 76, 78. Each PPSND 302 also includes an output connection 214 to an associated secondary MEC 46. Each PPSND 302 also includes two high current solid state contactors 216, 218 and two low current solid state contactors 220, 222. The two high current contactors 216, 218 are connected together at connection 224. One of the high current contactors 216 is also connected at connection 210 for turning on and off main primary power and the other high current contactor 218 is also connected at the connection 212 for the forward or aft ties 76, 78 depending on whether the primary MEC 44 is in a forward or aft section of the aircraft 10. The low current contactor 220 is connected to a connection 214 for the associated secondary MEC 46. The other low current contactor 222, in combination with the distribution feed 98 as described in greater detail below, is for turning on and off power between the high power portion 120 and the low power portion 122 of each primary MEC 44. Each PPSND 302 may also include optional high current contactor 250, a high current contactor 260, a low current contactor 232, or a low current contactor 278. A set of substantially identical PPSNDs 302 can be used with a primary MEC 44 to receive three-phase primary power from one of the generators 34, 36. Each of the primary power feeders 40, 42 preferably is a four conductor power wire connected to each of the primary MECs 44 where three of the conductors carry either of phases A, B or C of the three-phase power. The forth conductor can be a neutral wire connected to a fourth PPSND. Sets of the solid state elements constitute the contactors 216, 218, 220, 222, 232, 250, 260 and 278 as depicted in FIG. 10.

One or more of the MECS 44, 46, 48 may also include an integrated truss system having a mounting structure of one or more data and/or power transfer layers separated by one or more insulation layers. The truss is configured to facilitate easy installation or replacement within an aircraft 10 and may be constructed of rigid or flexible materials such as sheet metal, thermoplastics, composites, or some other suitable material. In an aircraft, power or data could be transferred to various locations on the mounting structure of the truss system or to various locations in the aircraft. In some configurations, a via or a mechanism such as a truss interconnect can electrically connect one or more power or data lines in one layer to one or more power or data lines in one or more different layers of the integrated truss system. The interconnect can also be used to electrically interconnect a LRU mounted to the top surface layer of the integrated truss system and to send power into the truss or from the truss into the LRU. An LRU with PPSNDs 302 has a conductive boss (projection) and as the interconnect passes through the LRU and into the truss system the interconnect expands into the boss as well as the transfer layers of the truss system to make electrical connections between the LRU and the truss system.

In some configurations, the integrated truss system may electrically connect both power and data systems. In further configurations, the truss interconnect can also provide a mechanical connection between one or more layers of the integrated truss system. In additional configurations, the truss interconnect may be configured for multiple insertions and extractions, allowing the reuse of the truss interconnect.

Figure 11:
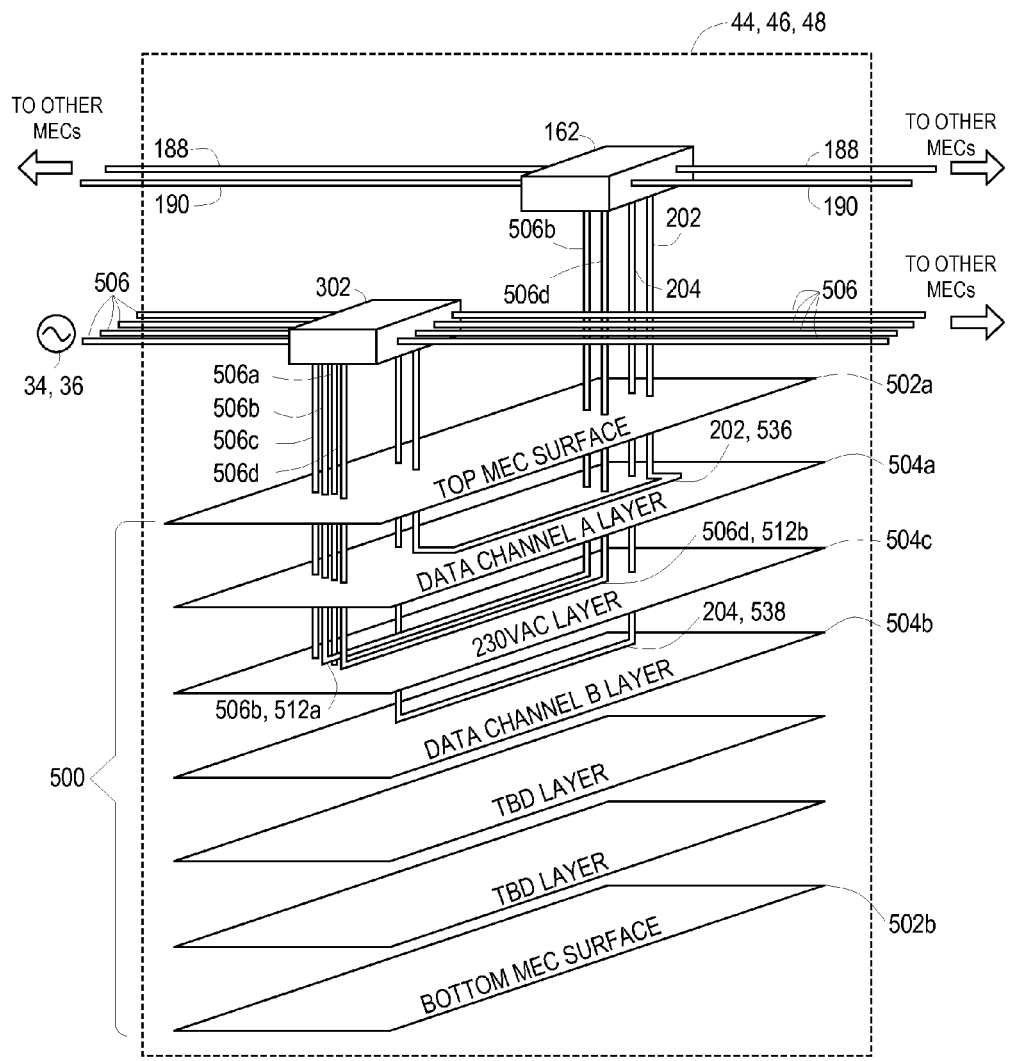
FIG. 11 illustrates an exploded perspective view of a multi-layered integrated truss system of a MEC according to at least one embodiment disclosed herein.

FIG. 11 illustrates an exploded, perspective view of a multi-layered integrated truss system 500 of a MEC 44, 46, 48. The integrated truss system 500 may include insulation layers 502a-502b (hereinafter referred to collectively and/or generically as "insulation layers 502") and transfer layers 504a-504c (hereinafter referred to collectively and/or generically as "transfer layers 504"). In some configurations, the insulation layers 502 and the transfer 504 layers are alternately arranged among each other such that the insulation layers at least partially electrically separate the transfer layers 504 from one another. In further configurations, the insulation layers 502 are configured to, at least partially, physically separate one or more of the transfer layers 504 from one or more other transfer layers 504. Also, in some configurations one or more of the insulation layers may act as a smoke or water drip barrier between the passenger and cargo compartments.

Components of a MEC 44, 46, 48 may be detachably secured to the truss system 500. A portion of the power busing network system 90 of FIG. 3, for example corresponding with the high power portion 120 of a primary MEC 44, with the PPSNDs 302, is housed in an LRU 52 mounted to the top surface insulation layer 502a of the truss system 500. Also inside the LRU 52 with the power busing network system 90 is a microprocessor that receives channel A and B data inputs from the CNI module 162 to control all the contactors 216, 218, 220, 222, 232, 250, 260 and 278.

Three-phase primary power 506a-d (hereinafter may be referred to collectively and/or generically as "three-phase primary power 506") is provided from one of the main generators 34, 36 to the PPSNDs 302 inside the power busing network system 90. Phase A power 506a, phase B power 506b, or phase C power 506c, or all three, may be routed from the output connections 390a-c through the insulation layers 502 to one or more transfer layers 504 of the truss system 500. The neutral 506d of the three phase primary power 506 also may be routed through the insulation layers 502 to one or more transfer layers 504 of the truss system 500. Communication data is sent from one MEC 44, 46, 48 to any other MEC 44, 46, 48 across two data channels 188, 190 (commonly referred to as channels A and B). As shown in FIG. 11, the mounting structure of the truss system 500 provides separate layers configured to provide separate communication channels to system components mounted to the truss system 500. Both data channels 188, 190 may be routed through the insulation layers 502 to one or more transfer layers 504 of the truss system 500. For example, the transfer layer 504a includes data transfer path 536 and transfer layer 504b includes data transfer path 538. The data transfer paths 536, 538 may be separated from one another by one or more layers 502, 504 such as transfer layer 504c. Data communications back and forth between the power busing network system 90 with PPSNDs 302 and the CNI module 162 are sent back and forth across the data channels 188, 190. Data channel 188 passes through the transfer path 536 of transfer layer 504a and data channel 190 passes through the transfer path 538 of transfer layer 504c.

In some configurations, the transfer layers 504 are configured to include one or more power or data transfer paths, or both. For example, the transfer layer 504b may include power transfer paths 512a and 512b which correspond with phase B power 506b and neutral 506d of the three phase primary power 506. The power transfer path 512a receives phase B power, of 230 VAC for example, and transfers it to another LRU 52 mounted to the truss system 500 such as the CNI module 162 shown in FIG. 11. Transfer path 512b is the current return path across the neutral 506d from the CNI module 162 back to one of the PPSNDs 302.

Each MEC 44, 46, 48 also includes at least one power distribution module 170 for distributing secondary power from the MECs 44, 46, 48. Each distribution module 170 may be configured as one or more LRUs 52. Each distribution module 170 preferably receives all three phases but distributes them to single phase leads in a balanced manner. As shown in FIG. 11, phase A power 506a and phase B power 506b are provided through two different transfer layers 504 of the truss system 500. Also, phase A power 506a and phase B power 506b would be distributed to distribution modes 170. Each distribution module 170 then distributes single phase secondary power to the low power equipment loads 50 within the assigned zone of each particular MEC 44, 46, 48. The equipment loads 50 associated with each MEC 44, 46, 48 are preferably distributed evenly across all three power phases. Preferably, each of the low power equipment loads 50 is connected to a distribution module 170 with a twisted electrical conductor pair. Although the present application depicts a particular number of connections in one or more of the Figures, any number of equipment loads 50 may be serviced by a MEC 44, 46, 48 subject to the amount of secondary power available.

Communication data from channels A and B 202, 204 of truss transfer layers 504a, 504b controls when a distribution module 170 turns on and off secondary power to the twisted and shielded electrical conductor pairs to service the equipment loads 50. The CNI module 162 is connected to every trace in every layer 504 of the truss system 500 of a MEC 44, 46, 48. Because there are multiple voltage inputs to the CNI module 162, power regulators perform conversions to the needed voltages. If any of the traces on one or more of the layers 504 become powered, the CNI module 162 becomes active. For example, if all the MECs 44, 46 loses primary power, power could be provided to the standby MEC 48 with the RAT 128 or a fuel cell thereby providing power to traces within a standby layer of the truss system. Power in the traces would activate the CNI module 162. The CNI module 162 also receives communication data for use with the network switches 182, 184, 186 from both channels A and B 202, 204 from each of the transfer paths 536, 538 of the transfer layers 504a, 504b.

Figure 12:
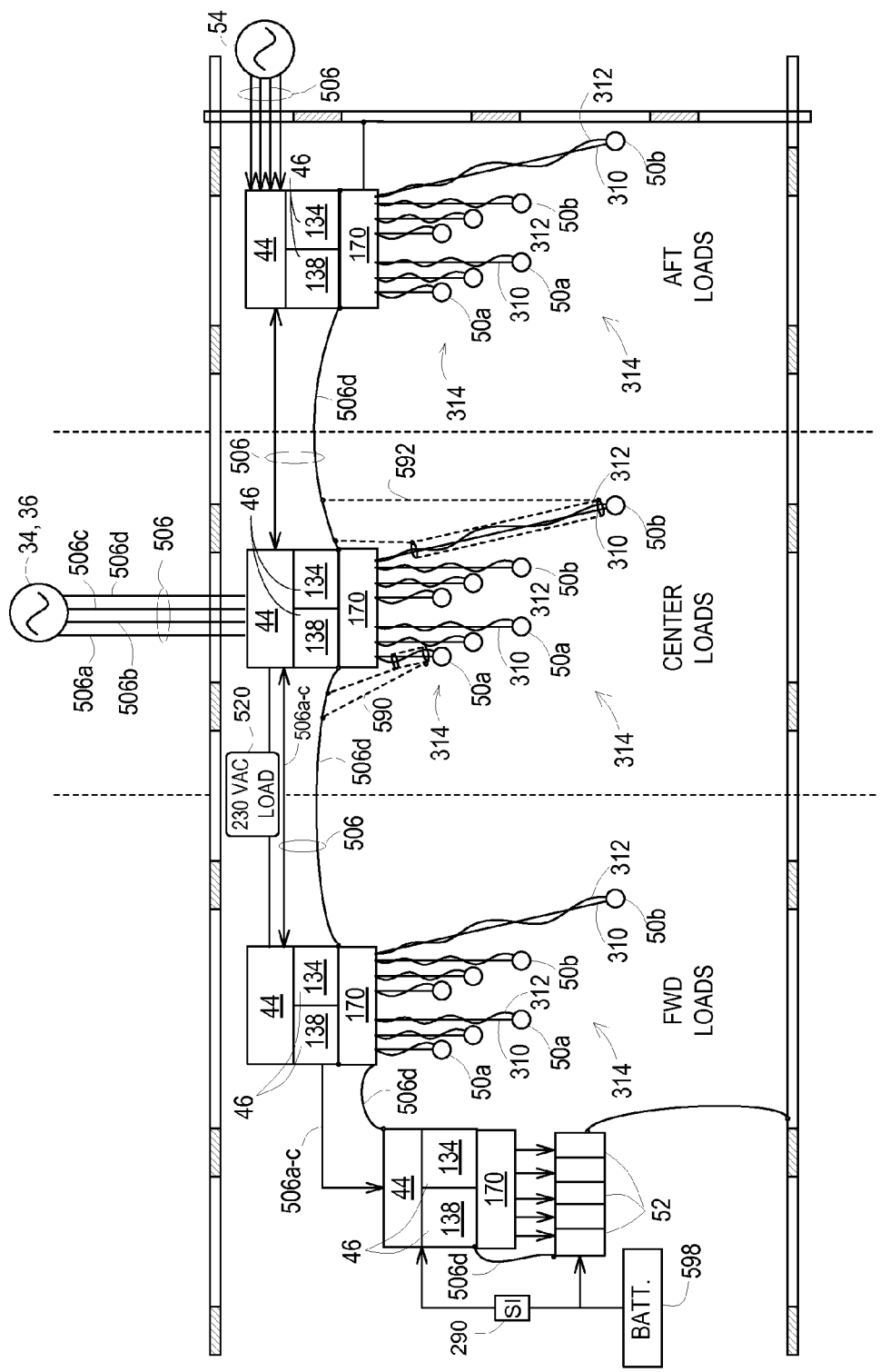
FIG. 12 illustrates one configuration of the distribution of either alternating current (AC) or DC power from the TRUs and ATUs to equipment loads utilizing twisted and shielded electrical conductor pairs according to at least one embodiment disclosed herein.

FIG. 12 also generally illustrates the distribution of either AC or DC power from an ATU 138 or a TRU 134, respectively. However, more specifically as described above, the primary power 506 is first distributed to the power conversion equipment and then to the distribution modules 170 connected to each of the low power equipment loads 50 with multiple twisted and shielded electrical conductors where the conductors carry essentially equal but opposite currents. In application there may be small differences in current carried by the conductors. For example, twisted and shielded electrical conductor pair 314 includes an electrical power conductor 310 and a neutral or return conductor 312. The neutral conductor may be routed with a three-phase power feeder.

After converting the primary power 506, AC power is distributed from each ATU 138 to AC equipment loads 50a with an electrical power conductor 310 and current is returned from each AC equipment load 50a on a corresponding return conductor 312 of the twisted and shielded electrical conductor pair 314. DC power is provided from each TRU 134 to the DC equipment loads 50b with electrical power conductor 310. Current is returned from each DC equipment load 50b on the corresponding return conductor 312 of the twisted electrical conductor pair.

Phase A power 506a, phase B power 506b, and phase C power 506c are distributed from the generators 34, 36. A fourth wire from the generators 34, 36 for the three-phase primary power 506 is also depicted that is the neutral conductor 506d. Each of the AC equipment loads 50a includes a shield termination wire 590 depicted by a broken line connected to the neutral conductor 506d and each of the DC equipment loads 50b includes a shield termination wire 592 also depicted by a broken line connected to the neutral conductor 506d. Although each of the equipment loads 50a and 50b are connected to the neutral conductor 506d with shield termination wires 590 and 592, respectively, the load return currents are no longer cumulative. In FIG. 12, part of the neutral conductor 506d is configured to appear as a current return network (CRN) merely to illustrate that the voltage differential is zero as a result of using small loops of twisted wire conductor pairs for localized secondary power distribution. The neutral conductor 506d of the distributed three-phase primary power 506 between MECs 44, 46, 48 of the aircraft 10, which is much smaller than conductors that would typically be utilized as part of a CRN, may simply be referred to as a safety ground bus (SGB). Therefore, a CRN is no longer needed in the composite aircraft 10 with localized secondary power distribution provided by twisted wire conductor pairs. The twisted wire conductor pair now provides current return. Also, the cross-sectional area of the loops created by the twisted conductor pair is much smaller than the cross-sectional area created by the larger wire loop of the CRN which reduces the lighting threat to the composite aircraft 10. For comparison, the conductors of the twisted pair may be about 16 to about 20 American wire gauge (AWG) whereas the conductors of the CRN are about 2 AWG or larger diameter.

FIG. 12 also illustrates the distribution of primary power from generators 34, 36 among primary MECs 44 distributed within the forward, mid and aft sections of the aircraft 10. Each primary MEC 44 includes a TRU 134 and an ATU 138 for servicing equipment loads 50b and equipment loads 50a, respectively, as described above. Power is distributed from each MEC 44 to each equipment load 50 with a twisted and shielded electrical conductor pair 314. FIG. 12 also depicts a pair of MECs 44 providing 230 VAC for auxiliary loads 520. As referenced in FIGS. 12A-12C and the accompanying text, 230 VAC power to and from the auxiliary loads is controlled by the contactors 232, 278 of the PPSNDs 302 of the primary MEC 44.

FIG. 12 also illustrates a plurality of LRUs 52, such as avionics, serviced by the forward most primary MEC 44. FIG. 12 also illustrates a battery 598 for providing standby power. Although FIG. 12 depicts the battery 598 providing standby power to only the forward most primary MEC 44, battery standby power is preferably provided to all primary MECs 44.

Figure 13:
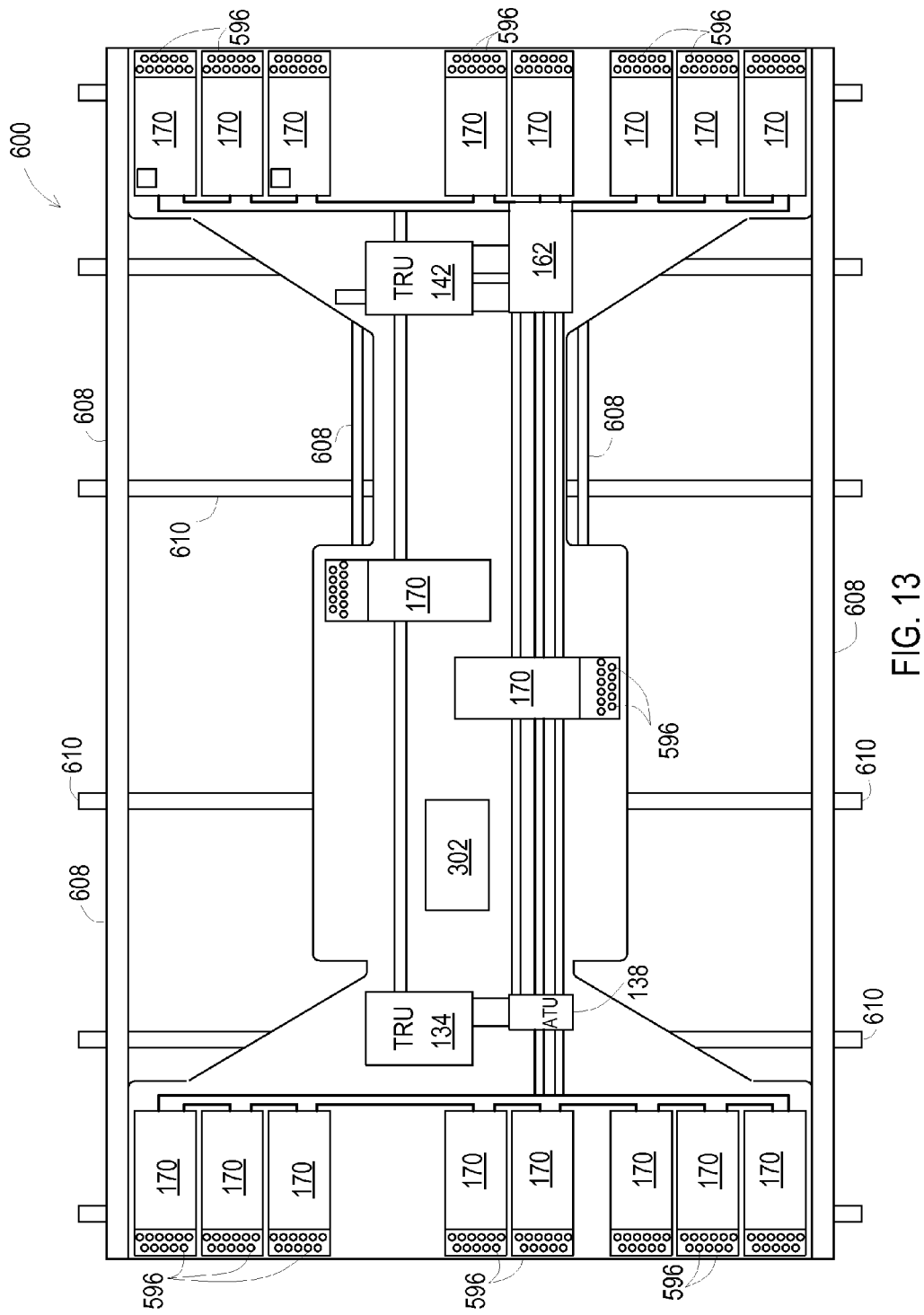
FIG. 13 illustrates one configuration of an integrated truss system of a MEC within the floor of an aircraft according to at least one embodiment disclosed herein.

FIG. 13 illustrates an integrated truss system 600 which may be used in aircraft manufacturing for providing one or more power and data transfer paths as explained above. One or more MECs 44, 46, 48 may include the truss system 600 as a support or mounting structure for attaching all or part of vehicle systems, components of a MEC 44, 46, 48, equipment loads 50, LRUs 52, or other equipment.

The mounting structure of the truss system 600 may be a multi-part or modular assembly of separate structural elements that stack, detachably connect or lock together to create an integrated mounting structure that may be installed in an aircraft 10 as a single unitary piece. Each structural element may have one or more transfer layers and one or more insulation layers as described above. Each structural element of the multi-part truss system 600 may be detachable from one another to allow repair or replacement of damaged structural elements without removing undamaged structural elements from the aircraft 10. One or more layers of each structural element may also be replaced. One element of the truss system 600 could be swapped out without having to remove the entire truss system 600. Also, all or at least a portion of the truss system 600 may also be detachable from the support structure of the aircraft 10 such as the floor beams or fuselage frame members. Alternatively, the truss system 600 may be manufactured as a single monolithic structure which may be installed or replaced in it's entirely. The truss system 600 is configured to extend within a thin structural volume defined in the sidewall of the fuselage between frame members, and by the depth of the frame members, or in the space in the floor between the passenger and cargo compartments of the aircraft 10, and by the depth of the floor beams. Alternately, a truss such as truss system 600 could have a physical form configured to be implemented within a traditional equipment bay. The truss system 600 mounted in the sidewall of the aircraft 10 preferably corresponds with the curvature of the fuselage of the aircraft 10. FIG. 13 is a bottom view looking upward toward the truss system 600 configured to extend from sidewall to sidewall of the aircraft 10, under seat rails 610, and between transverse floor beams 608. A MEC 44, 46, 48 positioned in the floor or in the sidewall of the aircraft 10 with a truss system such as truss system 600 can service the equipment loads 50 within the passenger compartment and in the cargo compartment of the aircraft 10 that are in proximity of the MEC 44, 46, 48.

The truss system 600 is configured to have a narrow middle portion that extends over the top of two inner adjacent floor beams 608 and opposite end portions that extend further outward from both sides of the two inner adjacent floor beam 608 to the next floor beams 608 to provide a wide surface for mounting components such as the power distribution modules 170. In one or more embodiments, the truss system is configured to have a width and length between adjacent floor beams 608, or between floor beams 608 that are displaced from one another, that is suitable for serving as a smoke barrier for obstructing smoke from the cargo compartment from entering the passenger compartment and/or as a water drip barrier for obstructing water from the passenger compartment from dripping into the cargo compartment.

FIG. 13 also shows the CNI module 162, power distribution modules 170, TRUs 134, 142, the ATU 138, and the PPSNDs 302 mounted to the truss system 600 of a primary MEC 44. The TRU 134 receives 230 VAC from the output connections 390 of the PPSNDs 302. The TRUs 134 connect to a power bus with 28 VDC to power the distribution modules 170. Each power distribution module 170 has connections 596 for interfacing with the equipment loads 50 associated with the primary MEC 44.

Each structural element of the truss system 600 has one or more transfer and insulation layers as explained above. One of the transfer layers may be configured to transfer high voltage power from one portion of a MEC 44, 46, 48 to another portion of that same MEC 44, 46, 48. For example, high voltage power may be provided inside the truss system 600 across a transfer layer to the PPSNDs 302, configured as an LRU 52, mounted to the surface of truss system 600. Low voltage secondary power may also be provided through another transfer layer of the truss system 600 to low power equipment loads 50 mounted to the surface of the truss system 600. Also, communication data can be provided across a transfer layer of the truss 600 to an aircraft system component mounted to the surface of the truss system 600. One transfer layer of the truss system 600 could provide channel A to a system component mounted to the surface of the truss system 600 and another transfer layer could provide channel B to that same system.

One or more configurations of the aircraft 10 may include one or more remote modular equipment centers (RMECs) 410 configured for use with power and data elements in specific environments of the aircraft 10. An RMEC 410 is a simpler version of a primary or secondary MEC 44, 46 that does not have power conversion equipment such as TRUs 134, 142, or the ATU 138. Any of the MECs 44, 46, 48 can source an RMEC 410 with secondary power. One or more discrete secondary power inputs are provided to the RMEC 410, from one or more power distribution modules 170 of the nearest primary or secondary MEC 44, 46, at a specific voltage for a load associated with that RMEC 410. AC power could also be provided to the RMEC 410 directly from a PPSND 302, if required for a load of a local subsystem.

Each RMEC 410 distributes secondary power and communication for providing localized power and performing computing functions specifically for the local equipment and components of the aircraft system in proximity of the RMEC 410. Because RMECs 410 distribute discrete secondary power and do not include power conversion equipment, the amount of wiring is reduced between the local sensors and components and the MECs 44, 46. This reduces overall aircraft wire weight and wire complexity throughout the aircraft 10 which expedites assembly of the aircraft 10. Also, build verification is simplified and final assembly of the aircraft is expedited because the RMEC 410 may be packaged together with devices, configured to provide data and receive commands and power from the RMEC 410, into a unitary system, such as a passenger entry door system or a main landing gear system, that can be production qualified prior to or immediately after installation within the aircraft 10.

RMECs 410 may be used in the pressurized areas as well as the unpressurized areas of the aircraft 10. RMECs 410 can route communications from outside a pressurized portion of the aircraft to a pressurized portion of the aircraft. For example, RMECs 410 may be used in the nose and main wheel well areas with the landing gear system, nose wheel steering system, brake system, and hydraulic systems. RMECs 410 may also be used in the passenger entry and cargo door areas with the door indication system, flight look system, emergency power, and the forward or aft cargo door systems. RMECs 410 could also be used in the wing and engine areas with the engine data concentrator system and the wing flap and slat system. Other areas where RMECs 410 may be used are the cabin areas for the lavatory, galley, lighting, and passenger seat power systems. RMECs 410 may be used in the flight deck areas with panel components and window heat system and the cargo compartment areas with the forward and aft cargo handling systems. RMECs 410 may also be used in the environmental control and cooling systems.

Figure 14:
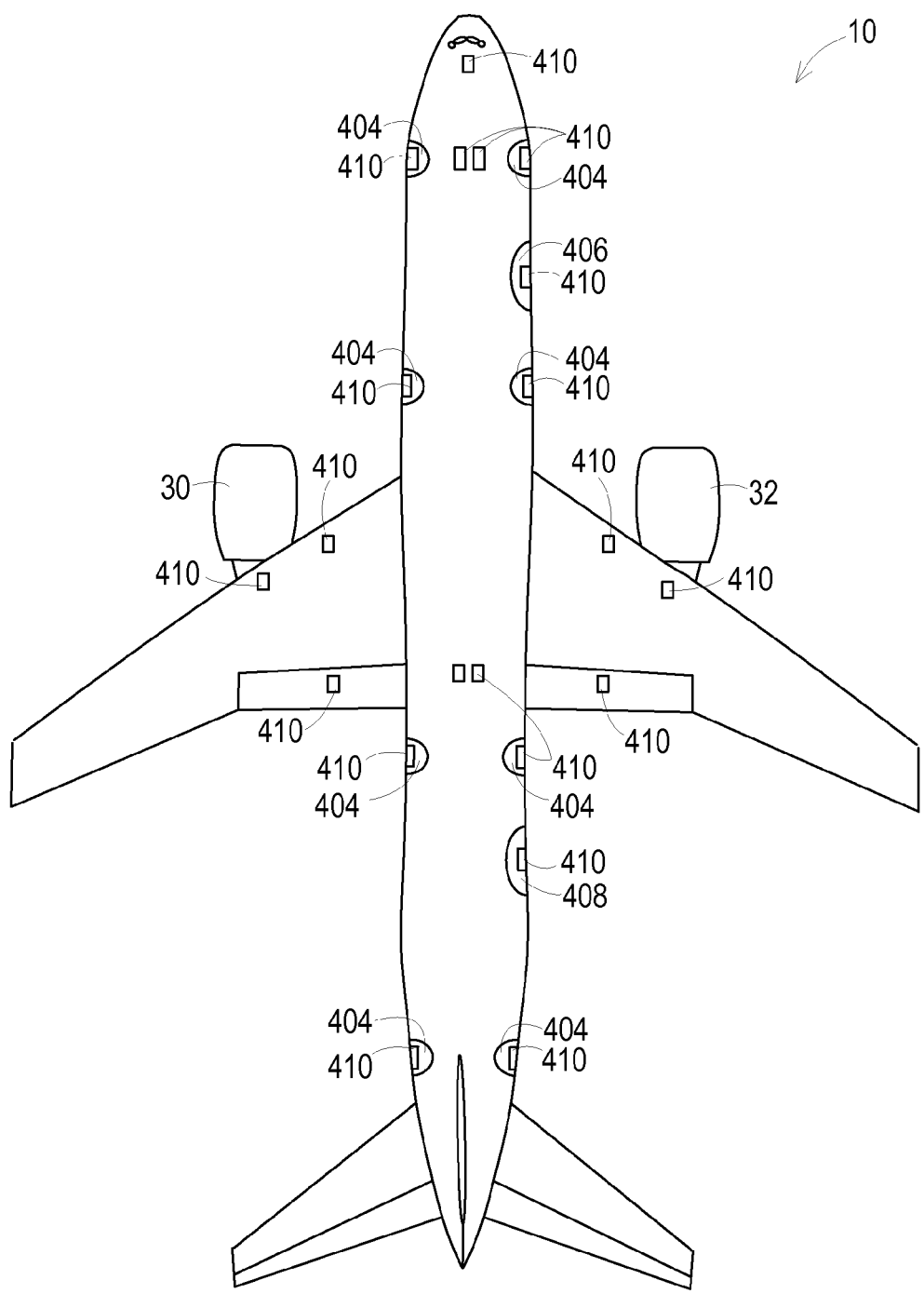
FIG. 14 illustrates one configuration of an aircraft having remote MECs (RMECs) throughout the aircraft in the pressurized and unpressurized portions of the aircraft according to at least one embodiment disclosed herein.

As shown in FIG. 14 one or more configurations of the aircraft 10 includes an RMEC 410 with each of the passenger entry door systems 404, with the forward cargo door system 406 and the aft cargo door system 408, a pair of RMECs 410 for the two nose wheel systems, a pair of RMECs 410 for the two main wheel well systems, an RMEC 410 for the panel in the cockpit, RMECs 410 for the left and right main engine data concentrators, RMECs for the left and right wing slats, and RMECs 410 for the left and right wing flaps.

Figure 15:
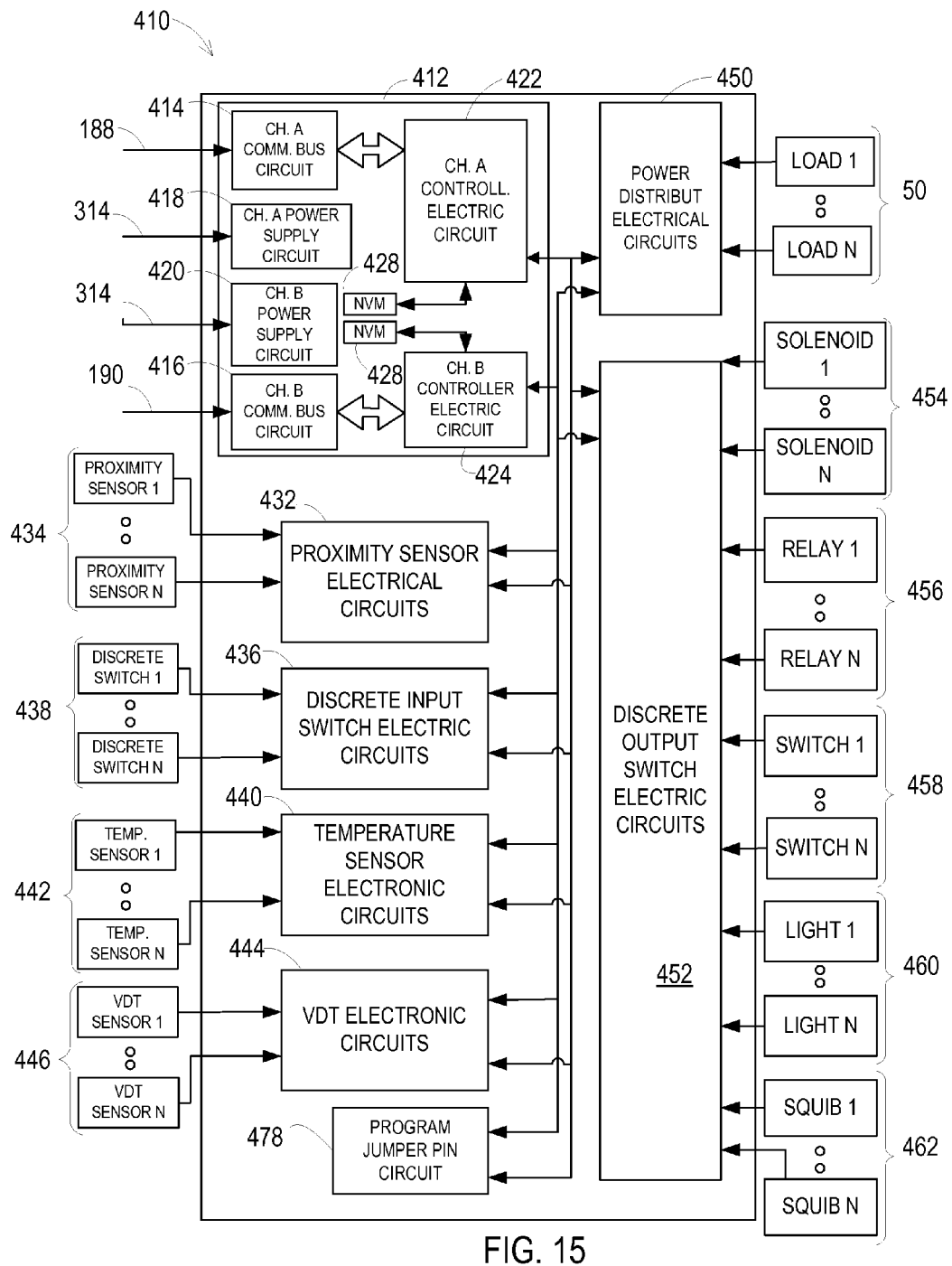
FIG. 15 illustrates one configuration of a block diagram of an RMEC having a fault-tolerant power and communication system and that is customizable based on the needs of an aircraft subsystem according to at least one embodiment disclosed herein.

FIG. 15 illustrates a block diagram of RMEC 410 having a fault-tolerant power and communication system 412. The RMEC 410 is customizable based upon the needs of an aircraft subsystem in proximity of the RMEC 410. All the electrical circuits along with the power into the RMEC 410 may be housed in a LRU 52. Sensors and other components of a particular local subsystem then interface with the LRU 52 of the RMEC 410 to prevent numerous penetrations of wire bundles back into the pressurized vessel of the aircraft 10. The wires associated with any sensors or components of the local subsystem are kept in proximity of the RMEC 410 by directly interfacing with the RMEC 410 rather than penetrate back into the pressurized vessels of the aircraft 10. Preferably, there is no direct power or data path between the devices on the exterior of the pressurized vessel and within the zone of an associated RMEC 410 to a MEC 44, 46, 48. A concentrator configured to combine data from multiple sources in an associated zone of an RMEC 410 onto a single path may be used to minimize the size of the penetration into a pressurized portion of the aircraft 10. For example, only A and B data channels 188, 190 and two twisted and shielded electrical conductor pairs 314 penetrate a pressurized portion of the aircraft 10 to provide bi-directional communication and secondary power to the RMEC 410. The RMEC 410 routes communications from outside a pressurized portion of the aircraft 10 to a pressurized portion of the aircraft 10. The RMEC 410 interfaces with either a primary MEC 44 or a secondary MEC 46 for secondary DC power distributed by two twisted and shielded electrical conductor pairs 314 connected to the same or different distribution modules 170 of the same primary or secondary MEC 44, 46.

Channel A and B communication data from the CNI module 162 of the MEC 44, 46 is received at communication bus electronic circuits 414, 416 and the two twisted and shielded electrical conductor pairs 314 provide 28 VDC or 115 VAC to power supply circuits 418, 420. Channel A and B multi-core microcontroller electronic circuits 422, 424 with non-volatile memory 428 receive and process communication data for digitally controlling the sensors and other components interfaced with other electronic circuits within the RMEC 410. If one of the microcontrollers 422, 424 has an operational inconsistency, the other of the microcontrollers 422, 424 takes over with no loss of function or data.

Whether the communications from the RMECs 410 are time sensitive may determine whether an RMEC 410 communicates with a primary MEC 44 or a secondary MEC 46. If the communications associated with the equipment loads of an RMEC 410 are time sensitive then it is preferable that the RMEC 410 communicates the time sensitive communication data to a primary MEC 44. If the communications from an RMEC 410 are not time sensitive then the RMEC 410 can communicate the non-critical communication data to a secondary MEC 46. Therefore, time sensitive communication data from one or more of the RMECs may be routed to the primary MEC and other than time sensitive communication data from one or more RMECs may be routed to the secondary MEC. An example of a time sensitive communication is whether the landing gear is up within a period of time for obstacle clearance at the end of a short runway. An example of communications that are not time sensitive is when passenger conveniences have failed. The communications between a MEC 44, 46 to the RMEC 410 can be accomplished either by CAN, ARINC 664, Ethernet, Flex-Ray or some other bus architecture.

Electronic circuits that may also be included in one or more configurations of the RMEC 410 are proximity sensor electronic circuits 432 for interfacing with proximity sensors 434, discrete input switch electronic circuits 436 for interfacing with discrete switches 438, temperature sensor electronic circuits 440 for interfacing with temperature sensors 442, and variable differential transformer electronic circuits 444 interfacing with variable differential transformers (VDT) 446 for determining positions of devices such as motors of the local subsystem.

FIG. 15 also illustrates one or more power distribution electrical circuits 450 of the remote MEC 410 for providing DC or AC power to loads 50, solenoids 454, relays 456, switches 458, lights 460, or squibs 462. However, the use and number of loads 50, solenoids 454, relays 456, switches 458, lights 460, or squibs 462 depends on the configuration and location of the subsystem for each remote MEC 410. To complete the circuits, the remote MEC 410 also includes one or more discrete output switch electrical circuits 452 for providing grounded return path outputs. All the wiring for the loads 50, solenoids 454, relays 456, switches 458, lights 460, or squibs 462 is local to the RMEC 410.

Figure 16A:
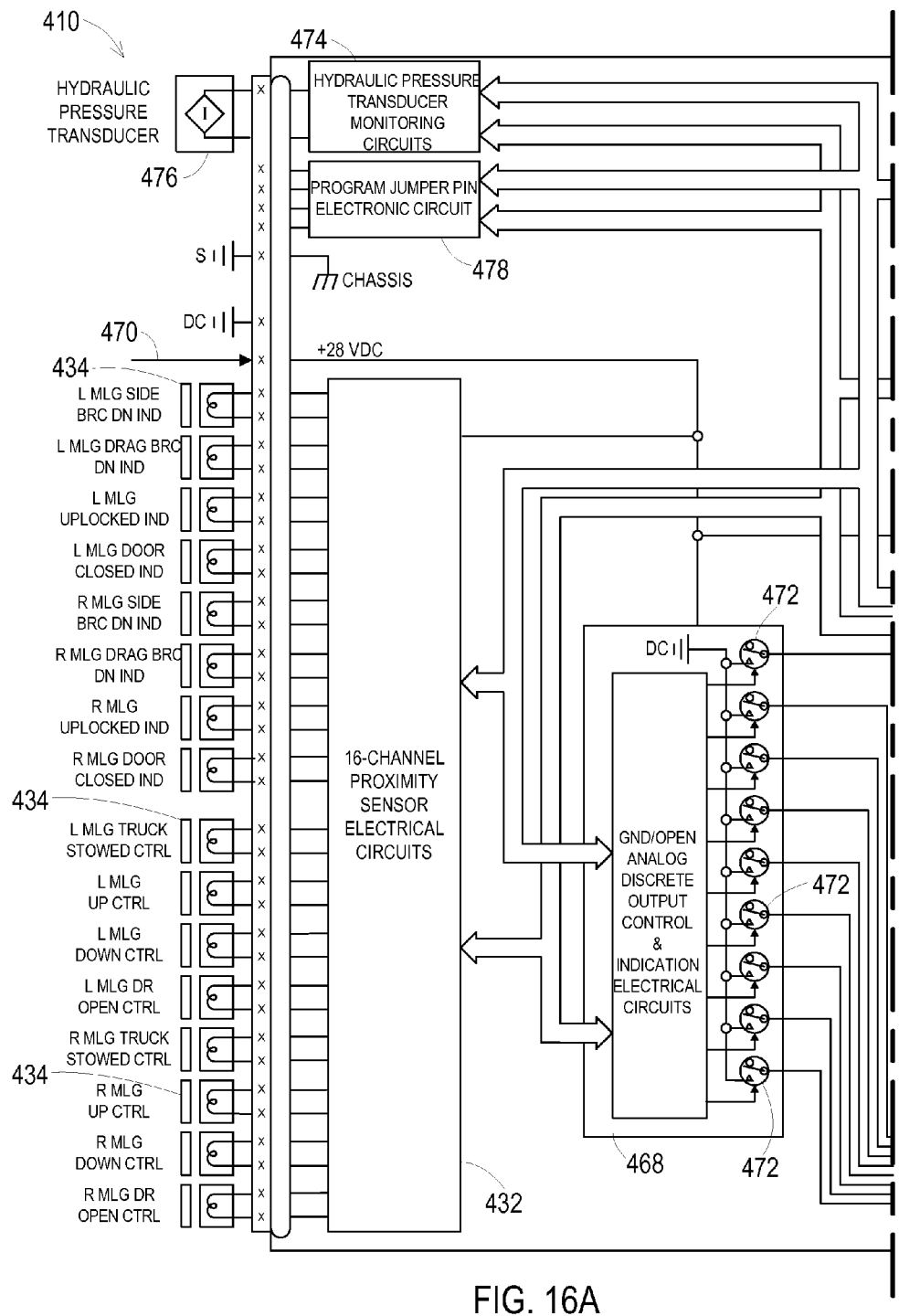
FIGS. 16A and 16B illustrate one configuration of an RMEC for a landing gear control and indication system according to at least one embodiment disclosed herein.
Figure 16B:
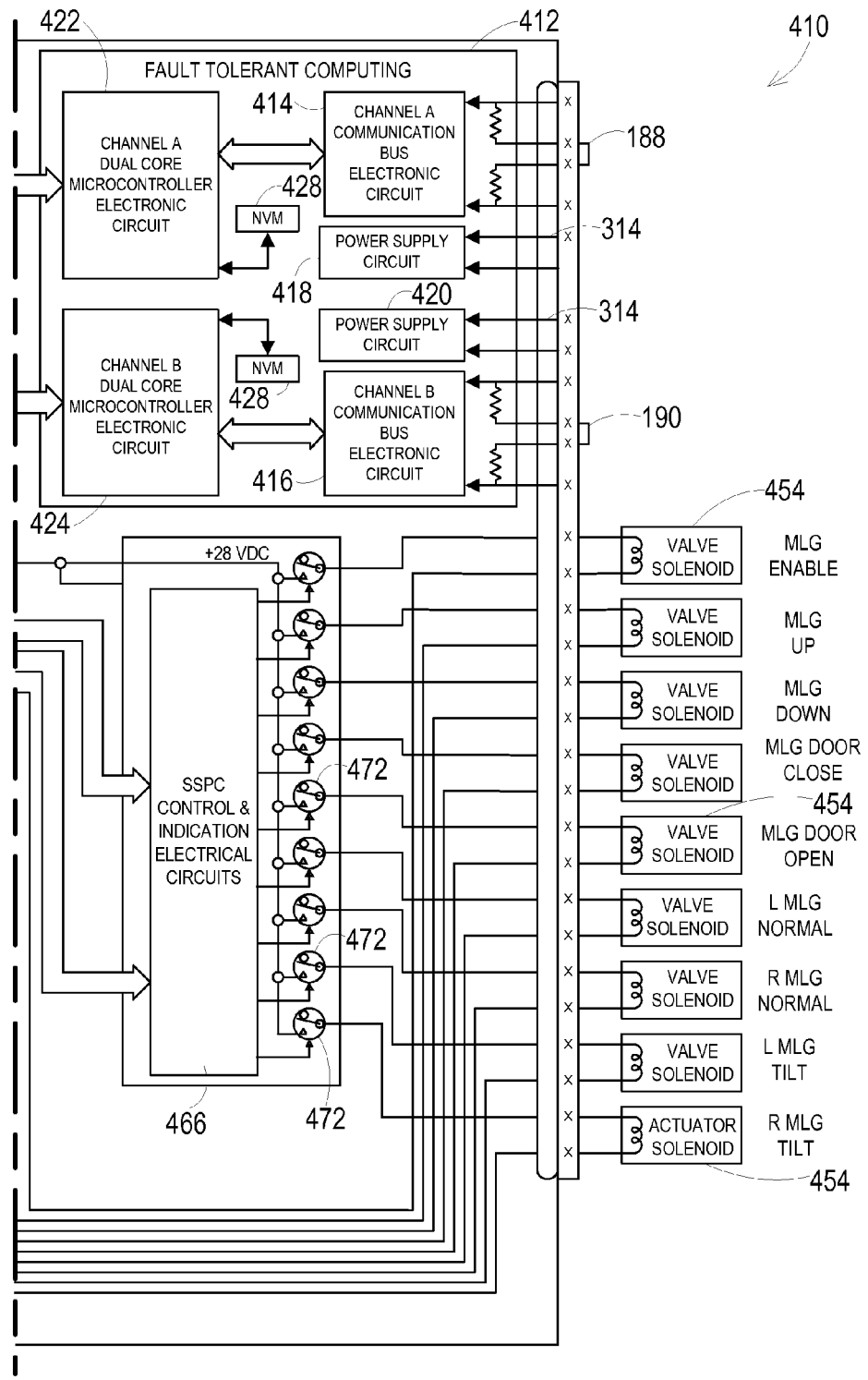

FIGS. 16A and 16B illustrate a block diagram of one or more configurations for a RMEC 410 for a main landing gear control and indication system. The RMEC 410 and the main landing gear system interfacing with the RMEC 410 are positioned outside the pressurized vessel of the aircraft 10. The RMEC 410 of FIGS. 16A and 16B includes the fault-tolerant power and communication system 412 with redundant communication and power channels as well as proximity sensor electrical circuits 432. Solenoids 454 on the right side of the MEC 410 interface with one or more solid state power control and indication electrical circuits (SSPCs) 466 and one or more ground/open analog discrete output control and indication electrical circuits 468. Both the SSPC 466 and the ground/open analog discrete output control and indication electrical circuit 468 receive a power input 470, for example 28 VDC from a power distribution module 170 of a MEC 44, 46, to supply power through switches 472 to the solenoids 454. When the logic of the switches 472 is correct both power and ground is supplied to the solenoids 454 to open and close the landing gear door and enable, tilt, raise up and down the land gear. One or more hydraulic pressure transducer electronic circuits 474 for monitoring a hydraulic pressure transducer 476 may also be included for indicating when hydraulic lines of the landing gear system are pressurized. A program jumper pin electronic circuit 478 of the RMEC 410 changes the configuration of the aircraft subsystem by adding or removing jumpers.

Figure 17A:
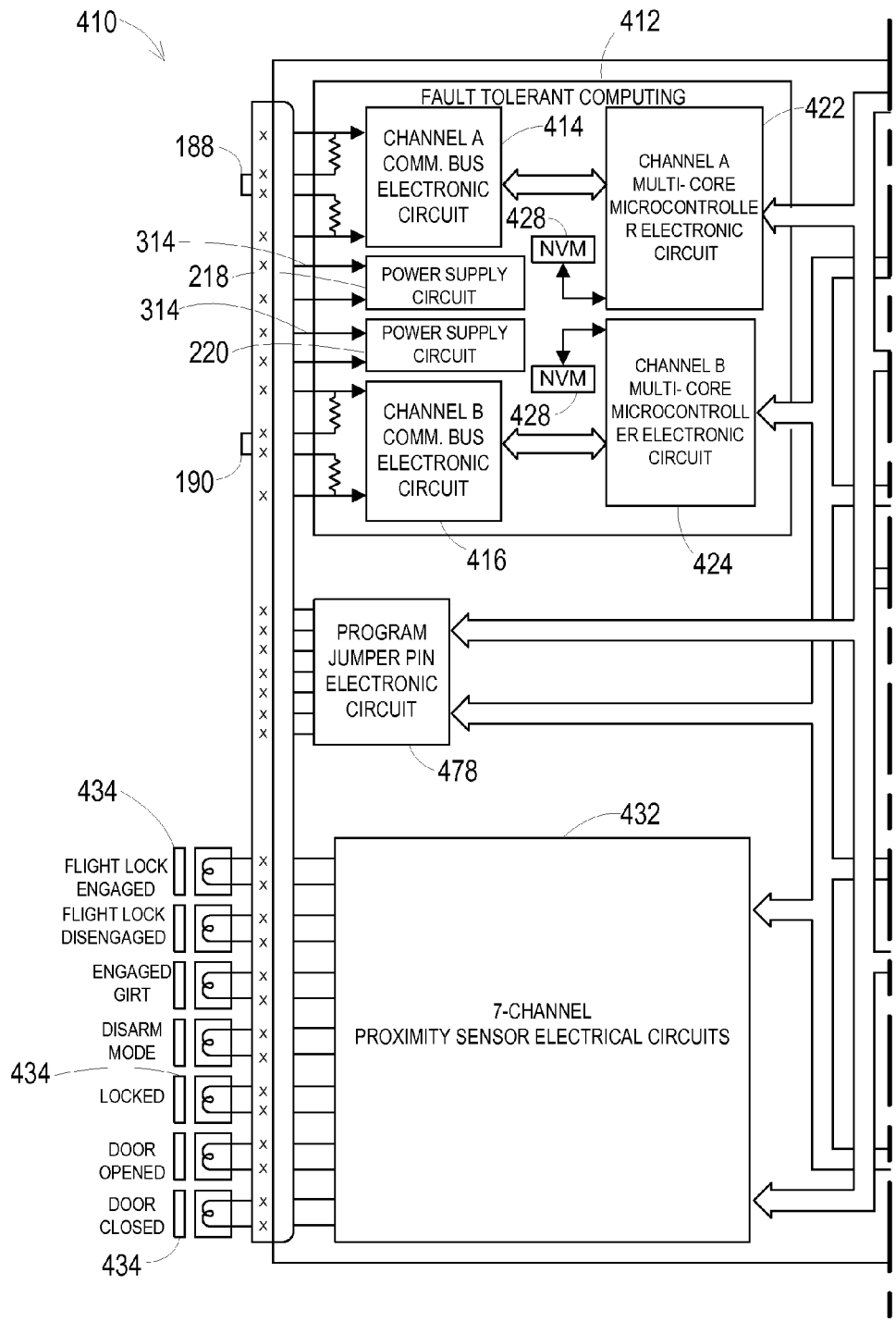
FIGS. 17A and 17B illustrate one configuration of an RMEC on a passenger entry door of a passenger entry door system according to at least one embodiment disclosed herein.
Figure 17B:
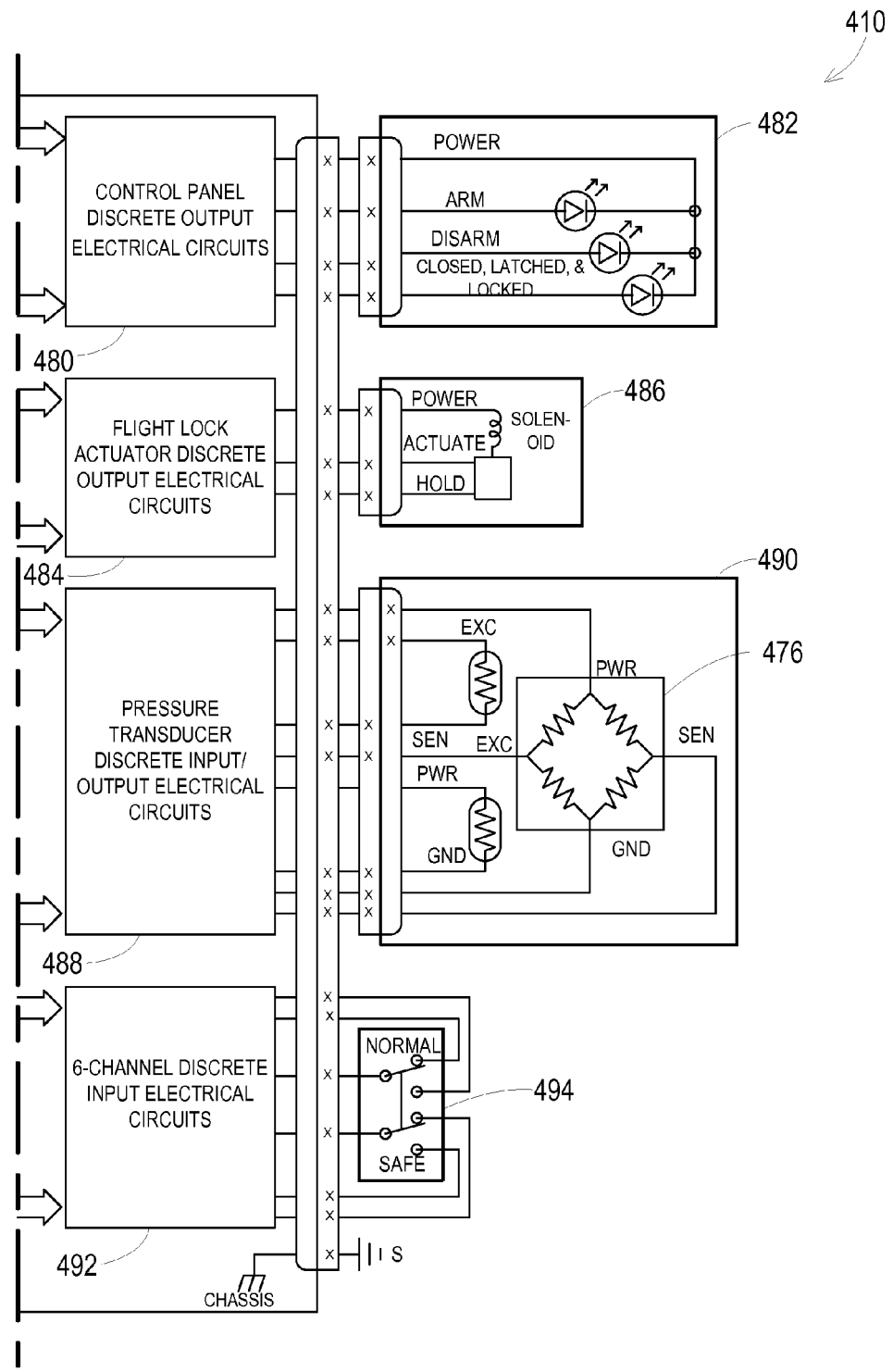

FIGS. 17A and 17B illustrate a block diagram of one or more configurations for a RMEC 410 for use on a passenger entry door of a passenger entry door system 404. The RMEC 410 and the passenger entry door system 404 interfacing with the RMEC 410 are positioned inside the pressurized vessel of the aircraft 10. The RMEC 410 of FIGS. 17A and 17B also includes the fault-tolerant power and communication system 412 with redundant communication and power channels as well as proximity sensor electrical circuits 432. Proximity sensors 434 indicate the state of the position of the passenger entry door system 404.

Proximity sensors 434 and proximity sensor electronic circuits 432 on the left side of the MEC 410 interface with one or more control panel discrete output electronic circuits 480 with a passenger entry door control panel 482 for indicating when the passenger entry door is closed, latched, and locked, one or more flight lock actuator discrete output electronic circuits 484 with a flight lock actuator 486, one or more pressure transducer discrete input/output electronic circuits 488 with a pneumatic reservoir 490 having excitation, sensing, power and ground lines and a hydraulic pressure transducer 476, and one or more discrete input electronic circuits for a passenger entry door switch 494. All the wiring for the passenger entry door 482, flight lock actuator 486, pneumatic reservoir 490 and the passenger entry door switch 494 is within the passenger entry door system 404 and local to the RMEC 410.

Figure 18:
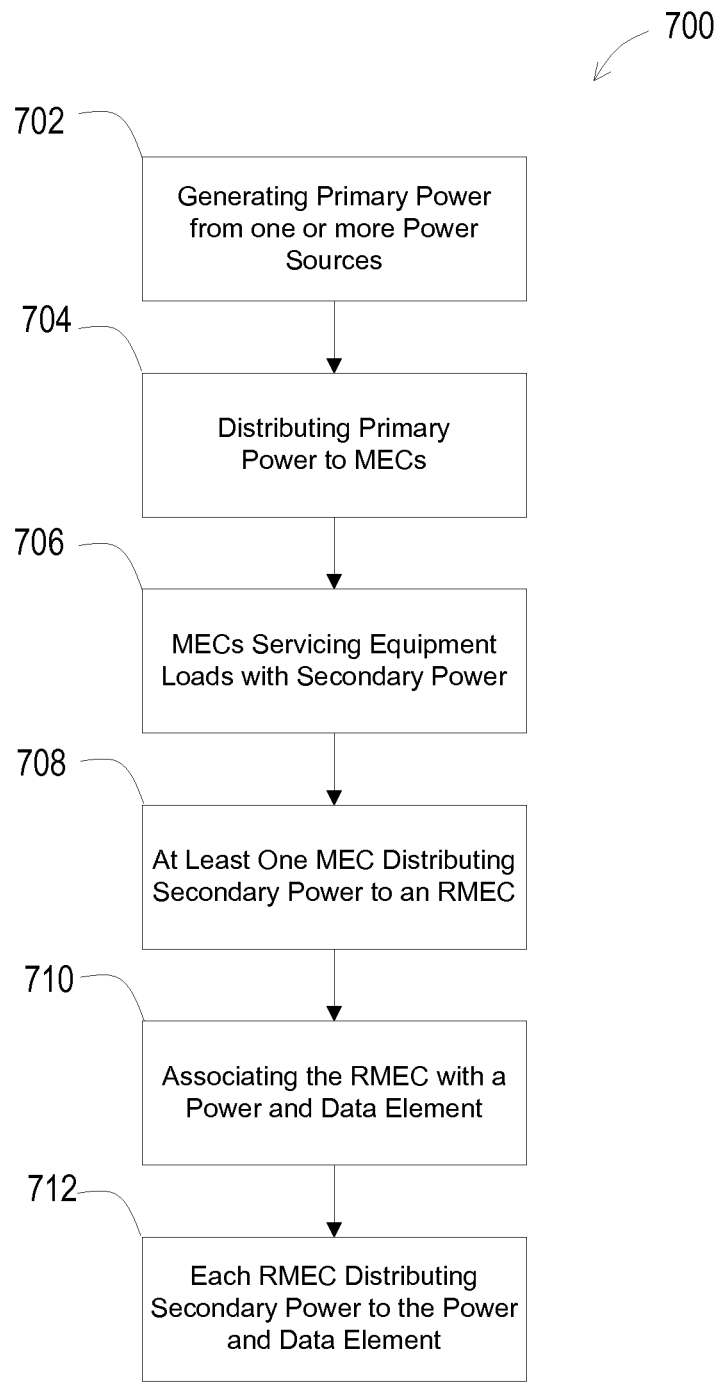
FIG. 18 illustrates one configuration of a routine for providing power and data to remote power and data elements of a vehicle according to at least one embodiment disclosed herein.

Turning now to FIG. 18, an illustrative routine 700 for providing power and data to remote power and data elements of a vehicle is provided. Unless otherwise indicated, more or fewer operations may be performed than shown in the figures and described herein. Additionally, unless otherwise indicated, these operations may also be performed in a different order than those described herein.

The routine 700 starts at operation 702, where one or more power sources generate primary power. Operation 704 includes distributing primary power to the MECs 44, 46, 48. In operation 706 each MEC 44, 46, 48 services equipment loads 50 with secondary power. In operation 708 at least one MEC 44, 46, 48 distributes secondary power to an RMEC 410. Operation 710 includes associating the RMEC 410 with one or more power and data elements. In operation 712, each RMEC 410 distributes secondary power to the one or more power and data elements.

FIGS. 19-22 and the following discussion are intended to provide a general description of a computing environment 810 capable of implementing aspects of the embodiments presented herein. It should be understood that the scope of the computing environment 810 changes as building of the aircraft 10 progresses and therefore depends on the state of the build of the aircraft 10. Moreover, FIGS. 19-22 are simplified representations of the computer environment 810 for purposes of explanation and ease of description, and FIG. 19-22 are not intended to limit the application or scope of the subject matter described herein in any way.

Each of FIGS. 19-22 depict a block diagram of an illustrative computer hardware and software architecture for the computer environment 810. It should also be appreciated that the computer environment 810 of FIGS. 19-22 may be implemented on computing devices onboard one or more of the partially constructed vehicle portions or a completely assembled aircraft 10. It should also be appreciated that the computer environment 810 of FIGS. 19-22 may be further implemented by one or more computing devices within one or more vehicle manufacturing and/or assembly facilities. In some configurations, the computer environment 810 may be implemented by computing devices of the combination of one or more facilities having one or more partially constructed vehicle portions or a fully assembled aircraft 10 therein.

Figure 19:
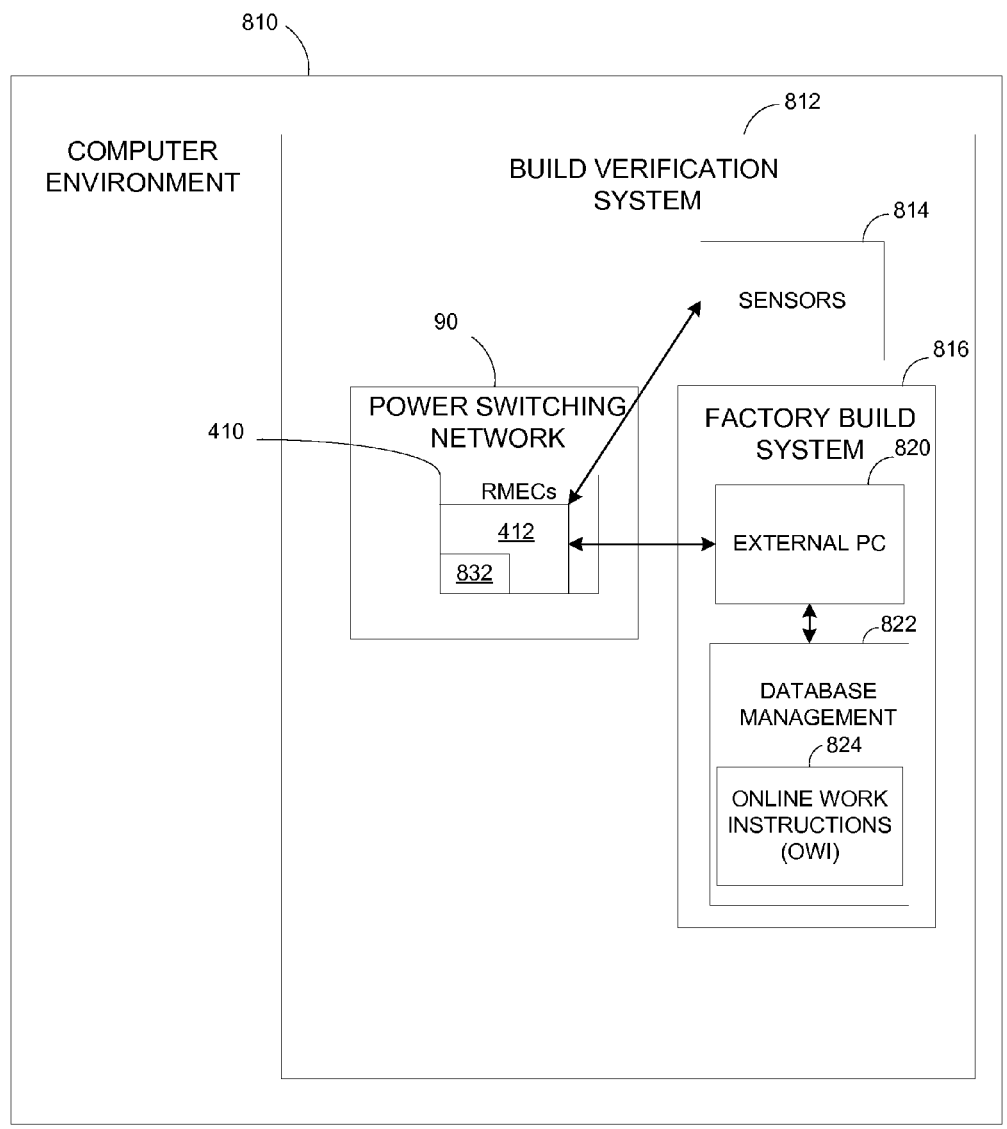
FIG. 19 illustrates one configuration of a computer environment and a build verification system for use with one or more partially constructed vehicle portions having an RMEC according to at least one embodiment disclosed herein.

The computer environment 810 can be defined by the state of the vehicle build. FIG. 19 illustrates one embodiment wherein the computer environment 810 encompasses one or more computing devices within a facility that has completed installation of at least one equipment system within one or more partially constructed vehicle portions. A partially constructed vehicle portion may be any portion of a vehicle that is used in an assembly process that forms part of an assembled vehicle, such as the aircraft 10, and that requires installation of one or more equipment systems. For example, a partially constructed vehicle portion may be part of the fuselage of the aircraft 10 such as all or part of one of the sections 12, 14, 16. Also, a partially constructed vehicle portion can include, but is not limited to, one or more MECs 44, 46, 48, wherein power is distributed across all or part of the power busing network system 90 to equipment loads 50. In another embodiment, a partially constructed vehicle portion may be an RMEC 410 utilized within all or part of a passenger entry door system 404, cargo door system 406, 408, landing gear system, a nose wheel steering system, a brake system, hydraulic systems, or the like.

Figure 22:
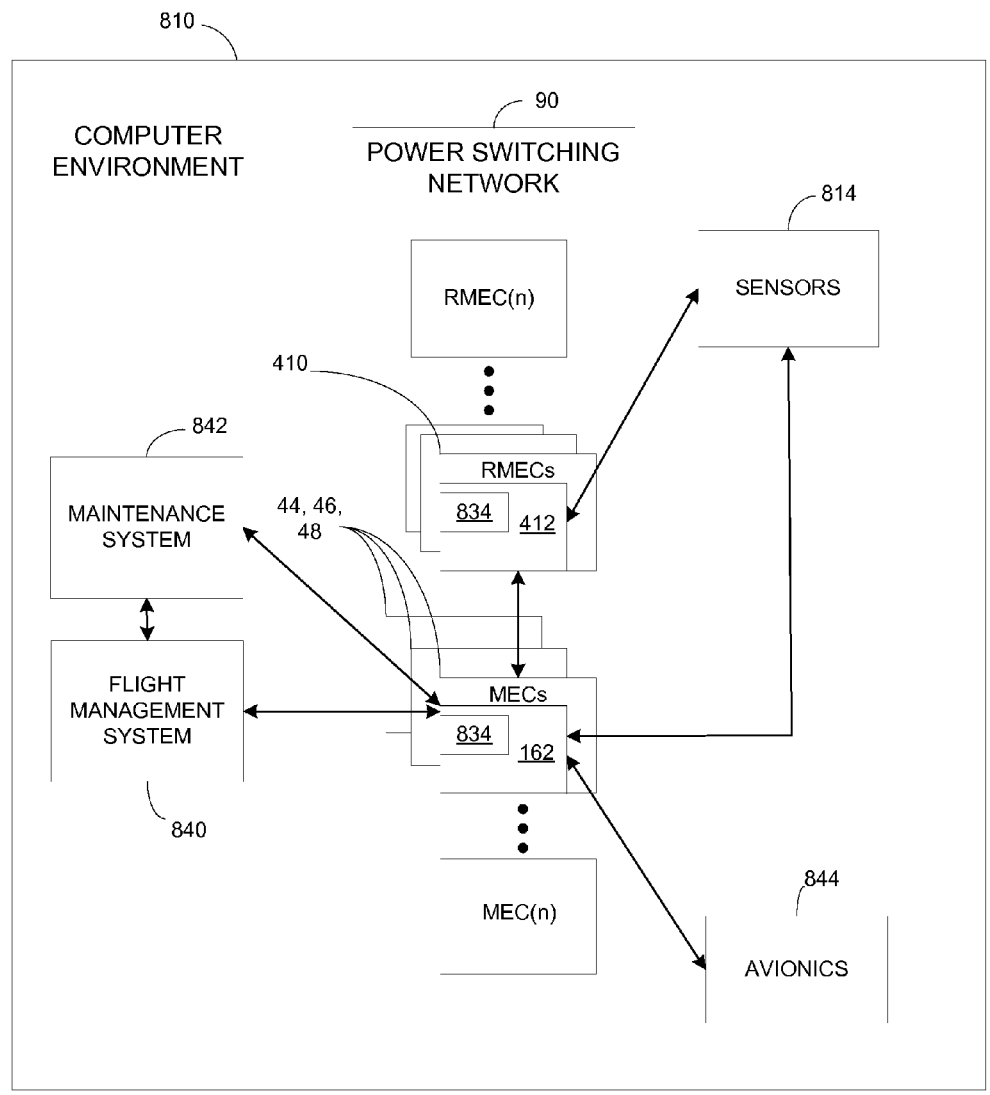
FIG. 22 illustrates one configuration of a computer environment and a build verification system for use with a flight-ready aircraft having a FMS but with the build verification system (BVS) removed according to at least one embodiment disclosed herein.

As the building of the aircraft 10 progresses, the scope of the computer environment 810 varies depending on the current build stage of the partially constructed vehicle portions due to the installation of equipment systems. In one or more embodiments, such as when the aircraft is fully assembled and flight ready as shown in FIG. 22, the computer environment 810 only includes the computing devices within the aircraft 10 such as, but not limited to, the flight management system (FMS) 840, maintenance system 842, communication system, navigation system, and avionics systems 844 that are installed on the aircraft 10. The computer environment 810 of FIG. 22 no longer includes the computing devices within the facilities for tracking and managing the manufacturing and assembly process once assembly of the aircraft 10 is completed.

One or more configurations of the computer environment 810 includes a build verifications system 812. In an exemplary embodiment, the build verification system 812 includes build verification software and is configured to perform the tasks, functions, and operations described below. The various tasks may be performed by software, hardware, firmware, or any combination thereof. It should be appreciated that any number of additional or alternative tasks may be included, and may be incorporated into a more comprehensive procedure or process having additional functionality not described in detail herein.

The build verification system 812 can be used to verify that equipment systems when installed are electrically connected properly within one or more partially constructed vehicle portions. The build verification system 812 may be implemented by software embedded on a combination of computing devices, e.g., a plurality of processing cores, a combination of a digital signal processor and a microprocessor, a plurality of microprocessors, one or more microprocessors in conjunction with a digital signal processor core, or any other such configuration. The steps of a method or algorithm described in connection with the embodiments disclosed herein may be embodied directly in hardware, in firmware, in a software module executed by any practical combination of computing devices.

While software may be described in the general context of program modules that execute in conjunction with one or more application programs that run on an operating system on one or more computing devices such as a computer, those skilled in the art will recognize that the invention may be implemented in combination with one or more other modules. Generally, software providing the logic or control for various operations and functions of this disclosure includes program modules that can include routines, programs, components, data structures, and other types of structures that perform particular tasks or implement particular abstract data types. Moreover, those skilled in the art will appreciate that aspects of this disclosure may be practiced with various computer system configurations, including hand-held devices, multiprocessor systems, microprocessor-based or programmable consumer electronics, minicomputers, mainframe computers, and the like. Aspects of the disclosure may also be practiced in distributed computing environments where tasks are performed by remote processing devices that are linked through a communications network. In a distributed computing environment, program modules may be located in both local and remote memory storage devices.

Software may be categorized into multiple criticality levels based on safety related conditions, events or circumstances that could lead to or contribute to an unplanned or undesirable event associated with vehicles such as the aircraft 10. Level A software is software whose behavior would cause or contribute to a failure resulting in a catastrophic failure condition for the aircraft 10. A catastrophic failure results in whole loss of the aircraft 10 or loss of life. Level B software is software whose behavior would cause or contribute to a failure resulting in a hazardous failure condition for the aircraft. A hazardous failure results in major damage to the aircraft that is repairable or results in injuries. Level C software is software whose behavior would cause or contribute to a failure resulting in a major failure condition for the aircraft. Level D software is software whose behavior would cause or contribute to a failure resulting in a minor failure condition for the aircraft. Level E software is software whose behavior would cause or contribute to a failure of a system function with no effect on aircraft operational capability or pilot workload.

In one or more configurations, software necessary for operating a vehicle when completely assembled, such software for flying away the aircraft 10 and operating the aircraft 10 during flight, has a first level of criticality and whereas the build verification software has a second level of criticality for when the vehicle such as the aircraft 10 is being manufactured and assembled. In such case, the first level of criticality is higher level than the second level of criticality. For example, flight management software associated with the FMS 840 is level A software. Lower level software associated with the build verification system 812 or the factory build system 816 does not have to meet flight criticality that would allow the aircraft to fly away and therefore could be level E software. Software for systems such as communication and navigation systems and other avionics systems could be either level B, C or D software. In FIGS. 19-22, the higher criticality level software such as software associated with the FMS 840 is designated by reference number 834 and the lower criticality level software such software of the build verification system 812 or the factory build system 816 is designated by reference number 832.

The aircraft 10 has many types of electronic equipment systems on board. A particular electronic equipment system on the aircraft 10 in the form of one or more LRUs 52 may use software or programming to provide the logic or control for various operations and functions. One or more LRUs 52 may include, for example, without limitation, the build verification system 812, the FMS 840, the CNI module 162, an autopilot, an in-flight entertainment system, a communications system, a navigation system, a flight controller, a flight recorder, an engine monitoring unit, and a collision avoidance system.

In FIG. 19 the computer environment 810 includes one configuration of the build verification system 812 where one or more partially constructed vehicle portions include all or part of the power busing network system 90. FIG. 19 depicts an RMEC 410 as a portion of the power busing network system 90 with the fault-tolerant power and communication system 412 of the RMEC 410 interfacing with one or more sensors 814 located on the one or more partially constructed vehicle portions. Although FIGS. 19-22 depict sensors 814, in practice the sensors 814 could correspond to one or more of the equipment loads 50, proximity sensors 434, discrete switches 438, temperature sensors 442, VDTs 446, solenoids 454, relays 456, switches 458, lights 460, or squibs 462, as described above in association with an RMEC 410.

The fault-tolerant power and communication system 412 of the RMEC 410 also interfaces with factory build system 816. The factory build system 816 includes the administrative software such as factory build software on one or a combination of computing devices within one or more facilities for scheduling and tracking the vehicle build as well as coordinate the inventory needed for partially constructed vehicle portion or aircraft 10. In one or more embodiments, the factory build system 816 may also include an external computer 820 (FIG. 26) operative to access one or more of the MECs 44, 46, 48, RMECs 410, or some other computing device operative to host and execute the build verification software. The build verification software may also be hosted and executed from a removable storage device. The computer 820 communicatively interfaces with a database management system 822 having the online work instructions (OWIs) 824. As shown in FIG. 19, the computer 820 communicatively interfaces with the RMEC 410 with a data link and/or communication system.

The computer 820 is capable of executing the software in the manner presented above and may be embodied in single computing device or in a combination of one or more processing units, storage units, and/or other computing devices implemented in the FMS 840 and/or other avionics system 844 of the aircraft 10. The computer 820 includes one or more central processing units 972 ("CPUs"), a system memory 974, including a random access memory 976 ("RAM") and a read-only memory 978 ("ROM"), and a system bus 980 that couples the memory to the CPUs 972.

The CPUs 972 may be standard programmable processors that perform arithmetic and logical operations for the operation of the computer 920. The CPUs 972 may perform the operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 820 also includes a mass storage device 982. The mass storage device 982 may be connected to the CPUs 972 through a mass storage controller (not shown) further connected to the bus 980. The mass storage device 982 and its associated computer-readable media provide non-volatile storage for the computer 820. The mass storage device 982 may store various software modules and components of the FMS 840 and/or other avionics systems 844, as well as specific application modules or other program modules. The mass storage device 982 may also store data collected or utilized by the various systems and modules.

The computer 820 may store programs and data on the mass storage device 982 by transforming the physical state of the mass storage device 982 to reflect the information being stored. The specific transformation of physical state may depend on various factors, in different implementations of this disclosure. Examples of such factors may include, but are not limited to, the technology used to implement the mass storage device 982, whether the mass storage device 982 is characterized as primary or secondary storage, and the like. For example, the computer system 820 may store information to the mass storage device 982 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer system 820 may further read information from the mass storage device 982 by detecting the physical states or characteristics of one or more particular locations within the mass storage device 982.

Although the description of computer-readable media contained herein refers to a mass storage device, such as a hard disk or CD-ROM drive, it should be appreciated by those skilled in the art that computer-readable media can be any available computer storage media that can be accessed by the computer 820. Computer-readable media includes communication media, such as transitory signals, and computer-readable storage media. Computer-readable storage media includes volatile and non-volatile, removable and non-removable media implemented in any method or technology for the non-transitory storage of information such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information in a non-transitory fashion and that can be accessed by the computer 820.

According to various embodiments, the computer 820 may operate in a networked environment using logical connections through a network, such as the network 984, or to other avionics systems 844 in the aircraft 10. The computer 820 may connect to the network 984 through a network interface unit 986 connected to the bus 980. It should be appreciated that the network interface unit 986 may also be utilized to connect to other types of networks and remote computer systems such those with a facility for manufacturing and assembling the aircraft 10. The computer 820 may also include an input-output controller 988 for receiving input and providing output to displays, such as the aircraft display unit 990, or to aircraft terminals.

Figure 20:
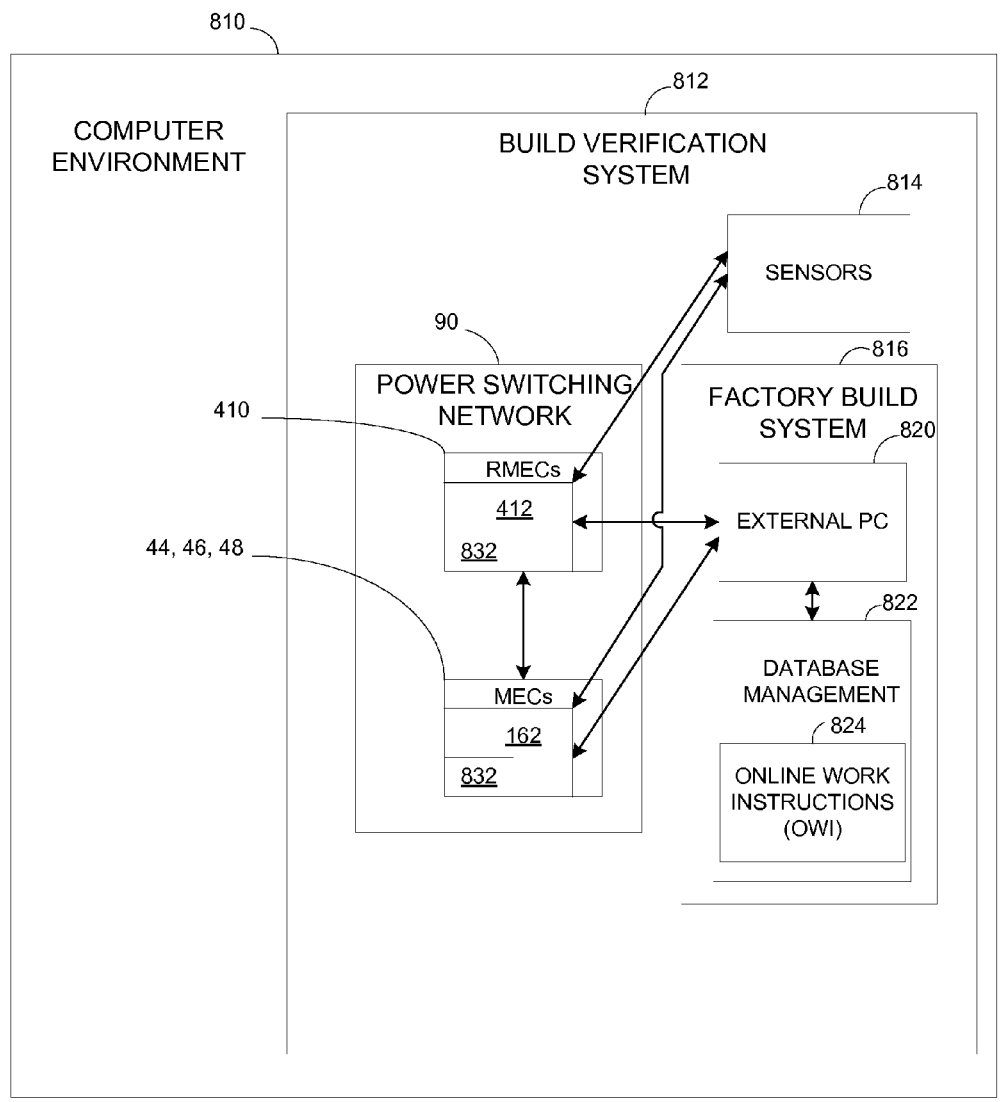
FIG. 20 illustrates one configuration of a computer environment and a build verification system for use with one or more partially constructed vehicle portions having an RMEC interfacing with a MEC according to at least one embodiment disclosed herein.
Figure 21:
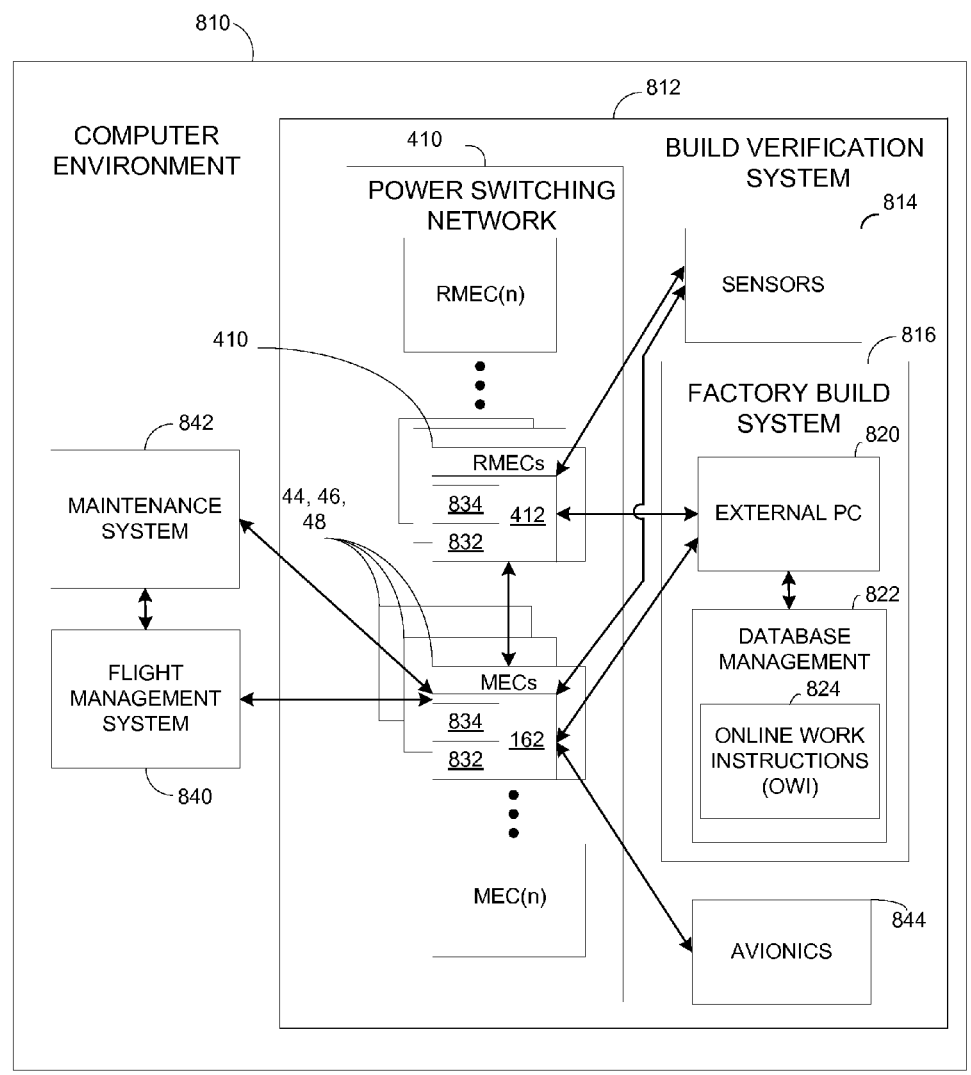
FIG. 21 illustrates one configuration of a computer environment and a build verification system for use with a fully assembled aircraft, prior to initial power up, having multiple RMECs interfacing with multiple MECs and a flight management system (FMS) according to at least one embodiment disclosed herein.

In one or more configurations, depending on the current state of the build of portions of the aircraft 10, build verification system 812 capability may be included on one or more of the MECs 44, 46, 48, in combination with one or more RMECs 410. FIG. 20 illustrates an RMEC 410 along with a MEC 44, 46, 48 installed in one or more partially constructed vehicle portions and operative to access one another. FIG. 21 illustrates multiple MECs 44, 46, 48 installed in one or more partially constructed vehicle portions and operative to access one another. The build verification system 812 includes software hosted on the CNI modules 162 of the MECs 44, 46, 48 and hosted on the RMECs 410. As referenced above, the build verifications system 812 may also be hosted and executed by the external computer 820.

In an exemplary embodiment, the CNI modules 162 of the MECs 44, 46, 48 and fault-tolerant power and communication system 412 of the RMECs 410 generally represents hardware, software, and/or firmware components configured to facilitate communications and/or interaction with the build verification system 812 to perform tasks and/or functions to support testing of installed equipment systems. The CNI modules 162 with processors 242, 244 and the fault-tolerant power and communication system 412 of the RMECs 410, or any other hosting device, include processing logic that may be configured to carry out the functions, techniques, and processing tasks associated with the operation of the build verification system 812.

The computer 820 may be used as a user input device. The CNI modules 162 with processors 242, 244 and the fault-tolerant power and communication system 412 are cooperatively configured to allow a user to interact with the build verification system 812. For example, the user may define test objectives to be performed by the build verification software based on the one or more installed equipment systems and on the one or more prerequisite equipment systems that are not yet installed during a current build stage. Thus, testing is preferably performed only on the one or more installed equipment systems that were installed during the current build stage according to the test objectives. However, testing is typically performed in a chronological progression of steps. If a step or test cannot be performed because equipment is not yet present or installed equipment has failed, subsequent steps are put on hold until resolved. Through emulation, tests on equipment not yet installed or failed tests can be skipped and other testing can continue. Testing on the equipment that is not yet installed or tests that have failed can be performed later out of sequence. Also, the tests are intended to be performed throughout the build process, during final assembly, and up until just before full power-on of the completely assembled aircraft 10. The distributed nature of the build verification system 812 allows partially constructed vehicle portions to be tested separately or in combination with one another prior to the aircraft being completely assembled and flown away. Once the tests are satisfactorily completed, the aircraft receives full power, undergoes final checkout, and is then delivered to the buyer.

The build verification system 812 may also be coupled to the FMS 840. The FMS 840 generally represents the hardware, software, and/or firmware components configured to control operations of the aircraft 10 during flight. The FMS 840 may access or include one or more databases suitably configured to support flight operations of the aircraft 10 such as, for example, the navigation system, the communications system 112, and one or more additional avionics systems 844 to support navigation, flight planning, and other aircraft control functions, as well as to provide real-time data and/or information regarding the operational status of the aircraft 10 during flight.

Although FIGS. 19-22 each depict a single avionics system 844 in practice, the aircraft 10 could include any number of avionics systems for obtaining and/or providing real-time flight-related information that may be displayed or otherwise provided to a user. For example, a practical embodiment of the aircraft 10 would likely include one or more of the following avionics systems suitably configured to support operation of the aircraft 10: a weather system, an air traffic management system, a radar system, a traffic avoidance system, an autopilot system, an auto-thrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

The factory build system 816 within each manufacturing and assembly facility includes a predetermined build plan for assembling the aircraft 10. The build plan is the coordinated and systematic arrangement of inventory at one or more locations to facilitate and track the progress of assembling a vehicle such as the aircraft 10. The build plan may instead be implemented by one or more other software modules elsewhere in the computer environment 810. The build plan includes multiple distinguishable build stages, typically in chronological order, where all the tasks within a particular build stage are completed before moving on to the next build stage for assembling the aircraft 10.

The build verification system 812 may include or have access to the factory build system 816 and one or more databases for determining which equipment systems are required to be installed during each build stage. The build verification system 812 may determine, track, or otherwise identify a current build stage from the factory build system 816 and the current progress of the build plan for assembling the aircraft 10. The build verification system 812 can determine from the factory build system 816 which equipment systems are prerequisites for completing each build stage. Once the current build stage is known, the prerequisite equipment systems to be installed during the current build stage in the one or more partially constructed vehicle portions may be determined by the build verification system 812 from the factory build system 816. The build verification system 812 may also determine from the factory build system 816 which prerequisite equipment systems are not yet installed according to the current build stage.

In one or more configurations, the determination of the current build stage can be made through an interrogation of completed and open OWIs or the current build stage can be input to the build verification system 812 by an operator interfacing with the factory build system 816 such as when signing off on OWIs 824 according to the build plan. Thus, the build verification system 812 can determine which OWIs 824 have been completed and which have not from the factory build system 816 to determine which prerequisite equipment systems have been installed during the current build stage, as well as during any previous build stage, as well as which equipment systems have not yet been installed during the current build stage. Each of the prerequisite equipment systems, when installed in the one or more partially constructed vehicle portions during the current build stage, may be referred to as an installed equipment system.

Electrical connections of each of the installed equipment systems, that were designated for installation during the current build stage, are also tested during the current build stage to determine whether the installed equipment systems are electrically connected correctly in the partially constructed vehicle portion. In addition to testing electrical connections, there may also be testing of data connections. The data connection of an installed equipment system may be tested to determine whether data communications exist to the installed equipment system in the partially constructed vehicle portion.

Upon the determination by the build verification system 812 that one or more prerequisite equipment systems have not yet been installed according to the current build stage, then the build verification system 812 may ignore testing of prerequisite equipment systems that are to be installed during the current build stage but are not yet present in the partially constructed vehicle portion or emulate testing of the prerequisite equipment systems that are to be installed during the current build stage but are not yet present in the partially constructed vehicle portion. In such case, the build verification system 812 eliminates or suppresses nuisance errors in the testing as a result of prerequisite equipment systems not yet installed within the one or more partially constructed vehicle portions.

The tests performed by the build verification system 812 with the build verification software may be invoked automatically by the build verification software of the build verification system 812 upon the CNI module 162 of a MEC 44, 46, 48, or the fault-tolerant power and communication system 412 of an RMEC 410, or some other hosting device within the build verification system 812, upon receiving data from across communication data lines 192. For example, a CNI module 162 or the fault-tolerant power and communication system 412 of an RMEC 410, may receive contactor information regarding the state of various contactors as explained below.

Testing functions may include Electrical Wiring Interconnection System (EWIS) testing such as, but not limited to, reflectometry methods, differential detection, voltage or current sensing, overcurrent, temperature sensing, for verifying wiring integrity and accurate fault location and isolation. These techniques may characterize wire length and if a wire connection is open or shorted. Specific test functionality may be customized at each location and integrated with electrical protective functions. If a failure is detected during a test, the installed equipment system may be isolated from other installed equipment systems within the one or more partially constructed vehicle portions until the installed equipment system generating the failing test data is repaired or replaced.

As part of one or more tests to be conducted on installed equipment systems during the current build stage, the build verification system 812 may emulate the functions of one or more prerequisite equipment systems (such as prerequisite equipment systems to be installed later in the current build stage or in a subsequent build stage) that are not yet present in the partially constructed vehicle portion or not yet present in some other portion of the aircraft 10 such as another partially constructed vehicle portion that is not in proximity to or connected to the partially constructed vehicle portion having the installed equipment systems being tested. For example, software of the build verification system 812 may emulate one or more functions performed by the FMS 840 that is not yet installed while testing the partially constructed vehicle portion. Also, the build verification system 812 may emulate the opening and closing of one or more contactors that are to be used in combination with prerequisite equipment systems that are not yet installed. For example, the build verification system 812 may emulate data communications that include the state of at least one contactor of the primary power switching network device 302, or one or more other contactors within the power busing network system 90, that is not yet present in the partially constructed vehicle portion during the current build stage.

The build verification system 812 could also emulate data communications from prerequisite equipment systems not yet present during the current build stage. For example, the build verification system 812 could emulate data communications for controlling primary power across the power busing network system 90 for distribution of primary power that is not yet fully installed. For example, primary power may not yet be available to a MEC 44, 46, 48 in the partially constructed vehicle portion because the power busing network system 90 may not yet have one or more other MECs 44, 46, 48 with PPSNDs 302 and therefore may not yet be completed. In another example, the build verification system 812 may emulate one or more other MECs 44, 46, 48 that are not yet present to test a MEC 44, 46, 48 installed in the one or more partially constructed vehicle portions as if the one or more other MECs 44, 46, 48 were present. In particular, wherein a partially constructed vehicle portion includes an installed first MEC having a first plurality of contactors, a second MEC having a second plurality of contactors could be emulated for the first MEC to test collecting of contactor information of the second plurality of contactors at the CNI module 162 of the first MEC.

Upon determining that there are no prerequisite equipment systems left to be installed during the current build stage, testing of all installed equipment systems that were installed according to the current build stage, and determining that all installed equipment systems are correctly installed, then the installation of equipment systems may proceed to a subsequent one of the build stages. Also, because some equipment systems are installed on top of other equipment systems making them difficult to access and repair, while the aircraft 10 is still being assembled, the build verification system 812 may also test whether earlier installed equipment systems, that were installed during one or more earlier build stages according to the build plan, remains correctly installed during a subsequent build stage. The build verification system 812 may test during the current build stage whether the installed equipment systems installed during a previous build stage remain correctly electrically connected within the partially constructed vehicle portion. In other words, the build verification system 812 may progressively test during subsequent one or more build stages whether the installed equipment systems remain correctly electrically connected or it had been accidently disturbed.

The build verification system 812 may also determine from the factory build system 816 or from input from the operator which installed equipment systems are safe to operate while someone is in proximity to the partially constructed vehicle portion. In such case, the build verification system 812 could automatically test only the installed equipment systems that are safe to operate when in proximity to someone. In one or more configurations, for the equipment systems which are unsafe to operate when someone is close by, for example raising and lowering of landing gear, the build verification system 812 may require input from an operator that it is safe to proceed with testing of any installed equipment systems that could hazardous and result in personal injury. In one or more other configurations, the build verification system 812 may configure one or more contactors to provide protection and power at a first power level when one or more installed equipment systems are designed for a second power level and wherein the first power level is lower than the second power level. For example, tests could be performed at the lower power level so that the installed equipment systems are not damaged or so that personnel working on the partially constructed vehicle portion are not harmed. The contactors have preset protection ratings but lower test voltages could be sent to ensure everything is operating correctly. The preset protections could be scaled down to less than one amp, if desired, and be supersensitive in the event there is a misconnection or a fault. Then after testing and it is determined that everything is connected properly, it would be possible to revert back to the normal preset protections. In one or more configurations, the build verification system 812 may also configure one or more contactors to have a first protection sensitivity to limit damage when originally designed with a second protection sensitivity. The first protection sensitivity is lower than the second protection sensitivity. Thus, varying the power and protection sensitivity by gradually scaling up or increasing power and the protection ratings to normal operating levels could provide a safety feature to limit the extent of damage in the event of an improper connection.

The build verification system 812 may generate a record of each occurrence of one or more tests that are performed on each of the installed equipment systems. The record may also include the parameters under which the test was performed such as, but not limited to, the results of the test, number of times the test was performed, the current build stage, other installed equipment with the partially constructed vehicle portion, the prerequisite equipment that was not yet installed, and which prerequisite systems were emulated and how they were emulated in order to perform the test. The record may be stored within the build verification system 812 until the aircraft 10 is fully assembled or in the factory build system 816 for any period of time including after the aircraft 10 is fully assembled.

The build verification system 812 is preferably partitioned from the FMS 840 and is disabled or removed once the aircraft 10 is fully assembled. In one configuration, the FMS 840 is installed in the aircraft 10 in place of the software for the build verification system 812 after final assembly of the aircraft 10. Thus, as shown in FIG. 22, the build verification system 812 may be removed from the aircraft 10 and the computer environment is limited to the computing devices and systems within a flight ready aircraft 10.

Figure 23:
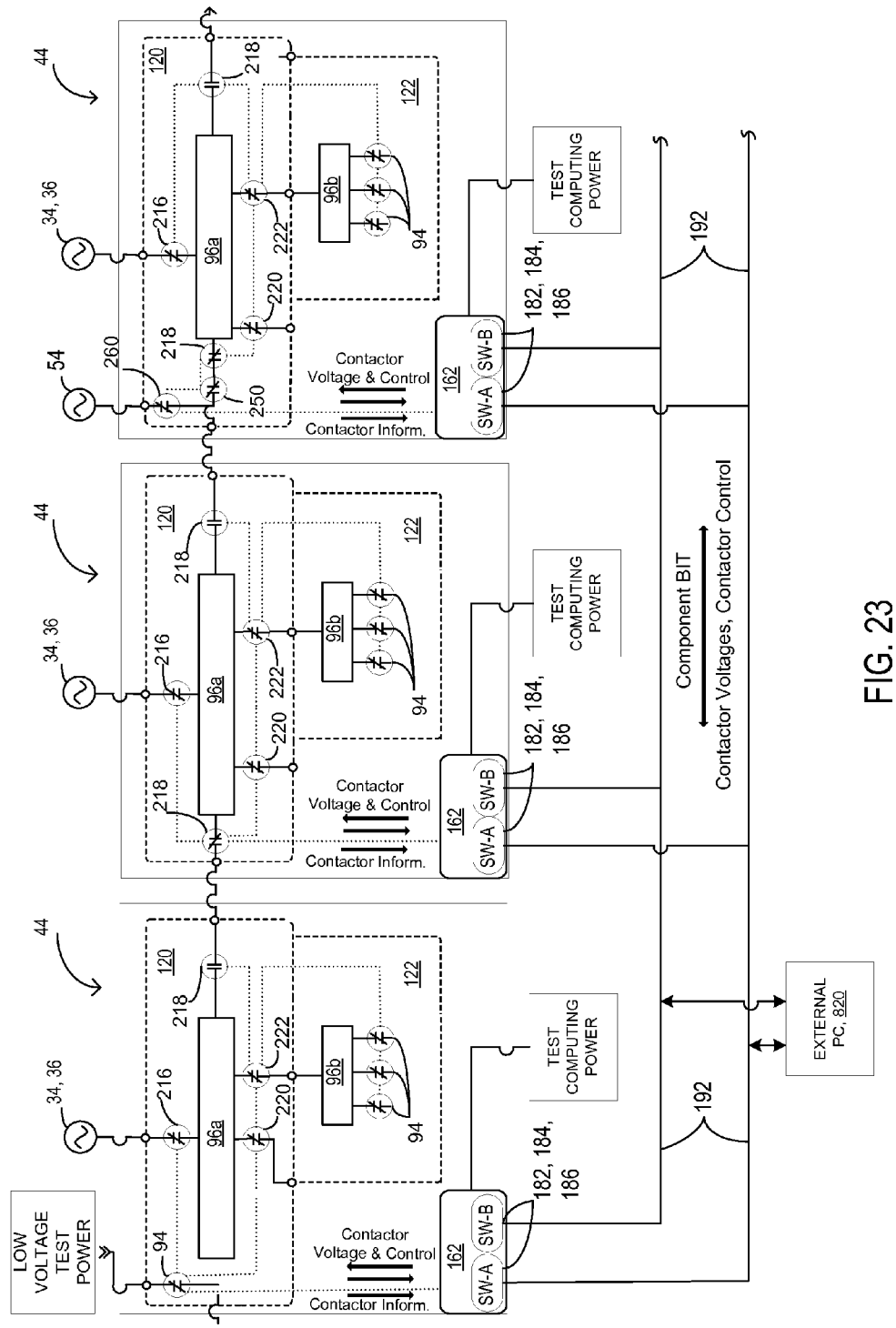
FIG. 23 illustrates one configuration of multiple MECs of a primary power switch network interfacing with one another wherein the CNI modules have embedded BVS software for verifying proper installation of the MECs by routing power to contactors within the MECs and collecting and sharing information about the contactors at the CNI modules according to at least one embodiment disclosed herein.

FIG. 23 illustrates one configuration of the build verification system 812 interfacing with the CNI modules 162 of three primary MECs 44 as part of the power busing network system 90. However, the aspects of the disclosure disclosed by FIG. 23 are not limited to any particular number of primary MECs 44. For a limited power-on for testing a completely assembled aircraft 10 or one or more partially constructed vehicle portions having one or more primary MECs 44, low voltage test power may be applied at the external power input which is then routed to the contactors 94, 216, 218, 220, 222, 250, 260. However, for a full power-on, temporary test computing power may be applied to power up each of the CNI modules 162. The CNI module 162 interfaces with the contactors 94, 216, 218, 220, 222, 250, 260 of the MECs 44 to determine contactor information from each of the contactors 94, 216, 218, 220, 222, 250, 260. The CNI modules 162 include contactor configuration logic and the control for configuring the contactors 94, 216, 218, 220, 222, 250, 260.

In each MEC 44 of FIG. 23 a solid arrow labeled "Contactor Inform." is pointing toward the CNI module 162 to depict the contactor information being sent back to the CNI modules 162. The contactor information includes the state of the contactors 94, 216, 218, 220, 222, 250, 260 such as whether they are present, open or closed, and if there is voltage present. There are also other solid arrows to depict contractor control from each CNI module 162 to the contactors 94, 216, 218, 220, 222, 250, 260 of each MEC 44 and the contactor voltage from the contactors 94, 216, 218, 220, 222, 250, 260 to the CNI modules 162. The low voltage test power sensed at each contactor input and output is compared. The CNI modules 162 sense that a particular contactor is open when there is no voltage present at the contactor output. On the other hand, the CNI modules 162 senses that a contactor is closed when there is voltage present at the contactor output.

Each MEC 44 includes an internal MEC data network among the particular contactors 94, 216, 218, 220, 222, 250, 260 present within each MEC 44. The internal MEC data network is shown in each MEC 44 of FIG. 23 by a dotted line between the CNI module 162 and the particular contactors 94, 216, 218, 220, 222, 250, 260 of each MEC 44. The CNI module 162 of each MEC 44 receives contactor information from each of its contactors and therefore knows the state of each of its contactors through the internal MEC data network. Also, as explained above, the switches 182, 184, 186 of each CNI module 162 of each MEC 44 are connected via external communication data lines 192 to switches 182, 184, 186 of the CNI modules 162 of the other MECs 44, 46, 48. Therefore, contactor information can be broadcast across the data network of the one or more partially constructed vehicle portions to share the contactor information among the MECs 44, 46, 48 in order to configure the power busing network system 90, described above. Each MEC 44, 46, 48 may subscribe to the data network for the contactor information it needs.

To prevent damage to the aircraft 10 in the event of a fault, the low voltage test power is not itself enough to power up the CNI modules 162. If there are no operational inconsistencies using a low voltage test power and test computing power, the CNI modules 162 may be powered up through its own truss system with one or more DC power inputs 284, as shown in FIG. 9, which in turn powers the network switches 182, 184, 186. Also, DC power is output from power outputs 286 of the CNI module 162 to power other CNI modules 162.

Preferably, the low voltage test power is sequentially routed throughout the power busing network system 90. For example, the low voltage test power may be applied to one MEC 44, 46, 48 at a time until all the MECs 44, 46, 48 within one or more partially constructed vehicle portions are successfully tested or the aircraft 10 is completely assembled. In FIG. 23, when the contactor 94 is closed, it can be determined whether the low voltage test power is present at one or more of the other contactors 216, 218, 220, 222 of the left MEC 44 via the internal MEC data network. Closing the contactor 218 of the left MEC 44 then allows the low voltage test power to proceed to the middle MEC 44 which then may also be tested. The low voltage test power may also then proceed to the right MEC 44 shown in FIG. 23 in a similar manner. The testing of the contactors in such a manner within the MECs 44, 46, 48 and elsewhere within of the power busing network system 90 may be referred to as a peer-to-peer test sequence. The peer-to-peer test sequence may be performed after each of the one or more equipment systems are installed in one or more partially constructed vehicle portions until the aircraft 10 is fully assembled. FIG. 23 also illustrates the computer 820 for initiating the testing of the build verification system 812, for monitoring the power busing network system 90, and to verify the functionality and the responses of the installed equipment systems. The computer 820 reads the data such as the contactor information that is broadcast across the communication data lines 192.

As explained above, the build verification system 812 may also be hosted on a RMECs 410, having the fault-tolerant power and communication system 412 with the multi-core microcontroller electronic circuits 422, 424, wherein the RMEC 410 is an installed equipment system within a partially constructed vehicle portion. Testing electrical connections as well as testing data connections between a MEC 44, 46, 48 and an RMEC 410 can be performed with the build verification software application. For example, in FIG. 16B, the SSPC 466 or the ground/open analog discrete output control and indication electrical circuit 468 of the RMEC 410 command one or more switches 472 closed to energize one or more corresponding solenoids 454. When the switches 472 are closed the SSPC 466, or the ground/open analog discrete output control and indication electrical circuit 468 will have information about whether current is flowing and about the voltages as well. Therefore, the SSPC 466 or the ground/open analog discrete output control and indication electrical circuit 468 monitor data made available as a result of sensing current and voltages to determine if there is a completed circuit. The SSPC 466, and the ground/open analog discrete output control and indication electrical circuit 468 share the data with the fault-tolerant power and communication system 412 as shown by the two-way arrows in FIG. 16B.

Figure 24:
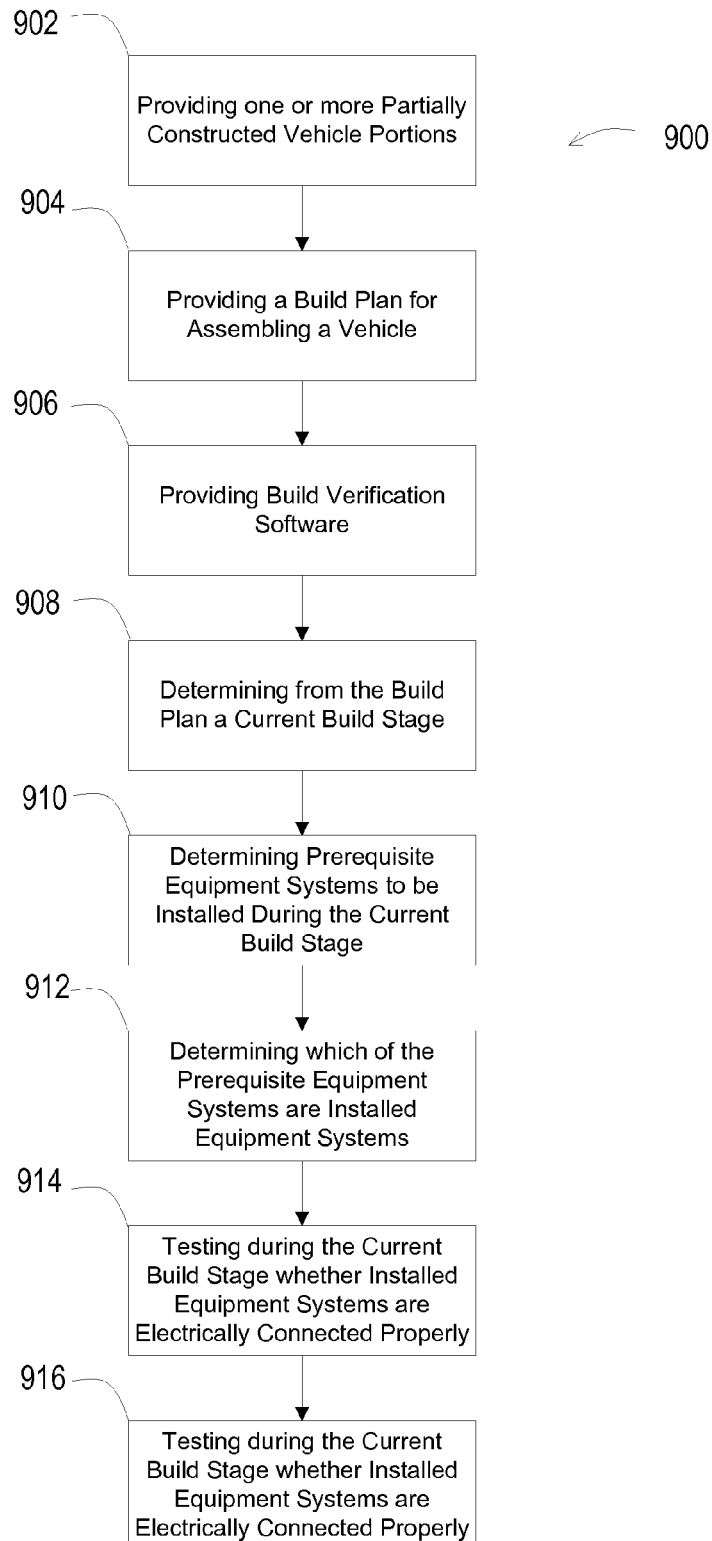
FIG. 24 illustrates one configuration of a routine for verifying proper installation of equipment systems in a vehicle designed to be assembled in multiple build stages according to at least one embodiment disclosed herein.

FIG. 24 illustrates a computer-implemented routine 900 for verifying proper installation of equipment systems in a vehicle designed to be assembled in multiple build stages. Unless otherwise indicated, more or fewer operations may be performed than shown in the figures and described herein. Additionally, unless otherwise indicated, these operations may also be performed in a different order than those described herein. The routine 900 may start at operation 902, where one or more partially constructed vehicle portions of the vehicle are provided. Operation 904 includes providing a build plan for assembling the vehicle comprising a plurality of build stages and operation 906 includes providing build verification software. At operation 908 the build verification software determines from the build plan a current build stage of the partially constructed vehicle portion. The build verification software at operation 910 includes determining one or more prerequisite equipment systems to be installed in the one or more partially constructed vehicle portions according to the current build stage. Operation 912 includes determining which of the one or more prerequisite systems have been installed in the one or more partially constructed vehicle portions during the current build stage, thereby defining one or more installed equipment systems. Operation 914 includes emulation of not yet installed prerequisite equipment systems necessary for one or more tests. Operation 916 then includes testing during the current build stage whether the one or more installed equipment systems are electrically connected correctly in the one or more partially constructed vehicle portions.

Figure 25:
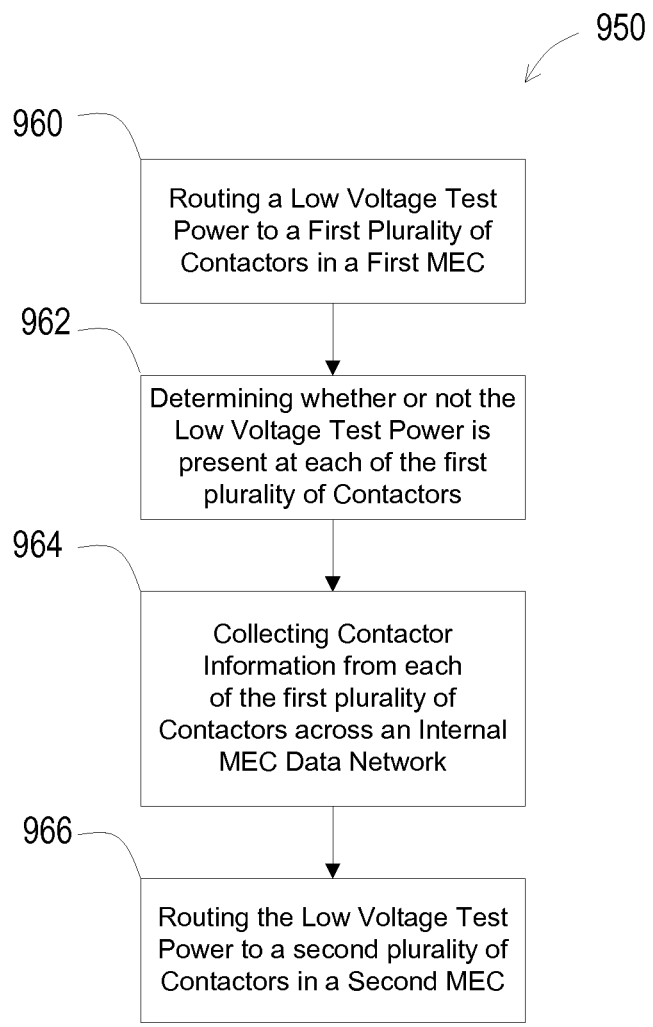
FIG. 25 illustrates one configuration of a routine for verifying proper installation of equipment systems of a primary power busing network within a MEC according to at least one embodiment disclosed herein.

FIG. 25 illustrates a computer-implemented routine 950 for verifying proper installation of equipment systems of a primary power busing network within a first MEC. Unless otherwise indicated, more or fewer operations may be performed than shown in the figures and described herein. Additionally, unless otherwise indicated, these operations may also be performed in a different order than those described herein. The routine 950 starts at operation 960. Operation 960 includes routing a low voltage test power to a first plurality of contactors within the first MEC. Operation 962 includes determining whether or not the low voltage test power is present at each of the first plurality of contactors of the first MEC. Operation 964 includes collecting contactor information from each of the first plurality of contactors across an internal MEC data network of the first MEC to a CNI module of the first MEC. The routine 950 may also include operation 966 routing the low voltage test power to a second plurality of contactors in a second MEC.

Figure 26:
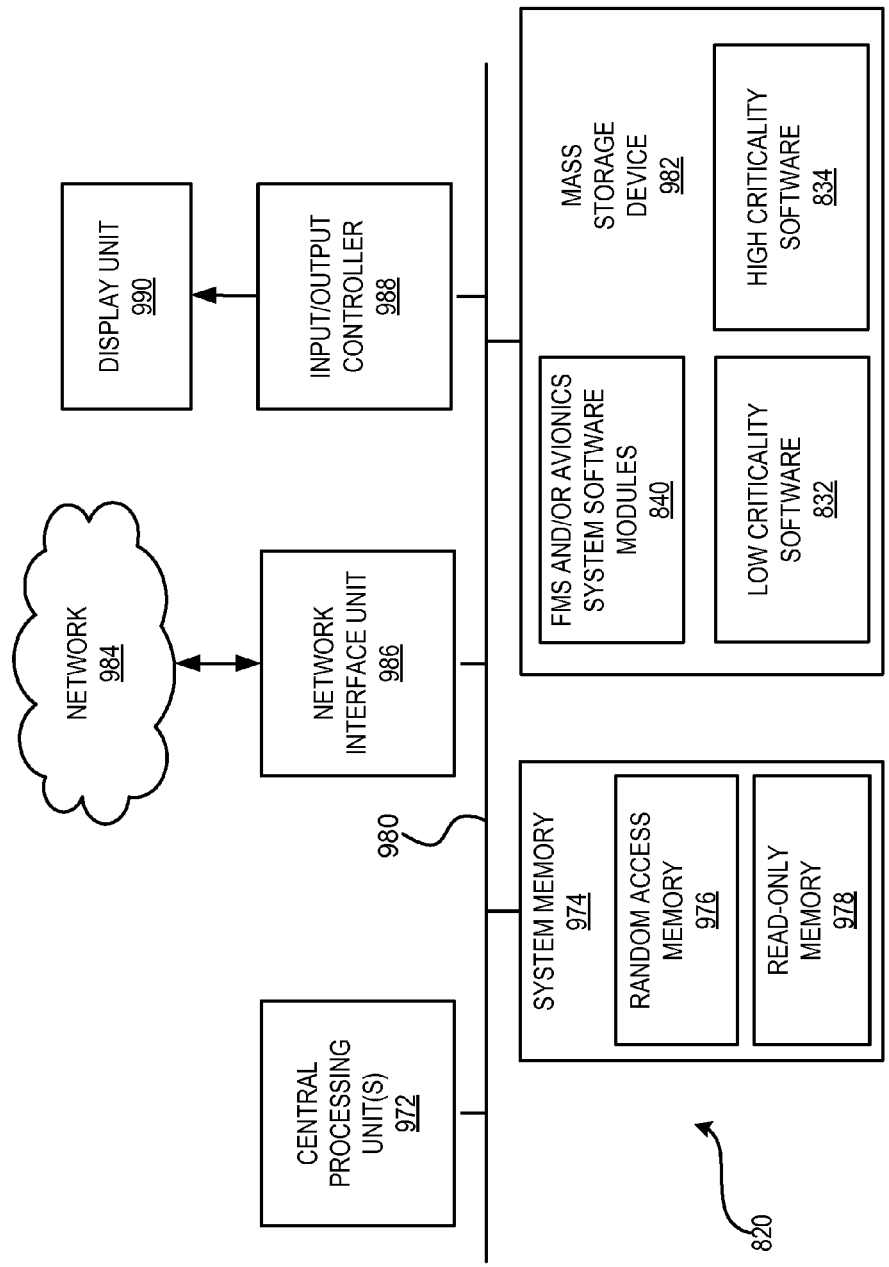
FIG. 26 illustrates one configuration of a block diagram showing an illustrative computer system capable of implementing aspects of the embodiments presented herein.

It will be further appreciated that the computer 820 may not include all of the components shown in FIG. 26, may include other components that are not explicitly shown in FIG. 26, or may utilize an architecture completely different than that shown in FIG. 26. According to one or more embodiments, the computer 820 may have access to computer-readable storage media storing computer-executable instructions that, when executed by the computer, perform the routines 900, 950, as described above in regard to FIGS. 24 and 25.

One or more embodiments may include a computer-readable storage medium with instructions for determining a current build stage of one or more partially constructed vehicle portions from a plurality of build stages, instructions for determining prerequisite equipment systems to be installed in the one or more partially constructed vehicle portions during the current build stage, instructions for determining which prerequisite equipment systems are to be installed during the current build stage that are not yet installed in the one or more partially constructed vehicle portions, and instructions for testing during each of the plurality of build stages whether at least one installed equipment system installed in the partially constructed vehicle portion is properly electrically connected within the one or more partially constructed vehicle portions. The computer readable storage medium may also include instructions for emulating missing prerequisite equipment systems necessary for one or more tests.

One or more embodiments may include a computer comprising a processor and a computer-readable storage medium in communication with the processor. The computer-readable storage medium includes computer-executable instructions stored thereupon that, when executed by the processor, cause the processor to determine a current build stage of one or more partially constructed vehicle portions from a plurality of build stages; determine prerequisite equipment systems to be installed in the one or more partially constructed vehicle portions during the current build stage; determine which prerequisite equipment systems are to be installed during the current build stage that are not yet present in the one or more partially constructed vehicle portions; and test during each of the plurality of build stages whether at least one installed equipment system installed in the partially constructed vehicle portion is properly electrically connected within the one or more partially constructed vehicle portions. The processor could also execute instructions for emulating missing prerequisite equipment systems necessary for one or more tests.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for verifying proper installation of equipment systems in a vehicle designed to be assembled in multiple build stages, the method comprising:
   retrieving a data structure describing a build plan for assembling the vehicle, wherein the build plan comprises a plurality of build stages, and wherein the build plan specifies, for each of the plurality of build stages, a respective plurality of prerequisite equipment systems to be installed in the vehicle during the build stage;
   determining a current build stage, of the plurality of build stages, of one or more partially constructed vehicle portions of the vehicle;
   determining a set of prerequisite equipment systems to be installed in the one or more partially constructed vehicle portions, corresponding to the current build stage;
   determining one or more equipment systems that have been installed in the one or more partially constructed vehicle portions during the current build stage, based on build state information for the one or more partially constructed vehicle portions;
   determining one or more diagnostic tests that are configured to test for a predefined electrical connectivity of the one or more equipment systems;
   emulating, by operation of one or more non-transitory computer processors, data communications, over a data communications network, from one or more prerequisite equipment systems not yet installed in the one or more partially constructed vehicle portions, during the current build stage;

initiating the one or more diagnostic tests, during the current build stage, using the emulated data communications from the one or more prerequisite equipment systems, to determine whether the one or more equipment systems are correctly installed in the vehicle, without requiring the one or more prerequisite equipment systems to be physically installed in the one or more partially constructed vehicle portions; and upon determining that the one or more systems are incorrectly installed, based on a failure of a first one of the one or more diagnostic tests, facilitating a correction of the failure of the first diagnostic test.

2. The computer-implemented method of claim 1, further comprising testing during the current build stage whether data communications exist to the one or more installed equipment systems in the one or more partially constructed vehicle portions.

3. The computer-implemented method of claim 1, further comprising determining during the current build stage which prerequisite equipment systems are not yet installed.

4. The computer-implemented method of claim 3, further comprising ignoring testing of prerequisite equipment systems to be installed during the current build stage, but not yet installed in the one or more partially constructed vehicle portions.

5. The computer-implemented method of claim 1, further comprising suppressing nuisance errors as a result of prerequisite equipment systems not yet installed within the one or more partially constructed vehicle portions.

6. The computer-implemented method of claim 1 further comprising testing whether the one or more installed equipment systems correctly installed during the current build stage remain correctly installed during a subsequent one of the plurality of build stages.

7. The computer-implemented method of claim 1, wherein emulating data communications comprises emulating data communications for controlling distribution of primary power across a power busing network system that is not yet available to the one or more partially constructed vehicle portions during the current build stage.

8. The computer-implemented method of claim 7, wherein emulating data communications comprises indicating a state of at least one contactor of a primary power switching network device that is not yet installed in the one or more partially constructed vehicle portions during the current build stage.

9. The computer-implemented method of claim 1, further comprising determining which installed equipment systems are safe to operate while someone is in proximity to the one or more partially constructed vehicle portions, and automating the testing of at least one of the one or more installed equipment systems on the one or more partially constructed vehicle portions.

10. The computer-implemented method of claim 1 further comprising generating a record of each occurrence of one or more tests performed during one or more of the plurality of build stages on the one or more installed equipment systems on the one or more partially constructed vehicle portions.

11. The computer-implemented method of claim 1, further comprising progressively testing during subsequent one or more of the plurality of build stages whether the one or more installed equipment systems remain correctly electrically connected to the one or more partially constructed vehicle portions.

12. The computer-implemented method of claim 1, further comprising testing during the current build stage whether the one or more installed equipment systems installed during a previous build stage remain correctly electrically connected to the one or more partially constructed vehicle portions.

13. The computer-implemented method of claim 1, further comprising partitioning build verification software from flight management software.

14. The computer-implemented method of claim 1, further comprising disabling build verification software after final assembly of the vehicle.

15. The computer-implemented method of claim 1, further comprising removing build verification software after final assembly of the vehicle.

16. The computer-implemented method of claim 1, further comprising installing flight management software in place of build verification software after final assembly of the vehicle.

17. The computer-implemented method of claim 1, further comprising hosting build verification software on a computing and network interface (CNI) module of a modular equipment center (MEC) in the one or more partially constructed vehicle portions.

18. The computer-implemented method of claim 17, testing electrical connections between one or more equipment loads and the MEC in the one or more partially constructed vehicle portions.

19. The computer-implemented method of claim 17, testing data connections between one or more equipment loads and the MEC in the one or more partially constructed vehicle portions.

20. The computer-implemented method of claim 1, further comprising hosting build verification software on a computing and network interface (CNI) module of a modular equipment center (MEC) and on a CNI module of a remote modular equipment center (RMEC), and testing an electrical connection between the MEC and the RMEC.

21. The computer-implemented method of claim 20, further comprising testing a data connection between the MEC and the RMEC.

22. The computer-implemented method of claim 1, further comprising hosting build verification software on a computing and network interface (CNI) module of a remote modular equipment center (RMEC) in the one or more partially constructed vehicle portions.

23. The computer-implemented method of claim 22, testing electrical connections between one or more sensors and the RMEC in the one or more partially constructed vehicle portions.

24. The computer-implemented method of claim 22, testing data connections between one or more sensors and the RMEC in the one or more partially constructed vehicle portions.

25. The computer-implemented method of claim 1, further comprising hosting build verification software on a removable storage device.

26. The computer-implemented method of claim 1, further comprising defining test objectives to be performed by build verification software based on the one or more installed equipment systems and the one or more prerequisite equipment systems not yet installed during the current build stage, and testing only the one or more installed equipment systems installed during the current build stage according to the test objectives.

27. The computer-implemented method of claim 1, further comprising determining there are no prerequisite equipment systems left to be installed during the current build stage, testing all installed equipment systems according to the current build stage, determining all installed equipment systems are correctly installed, and proceeding to a subsequent one of the plurality of build stages.

28. The computer-implemented method of claim 1, further comprising hosting build verification software on a computing and network interface (CNI) module of a modular equipment center (MEC) installed in the one or more partially constructed vehicle portions, and the build verification software emulating one or more other MECs that are not yet installed to test the MEC in the one or more partially constructed vehicle portions as if the one or more other MECs were present.

29. The computer-implemented method of claim 1, further comprising emulating opening and closing of one or more contactors used in combination with one or more prerequisite equipment systems that are not yet installed.

30. The computer-implemented method of claim 1, further comprising emulating flight management software that is not yet installed.

31. The computer-implemented method of claim 1, further comprising configuring one or more contactors to provide power at a first power level when one or more installed equipment systems are designed for a second power level, wherein the first power level is lower than the second power level.

32. The computer-implemented method of claim 31, further configuring one or more contactors to have a first protection sensitivity when designed with a second protection sensitivity, wherein the first protection sensitivity is lower than the second protection sensitivity.

33. A system, comprising:
 one or more computer processors; and
 a non-transitory memory containing computer program code that, when executed by operation of the one or more computer processors, performs an operation for verifying proper installation of equipment systems in a vehicle designed to be assembled in multiple build stages, the operation comprising:
  retrieving a data structure describing a build plan for assembling the vehicle, wherein the build plan comprises a plurality of build stages, and wherein the build plan specifies, for each of the plurality of build stages, a respective plurality of prerequisite equipment systems to be installed in the vehicle during the build stage;
  determining a current build stage, of the plurality of build stages, of one or more partially constructed vehicle portions of the vehicle;
  determining a set of prerequisite equipment systems to be installed in the one or more partially constructed vehicle portions, corresponding to the current build stage;
  determining one or more equipment systems that have been installed in the one or more partially constructed vehicle portions during the current build stage, based on build state information for the one or more partially constructed vehicle portions;
  determining one or more diagnostic tests that are configured to test for a predefined electrical connectivity of the one or more equipment systems;
  emulating data communications, over a data communications network, from one or more prerequisite equipment systems not yet installed in the one or more partially constructed vehicle portions, during the current build stage;
  initiating the one or more diagnostic tests, during the current build stage, using the emulated data communications from the one or more prerequisite equipment systems, to determine whether the one or more equipment systems are correctly installed in the vehicle, without requiring the one or more prerequisite equipment systems to be physically installed in the one or more partially constructed vehicle portions; and
  upon determining that the one or more systems are incorrectly installed, based on a failure of a first one of the one or more diagnostic tests, facilitating a correction of the failure of the first diagnostic test.

34. The system of claim 33, further configured to test during the current build stage whether data communications exist to the one or more installed equipment systems.

35. The system of claim 33, further comprising software having a first level of criticality for operating the vehicle when completely assembled and wherein the build verification software has a second level of criticality, and wherein the first level of criticality is higher level than the second level of criticality.

36. A non-transitory computer-readable storage medium containing computer program code that, when executed by operation of one or more computer processors, performs an operation comprising:
 retrieving a data structure describing a build plan for assembling the vehicle, wherein the build plan comprises a plurality of build stages, and wherein the build plan specifies, for each of the plurality of build stages, a respective plurality of prerequisite systems to be installed in the vehicle during the build stage;
 determining a current build stage, of the plurality of build stages, of one or more partially constructed vehicle portions of the vehicle;
 determining a set of prerequisite equipment systems to be installed in the one or more partially constructed vehicle portions, corresponding to the current build stage;
 determining one or more equipment systems that have been installed in the one or more partially constructed vehicle portions during the current build stage, based on build state information for the one or more partially constructed vehicle portions;
 determining one or more diagnostic tests that are configured to test for a predefined electrical connectivity of the one or more equipment systems;
 emulating, by operation of one or more non-transitory computer processors, data communications, over a data communications network, from one or more prerequisite equipment systems not yet installed in the one or more partially constructed vehicle portions, during the current build stage;
 initiating the one or more diagnostic tests, during the current build stage, using the emulated data communications of the one or more prerequisite equipment systems, to determine whether the one or more equipment systems are correctly installed in the vehicle, without requiring the one or more prerequisite equipment systems to be physically installed in the one or more partially constructed vehicle portions; and upon determining that the one or more systems are incorrectly installed, based on a failure of a first one of the one or more diagnostic tests, facilitating a correction of the failure of the first diagnostic test.

37. The non-transitory computer-readable storage medium of claim 36, further comprising ignoring testing of prerequisite equipment systems to be installed during the current build stage, but not yet present in the one or more partially constructed vehicle portions.

38. The non-transitory computer-readable storage medium of claim 36, further comprising suppressing nuisance errors as a result of prerequisite equipment systems not yet installed within the one or more partially constructed vehicle portions.

39. The non-transitory computer-readable storage medium of claim 36, further comprising testing whether the one or more installed equipment systems correctly installed during the current build stage remain correctly installed during a subsequent one of the plurality of build stages.

40. The non-transitory computer-readable storage medium of claim 36, further comprising emulating data communications across a power busing network system for distribution of primary power that is not yet available to the one or more partially constructed vehicle portions during the current build stage.

41. A computer-implemented method for verifying proper installation of equipment systems of a primary power busing network within a first modular equipment center (MEC), the method comprising, by operation of one or more non-transitory computer processors:
   emulating, by operation of one or more non-transitory computer processors, data communications, over a data communications network, from one or more prerequisite equipment systems not yet installed in the one or more partially constructed vehicle portions, during the current build stage;
   initiating one or more diagnostic tests, during the current build stage of the vehicle, using the emulated data communications of one or more prerequisite equipment systems, to determine whether one or more equipment systems of the primary power busing network within the MEC are correctly installed in the vehicle, without requiring the one or more prerequisite equipment systems to be physically installed in the one or more partially constructed vehicle portions, comprising:
     routing a low voltage test power to a first plurality of contactors within the first MEC;
     determining whether or not the low voltage test power is present at each of the first plurality of contactors of the first MEC; and
     collecting contactor information from each of the first plurality of contactors across an internal MEC data network of the first MEC to a CNI module of the first MEC; and
   upon determining that the one or more equipment systems are incorrectly installed, based on a failure of a first one of the one or more diagnostic tests, facilitating a correction of the failure of the first diagnostic test.

42. The computer-implemented method of claim 41 further comprising:
   routing the low voltage test power to a second plurality of contactors within a second MEC;
   determining whether or not the low voltage test power is present at each of the second plurality of contactors of the second MEC; and
   collecting contactor information from each of the second plurality of contactors across an internal MEC data network of the second MEC to a CNI module of the second MEC.

43. The computer-implemented method of claim 42 further comprising providing the contactor information of the first plurality of contactors to the CNI module of the second MEC and configuring the second plurality of contactors of the second MEC based on the contactor information of the first plurality of contactors of the first MEC.

44. The computer-implemented method of claim 42 further comprising providing the contactor information of the second plurality of contactors to the CNI module of the first MEC and configuring the first plurality of contactors of the first MEC based on the contactor information of the second plurality of contactors of the second MEC.

45. The computer-implemented method of claim 41 further comprising emulating a second MEC having a second plurality of contactors to test collecting of contactor information of the second plurality of contactors at the CNI module of the first MEC.

* * * * *